(12) United States Patent
Kircher et al.

(10) Patent No.: US 12,291,363 B2
(45) Date of Patent: May 6, 2025

(54) METHOD AND SYSTEM FOR PRODUCING STERILE SOLUTION PRODUCT BAGS

(71) Applicants: BAXTER INTERNATIONAL INC., Deerfield, IL (US); BAXTER HEALTHCARE SA, Glattpark (CH)

(72) Inventors: Joseph John Kircher, Gurnee, IL (US); Karl Hans Cazzini, Lindenhurst, IL (US); James Mitchell White, Grayslake, IL (US); Julien Beauquet, Villeneuve d'ascq (FR)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 0 days.

(21) Appl. No.: 18/530,998

(22) Filed: Dec. 6, 2023

(65) Prior Publication Data

US 2024/0174389 A1    May 30, 2024

Related U.S. Application Data

(62) Division of application No. 17/301,450, filed on Apr. 2, 2021, now Pat. No. 11,851,222.

(Continued)

(51) Int. Cl.
*B65B 3/04* (2006.01)
*B29C 65/00* (2006.01)
(Continued)

(52) U.S. Cl.
CPC ............ *B65B 3/003* (2013.01); *B29C 65/745* (2013.01); *B29C 66/857* (2013.01); *B65B 7/02* (2013.01);
(Continued)

(58) Field of Classification Search
CPC ......... B65B 3/003; B65B 7/02; B65B 51/142; B65B 57/145; B65B 57/18; B65B 61/06;
(Continued)

(56) References Cited

U.S. PATENT DOCUMENTS 4,999,978 A * 3/1991 Kohlbach ............ B65G 69/183
53/88
7,052,603 B2 * 5/2006 Schick ................ A61M 1/0218
210/257.2

(Continued)

FOREIGN PATENT DOCUMENTS

| JP | 2012-217436 A | 11/2012 |
|---|---|---|
| JP | 2018-030610 A | 3/2018 |
| WO | WO-2017/127632 A1 | 7/2017 |

OTHER PUBLICATIONS

International Application No. PCT/US2021/025592, Invitation to Pay Additional Fees, mailed Jul. 16, 2021.
(Continued)

*Primary Examiner* — Nicolas A Arnett
(74) *Attorney, Agent, or Firm* — MARSHALL, GERSTEIN & BORUN LLP

(57) ABSTRACT

A method for producing sterile solution product bags includes positioning a manifold assembly onto a filling machine. The manifold assembly includes a plurality of bags, a first filter, and a connection line in fluid communication with the first filter. Each of the plurality of bags includes a bladder and a stem in fluid communication with the bladder and with the connection line. The method includes activating a pump and at least partially filling one or more of the bladders by pumping fluid through the feed line, the first filter, and the connection line. The method includes sealing the stem of each of the filled product bags at a location between the connection line and the bladder, thereby creating one or more at least partially filled and (Continued)

sealed product bags. The method includes separating each of the at least partially filled and sealed product bags from the connection line.

16 Claims, 31 Drawing Sheets

Related U.S. Application Data

(60) Provisional application No. 63/004,937, filed on Apr. 3, 2020, provisional application No. 63/004,998, filed on Apr. 3, 2020, provisional application No. 63/005,046, filed on Apr. 3, 2020.

(51) Int. Cl.
| | |
|---|---|
| *B29C 65/74* | (2006.01) |
| *B65B 3/00* | (2006.01) |
| *B65B 7/02* | (2006.01) |
| *B65B 51/14* | (2006.01) |
| *B65B 57/14* | (2006.01) |
| *B65B 57/18* | (2006.01) |
| *B65B 61/06* | (2006.01) |
| *B29L 31/00* | (2006.01) |

(52) U.S. Cl.
CPC .......... *B65B 51/142* (2013.01); *B65B 57/145* (2013.01); *B65B 57/18* (2013.01); *B65B 61/06* (2013.01); *B29C 66/73921* (2013.01); *B29L 2031/7148* (2013.01); *B65B 2210/06* (2013.01)

(58) Field of Classification Search
CPC . B65B 2210/06; B29C 65/745; B29C 66/857; B29C 66/73921; B29C 2031/7148
See application file for complete search history.

(56) References Cited

U.S. PATENT DOCUMENTS

| | | | | |
|---|---|---|---|---|
| 7,913,475 | B2* | 3/2011 | Khan | B65D 75/58 |
| | | | | 53/86 |
| 8,001,747 | B2* | 8/2011 | Pluckrose | B65B 9/093 |
| | | | | 53/469 |
| 8,069,637 | B2* | 12/2011 | Taylor, Sr. | B29C 66/348 |
| | | | | 53/434 |
| 9,073,650 | B2* | 7/2015 | Goodwin | B65B 3/02 |
| 9,533,135 | B2* | 1/2017 | Kusters | B29C 66/857 |
| 10,119,108 | B2* | 11/2018 | Maggiore | B33Y 30/00 |
| 11,021,275 | B2* | 6/2021 | Bomgaars | B65B 51/30 |
| 11,440,688 | B2* | 9/2022 | Hilbrink | B65B 9/12 |
| 11,608,201 | B2* | 3/2023 | Witt | B65B 1/04 |
| 11,851,222 | B2* | 12/2023 | Kircher | B65B 1/18 |
| 11,980,587 | B2* | 5/2024 | Wood | A61J 1/10 |
| 2006/0180526 | A1* | 8/2006 | Sugawara | A61M 39/146 |
| | | | | 604/408 |
| 2008/0051937 | A1* | 2/2008 | Khan | B65B 43/52 |
| | | | | 700/231 |
| 2011/0136646 | A1* | 6/2011 | Pearce | B04B 5/0428 |
| | | | | 494/5 |
| 2014/0083170 | A1* | 3/2014 | Pavlik | G01M 3/3218 |
| | | | | 73/49.2 |
| 2017/0354941 | A1* | 12/2017 | Brown | B01F 25/31 |
| 2018/0273217 | A1* | 9/2018 | Bernardy | B29C 66/919 |
| 2019/0048303 | A1* | 2/2019 | Maggiore | B67D 3/0012 |
| 2019/0329196 | A1* | 10/2019 | Hurst | A61J 1/2003 |
| 2021/0155507 | A1* | 5/2021 | Kamen | B65B 57/00 |
| 2024/0043155 | A1* | 2/2024 | Malhotra | B65B 3/003 |

OTHER PUBLICATIONS

International Application No. PCT/US2021/025592, International Search Report and Written Opinion, mailed Nov. 3, 2021.

* cited by examiner

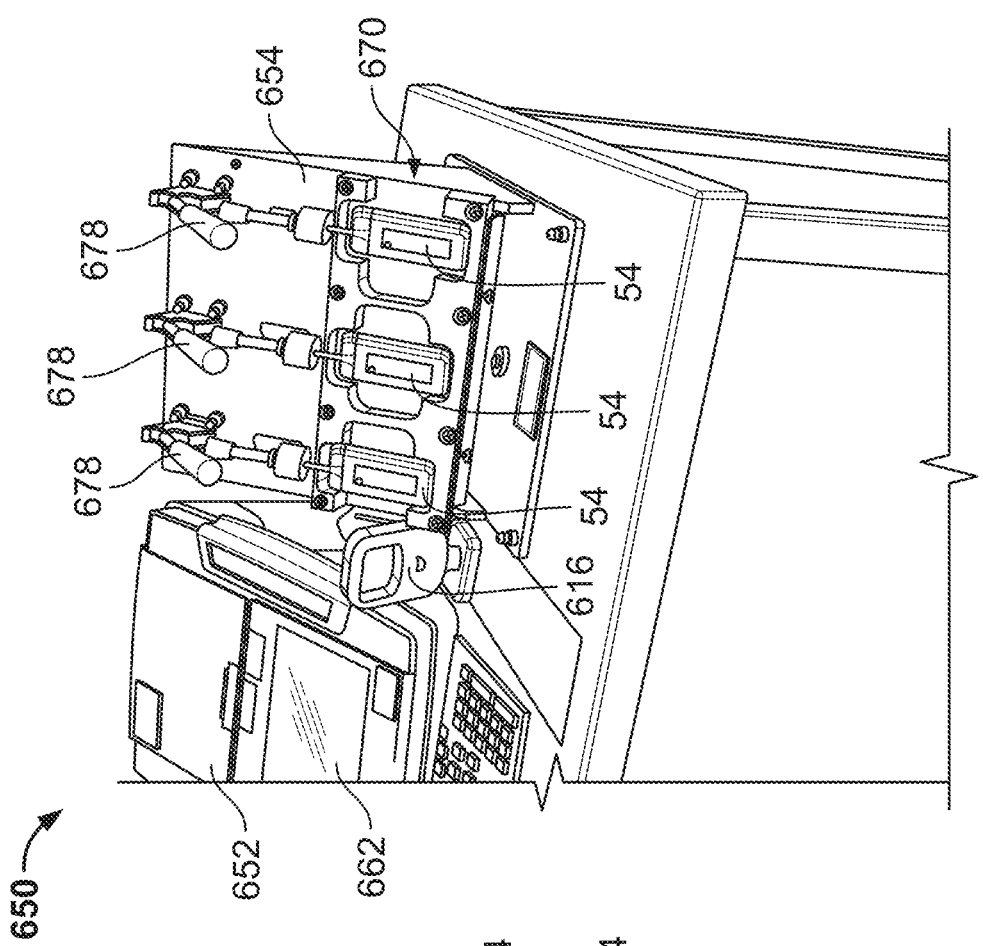
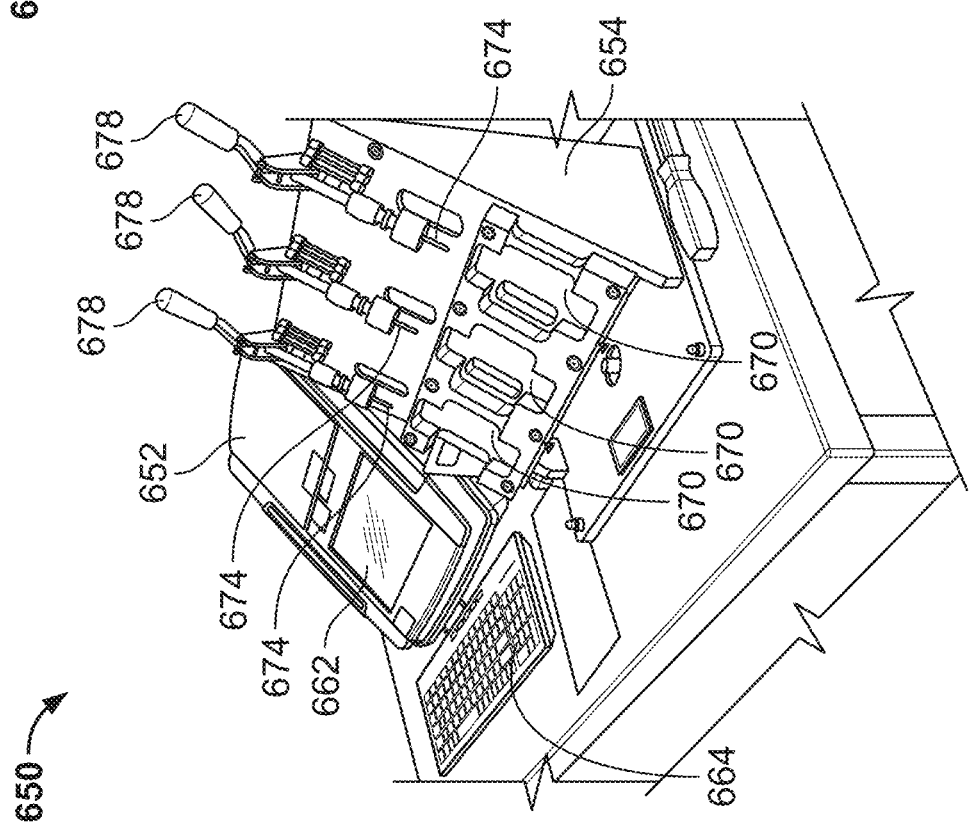
FIG. 37b
FIG. 37a

METHOD AND SYSTEM FOR PRODUCING STERILE SOLUTION PRODUCT BAGS

CROSS-REFERENCE TO RELATED APPLICATIONS

This application is a divisional of U.S. application Ser. No. 17/301,450, filed Apr. 2, 2021, which claims the priority benefit of U.S. Provisional Application No. 63/004,998, filed Apr. 3, 2020, U.S. Provisional Application No. 63/005,046, filed Apr. 3, 2020, and U.S. Provisional Application No. 63/004,937, filed Apr. 3, 2020, which are all hereby incorporated by reference herein in their entireties.

FIELD OF DISCLOSURE

The present disclosure relates to sterile solution product bags, and more particularly, to a method, system, and machine for producing sterile solution product bags.

BACKGROUND

Conventional methods for manufacturing bags of sterile solution include filling bags in a clean environment with a solution, sealing the filled bag of solution, and then sterilizing the fluid and bags such as in a sterilizing autoclave. This can be referred to as terminal sterilization. Another conventional method is to sterile filter a solution and to fill and seal sterile bags in an extremely high-quality environment designed and controlled to prevent contamination of the solution during the filling process and to seal the filled bag. This can be referred to as an aseptic filling process.

The terminal sterilization process generally requires one or more autoclaves to produce the sterilizing heat and steam needed to suitably sterilize the bag of solution for medical use. These autoclaves generally are not economical unless they can produce large batches of terminally sterilized bags. Typically, centralized manufacturing facilities can afford the capital expenditure needed and space requirements to produce and ship the filled bags. In addition to these costs, the application of terminal sterilization processes may degrade the solution formulation contained in the bags, thereby leading to incompatible or unstable formulations. Moreover, terminal sterilization does not eliminate non-viable contamination.

The aseptic manufacturing process must occur in a sterile working environment, and requires expensive equipment, stringent procedures and extensive monitoring to ensure that solution product bags meet certain environmental and manufacturing regulatory standards. Sterilizing a working environment, by itself, can be costly and time consuming. Additional precautions apply for technicians involved in the filling process to ensure the production of safe and sterile products. Even with these safeguards, unless it can be verified that the solution entering the bag is sterile, there is a risk that contaminants may have inadvertently been introduced into the solution during filling/sealing. Once introduced, unless the solution later passes through a viable sterilizing filter, the contaminants will remain in the solution.

SUMMARY

In accordance with a first exemplary aspect, a method for producing sterile solution product bags may include positioning a manifold assembly onto a filling machine. The manifold assembly may include a plurality of bags, a first filter, and a connection line in fluid communication with the first filter. Each of the plurality of bags may include a bladder and a stem having a first end in fluid communication with the bladder and a second end in fluid communication with the connection line. The method may include fluidly coupling a nozzle to the connection line of the manifold assembly. The nozzle may be in fluid communication with a second filter via a feed line. The second filter may be disposed upstream from the first filter. Further, the method may include activating a pump operatively coupled to the feed line. The pump may be disposed upstream from the second filter. The method may include at least partially filling one or more of the bladders associated with the plurality of bags by pumping fluid through the feed line, second filter, the nozzle, the first filter, and the connection line, thereby creating one or more at least partially filled product bags. The method may also include sealing the stem of each of the at least partially filled product bags at a location between the connection line and the bladders of the at least partially filled product bags, thereby creating one or more at least partially filled and sealed product bags. Finally, the method may include separating each of the at least partially filled and sealed product bags from the connection line.

In accordance with a second exemplary aspect, a system for filling sterile solution product bags may include a clean chamber, a support wall disposed above the clean chamber, and a batch filter connected to a feed line. The feed line may be at least partially disposed in the clean chamber. Further, the system may include a nozzle coupled to an end of the feed line and disposed in the clean chamber and a manifold assembly removably coupled to the support wall. The manifold assembly may include a plurality of product bags, a connection line, and a manifold filter. Each product bag may include a bladder and a stem connected to the bladder. The connection line may be in fluid communication with the stems of the plurality of the product bags. The manifold filter may have an inlet and an outlet. The inlet may be operatively coupled to the nozzle and the outlet may be operatively coupled to the connection line. A pump may be coupled to the feed line and configured to pump a fluid through the batch filter, the feed line, the nozzle, the manifold filter, the connection line, and into each of the plurality of product bags.

In accordance with a third exemplary aspect, a system for producing sterile solution product bags may include a mix bag (or mix tank) for mixing a solution and a filling machine adapted to receive the solution from the mix bag for filling an empty bag set. The filling machine may include a clean chamber, a support wall disposed above the clean chamber and a batch filter connected to a feed line. The feed line may be at least partially disposed in the clean chamber. The filling machine may include a nozzle formed at an end of the feed line and disposed in the clean chamber and a manifold assembly removably coupled to the support wall. The manifold assembly may include a plurality of product bags. Each product bag may include a bladder and a stem connected to the bladder. A connection line may be in fluid communication with the stems of the plurality of the product bags. A manifold filter may have an inlet and an outlet. The inlet may be operatively coupled to the nozzle and the outlet may be operatively coupled to the connection line. A pump may be coupled to the feed line and may be configured to pump a fluid through the batch filter, the feed line, the nozzle, the manifold filter, the connection line, and into each of the plurality of product bags. A filter integrity test machine may be configured to perform at least one of a bubble point test and a pressure degradation test on the first filter.

In accordance with a fourth exemplary aspect, a method for producing sterile solution product bags may include positioning a manifold assembly onto a filling machine. The manifold assembly may include a plurality of bags, a first filter, and a connection line in fluid communication with the first filter. Each of the plurality of bags may include a bladder and a stem having a first end in fluid communication with the bladder and a second end in fluid communication with the connection line. The method may further include coupling a nozzle to the connection line of the manifold assembly. The nozzle may be in fluid communication with a second filter via a feed line. The second filter may be disposed upstream from the first filter. The method may include activating a pump operatively coupled to the feed line. The pump may be disposed upstream from the second filter. Further, the method may include at least partially filling one or more of the bladders associated with the plurality of bags with] headspace by pumping fluid through the feed line, second filter, the nozzle, the first filter, and the connection line, thereby creating one or more at least partially filled product bags. The method may then include sealing the stem of each of the at least partially filled product bags at a location between the connection line and the bladders of the at least partially filled product bags, thereby creating one or more at least partially filled and sealed product bags. Finally, the method may include separating each of the at least partially filled and sealed product bags from the connection line.

In accordance with a fifth exemplary aspect, a method for producing sterile solution product bags may include positioning a manifold assembly onto a filling machine. The manifold assembly may include a plurality of bags, a first filter, and a connection line in fluid communication with the first filter. Each of the plurality of bags may include a bladder and a stem having a first end in fluid communication with the bladder and a second end in fluid communication with the connection line. The method may include coupling a nozzle to the connection line of the manifold assembly. The nozzle may be in fluid communication with a second filter disposed upstream from the first filter. The method may further include at least partially filling one or more of the bladders associated with the plurality of bags by pumping fluid through the second filter, the nozzle, the first filter, and the connection line, thereby creating one or more partially filled product bags. The method may include sealing the stem of each at least partially filled product bags at a location between the connection line and the bladder of the at least partially filled product bags, thereby creating one or more at least partially filled and sealed product bags having a seal. Finally, the method may include separating, at the seal, each of the at least partially filled and sealed product bags from the connection line.

In accordance with a sixth exemplary aspect, a method of finalizing sterile solution product bags may include providing a manifold assembly having a plurality of partially filled bags and a connection line in fluid communication with an outlet of the filter. The plurality of partially filled bags may be connected to a filter, and each of the partially filled bags may include a partially filled bladder and a stem having a first end in fluid communication with the partially filled bladder and a second end in fluid communication with the connection line. The method may include sealing the stem associated with each of the partially filled bags at a first location between the partially filled bladder and the connection line, thereby creating one or more partially filled and sealed product bags. The method may include separating each stem of the at least partially filled and sealed product bags from the connection line. The method may include sealing the connection line at a second location adjacent to the outlet of the filter. Finally, the method may include separating the filter from the connection line.

In accordance with a seventh exemplary aspect, a system for finalizing sterile solution product bags may include a sealing tool movable between an open position and a clamped position. The sealing tool may have a hand grip, a lever, and a clamp coupled to the lever. The hand grip may have a distal end proximate to the clamp that emits RF energy. A cutting tool may be movable between an open position and a closed position. The cutting tool may include a hand grip, a lever, a blade coupled to the hand grip, and a stop coupled to the lever. The stop may be sized to receive the blade when the cutting tool is in the closed position. The stop may be spaced away from the blade when the cutting tool is in the open position.

In accordance with a eighth exemplary aspect, a system for finalizing sterile solution product bags may include a sealing means having a sealing element formed in opposing clamped surfaces that are configured to collapse and at least partially melt and sealing fuse the inner passageway, and a lever. The lever may be movable between an open position, in which the element is deactivated, and a clamped position, in which the element is activated and applies a radiofrequency energy between the opposing clamped surfaces. A cutting means may include a blade and a stop. The blade may be movable between an open position, in which the blade is spaced from the stop, and a closed position, in which the blade engages the stop.

In accordance with a ninth exemplary aspect, a method for producing sterile solution product bags may include positioning a manifold assembly onto a filling machine. The manifold assembly may include a product bag, a first filter, and a connection line in fluid communication with the first filter. The product bag may be mounted to a support wall of the filling machine. The method may include coupling a nozzle to the connection line of the manifold assembly in a clean chamber of the filling machine. The nozzle may be disposed in a nozzle holder and in fluid communication with a second filter via a feed line. The second filter may be disposed upstream from the first filter, and the clean chamber may be disposed below the support wall of the filling machine. The method may include activating a pump operatively coupled to the feed line. The pump may be disposed upstream from the second filter. Further, the method may include at least partially filling a bladder of the product bag by pumping fluid through the feed line, second filter, the nozzle, the first filter, and the connection line, thereby creating an at least partially filled product bag. The method may include sealing the stem of the at least partially filled product bag at a location between the connection line and the bladder of the at least partially filled product bag, thereby creating an at least partially filled and sealed product bag. Finally, the method may include separating the at least partially filled and sealed product bag from the connection line.

In accordance with a tenth exemplary aspect, a system for filling sterile solution product bags may include a clean chamber, a batch filter connected to a feed line, where the feed line is at least partially disposed in the clean chamber, a nozzle coupled to an end of the feed line, and a filling connection assembly disposed in the clean chamber. The assembly may include a first actuator carrying the nozzle, a second actuator carrying a cutting tool. A manifold filter may be at least partially disposed in the clean chamber and may have an inlet operatively coupled to the nozzle. A pump may be coupled to the feed line and configured to pump a fluid through the batch filter, the feed line, the nozzle, and the manifold filter.

In accordance with an eleventh exemplary aspect, a filling connection assembly for a filling machine may include a nozzle holder movable between an extended position and a retracted position. A first actuator may carry the nozzle holder and may be movable along a first axis. A cutting tool may have a blade and may be movable between an extended position and a retracted position. A second actuator may carry the cutting tool and may be movable along a second axis perpendicular to the first axis. A line grip may be movable between an extended position and a retracted position. A third actuator may carry the line grip and may be movable along a third axis perpendicular to the first axis. A clean chamber may house the nozzle holder, the first actuator, the cutting tool, the second actuator, the line grip, and the third actuator.

In further accordance with any one or more of the foregoing first through eleventh aspects, a method and system for producing sterile solution product bags, a method and system for filling sterile solution product bags, a method and system of finalizing sterile solution product bags, and a filling connection assembly for a filling machine may further include any one or more of the following preferred forms.

In a preferred form, the method may include performing a filter integrity test on the first filter.

In a preferred form, at least partially filling one or more of the bladders associated with the plurality of bags may include filling a first bag before filling a second bag.

In a preferred form, the method may include activating a occlusion valve disposed adjacent to the stem of one product bag of the plurality of product bags and movable between a compressed position, in which the occlusion valve compresses the stem of the one product bag preventing fluid from flowing through the stem and into the bladder of the one product bag, and an extended position, in which the occlusion valve releases the stem of the one product bag permitting fluid to flow through the stem and into the bladder of the one product bag.

In a preferred form, controlling fluid flow may include activating one of a plurality of occlusion valves.

In a preferred form, each of the plurality of occlusion valves may be adjacent to one product bag of the plurality of product bags.

In a preferred form, the method may include deactivating the occlusion valve to move the occlusion valve from the extended position to the compressed position after the one product bag is filled with a predetermined amount of fluid.

In a preferred form, at least partially filling one or more of the bladders associated with the plurality of bags may include filling a first product bag when a first occlusion valve is in the extended position and a second occlusion valve is in the compressed position.

In a preferred form, the first occlusion valve may be adjacent to the first product bag and the second occlusion valve may be adjacent to a second product bag.

In a preferred form, at least partially filling one or more of the bladders associated with the plurality of bags may include filling the second product bag when the second occlusion valve is in the extended position and the first occlusion valve is in the compressed position.

In a preferred form, at least partially filling one or more of the bladders associated with the plurality of bags may include priming a first bag set by filling bladders of the first bag set with fluid and distributing air from the second filter into the first bag set.

In a preferred form, at least partially filling one or more of the bladders associated with the plurality of bags may include filling bladders of a second bag set with fluid and calibrating a plurality of product bags of the second bag set by weighing at least one bag of the second bag set and comparing a weight of the at least one bag with a predetermined value.

In a preferred form, at least partially filling one or more of the bladders associated with the plurality of bags may include filling bladders of a third bag set with fluid and performing a filter integrity test on a first filter connected to the third empty bag set.

In a preferred form, the third bag set may include the plurality of bags.

In a preferred form, positioning a manifold assembly may be performed before at least partially filling one or more of the bladders associated with the plurality of bags of the first, second, and third bag sets with fluid.

In a preferred form, positioning a manifold assembly includes suspending the bladder of each of the plurality of product bags in a position where the stem is below the bladder and the first filter is below the plurality of product bags.

In a preferred form, a plurality of occlusion valves may be operatively coupled to the support wall.

In a preferred form, each occlusion valve may be disposed adjacent to one product bag of the plurality of product bags and may be movable between a compressed position, in which the occlusion valve compresses the stem of one product bag to prevent fluid from flowing through the stem and into the bladder of the one product bag, and an extended position, in which the occlusion valve releases the stem of the one product bag to permit fluid to flow through the stem and into the bladder of the one product bag.

In a preferred form, each occlusion valve may have an electromechanically actuated solenoid.

In a preferred form, a plurality of clips may be to the support wall.

In a preferred form, each clip may be coupled to the bladder of one product bag of the plurality of product bags.

In a preferred form, the connection line may be in fluid communication with the stem of each of the plurality of product bags.

In a preferred form, a platform may be between the support wall and the clean chamber.

In a preferred form, the platform may define an opening sized to receive the manifold filter such that the inlet of the manifold filter is disposed in the clean chamber.

In a preferred form, a HEPA filter may filter air flowing through the clean chamber. In a preferred form, the system may include a user interface and a controller.

In a preferred form, the controller may be programmed to prompt a user via the user interface to perform a plurality of steps to operate the system.

In a preferred form, the system may include a plurality filling machines in which the mix bag station may be fluidly connected to each of the plurality of filling machines.

In a preferred form, the plurality of filling machines may be arranged in an efficient configuration, such as a U-shaped configuration.

In a preferred form, the system may include a plurality of filter integrity test machines.

In a preferred form, the ratio of filling machines and filter integrity test machines may be 1:1.

In a preferred form, the system may include multiple mix bags.

In a preferred form, sealing the stem may include creating the seal by applying radiofrequency energy to the location of the stem.

In a preferred form, the method may include aligning a cutting tool at the location between the connection line and each bladder of the at least partially filled product bags such that a blade of the cutting tool is aligned with a center point of the seal formed in the stem of each of the at least partially filled and sealed product bags from the connection line.

In a preferred form, separating may include cutting the stem of each at least partially filled and sealed product bags at the location between the connection line and the bladders, thereby creating a cut in the stem such that the stem is sealed at a first side and a second side of the cut.

In a preferred form, sealing the stem may include creating a hot notched seal.

In a preferred form, separating each of the at least partially filled and sealed product bags may include pulling the stem to tear at the hot notched seal.

In a preferred form, sealing the stem of each at least partially filled product bags may include clamping a sealing tool around the location of the stem and applying radiofrequency energy to the location of the stem.

In a preferred form, the method may include activating an alarm when an inadequate seal is formed in the stem.

In a preferred form, the method may include determining an adequacy of the seal in which the seal is inadequate when at least one of (a) and (b) is detected, where (a) failing to meet a sealing time threshold, and (b) releasing a sealing tool when the power delivered meets established process requirements.

In a preferred form, the method may include displaying a first identifier to begin sealing and displaying a second identifier to stop sealing.

In a preferred form, the method may include sealing the connection line at a second location adjacent to an outlet of the filter, thereby creating a second seal.

In a preferred form, the method may include separating, at the second seal, the filter from the manifold assembly.

In a preferred form, the method may include performing a filter integrity test on the filter after separating the filter from the manifold assembly.

In a preferred form, sealing the stem of each at least partially filled product bags may include sealing a stem associated with the first bag while the second bag is being at least partially filled with fluid.

In a preferred form, the method may include aligning a sealing tool at the location between the connection line and each bladder of the at least partially filled product bags.

In a preferred form, sealing the stem may include creating a seal by applying radiofrequency energy to the location of the stem.

In a preferred form, sealing the stem may include creating a hot notched seal and wherein separating each of the at least partially filled and sealed product bags includes pulling the stem to tear at the hot notched seal.

In a preferred form, the method may include displaying a first identifier to begin sealing and displaying a second identifier to stop sealing.

In a preferred form, a mount may be configured to receive the sealing tool and the cutting tool and align the distal end to a seal location and to align the blade to the seal location.

In a preferred form, a controller may be communicatively coupled to the sealing tool and a user interface may be communicatively coupled to the controller.

In a preferred form, the user interface may be configured to display information sent from the sealing tool to the controller.

In a preferred form, the sealing tool may include a sensor that measures duration of energy applied by the sealing tool when the sealing tool is in the clamped position.

In a preferred form, the controller may be programmed to prompt a user via the user interface to perform a plurality of steps to operate the sealing tool and the cutting tool.

In preferred form, the plurality of steps may include clamp a connection line with the sealing tool and release the clamp from the connection line.

In a preferred form, the sealing means may be separate from the cutting means.

In a preferred form, a mount may be configured to receive the sealing means and the cutting means and align the clamping element of the sealing means to a seal location and to align the blade to the seal location.

In a preferred form, the sealing means may be integrated with the cutting means.

In a preferred form, the sealing means may include a sensor that measures duration of the sealing means when the clamping element applies radiofrequency energy.

In a preferred form, the sealing means may be configured to measure an impedance change between the opposing clamped surfaces.

In a preferred form, the sealing means may turn off the emitted energy of the clamping element when a desired impedance change is met.

In further accordance with any one or more of the foregoing first, second, or third aspects, a method for producing sterile solution product bags, a system for filling sterile solution product bags, and a filling connection assembly for a filling machine may further include any one or more of the following preferred forms.

In a preferred form, coupling the nozzle may include moving the nozzle along a longitudinal axis of the nozzle.

In a preferred form, the nozzle may be sized to sealably couple to a portion of the of the manifold assembly.

In a preferred form, the method may further include opening a sealed end of a connection tube connected to the first filter before coupling the nozzle to the connection tube.

In a preferred form, the sealed end of the connection tube may be disposed between the nozzle and an inlet of the first filter.

In a preferred form, opening the sealed end may include cutting the connection tube at a location between the sealed end and the inlet of the first filter, thereby creating an open end of the connection tube.

In a preferred form, opening the sealed end may include holding the connection tube and moving a cutter, via a side actuator, along a second axis toward the connection tube and removing the sealed end from the connection tube.

In a preferred form, holding the connection tube may include engaging the connection tube with a line grip.

In a preferred form, the line grip may be movable along a third axis by a second side actuator.

In a preferred form, the method may include placing the nozzle in the nozzle holder that is movable along a first axis between a first position and a second position.

In a preferred form, the nozzle holder may be movable by an actuator.

In a preferred form, the method may include removing a cap coupled to the nozzle before coupling the nozzle to the connection line.

In a preferred form, placing the nozzle may include placing the cap into a holder situated above the nozzle holder.

In a preferred form, removing the cap may include moving the nozzle holder between the first position and the second position, and engaging the cap with the holder.

In a preferred form, positioning the manifold assembly may include placing the first filter into a compartment disposed between the support wall and the clean chamber.

In a preferred form, the method may include reversing the pump before decoupling the nozzle from the connection line.

In a preferred form, the nozzle may be movable by the first actuator between an extended position and a retracted position relative to a first axis.

In a preferred form, the cutting tool may be movable by the second actuator between an extended position and a retracted position relative to a second axis.

In a preferred form, the second axis may be perpendicular to the first axis.

In a preferred form, a gripping tool may be carried by a third actuator and may be movable between an extended position and a retracted position relative to a third axis.

In a preferred form, the third axis may be perpendicular to the first axis.

In a preferred form, the gripping tool may include an opening sized to receive a portion of a connection tube connected to the inlet of the manifold filter.

In a preferred form, the cutting tool may include a blade.

In a preferred form, the gripping tool may include a slot sized to receive the blade of the cutting tool when the second actuator is in the extended position and the third actuator is in the extended position.

In a preferred form, a platform may be between the support wall and the clean chamber.

In a preferred form, the platform may define an opening sized to receive the manifold filter.

In a preferred form, a protective door may cover the opening and may be rotatable relative to the opening.

In a preferred form, a cap removal tool may be removably disposed within the opening.

In a preferred form, the assembly may include a support wall disposed above the clean chamber and a manifold assembly removably coupled to the support wall.

In a preferred form, the manifold assembly may include a plurality of product bags and a connection line in fluid communication with the plurality of the product bags.

In a preferred form, the manifold filter may include an outlet fluidly coupled to the plurality of bags.

In a preferred form, the line grip may include an opening sized to receive a connection tube and may rigidly support the connection tube when the line grip is in the extended position.

In a preferred form, the line grip may include a slot sized to receive the blade of the cutting tool when the cutting tool is in the extended position.

In a preferred form, the second actuator may carry an angled chute disposed below the blade of the cutting tool.

In a preferred form, a cap removal tool may be disposed above the nozzle holder.

In a preferred form, the cap removal tool may include a first opening and a second opening orthogonal to the first opening.

In a preferred form, the first and second openings may be different sizes.

BRIEF DESCRIPTION OF THE DRAWINGS

FIGS. 37A and 37B are perspective views of an exemplary system for conducting a filter integrity test in accordance with the teachings of the present disclosure.

DETAILED DESCRIPTION

Figure 1:
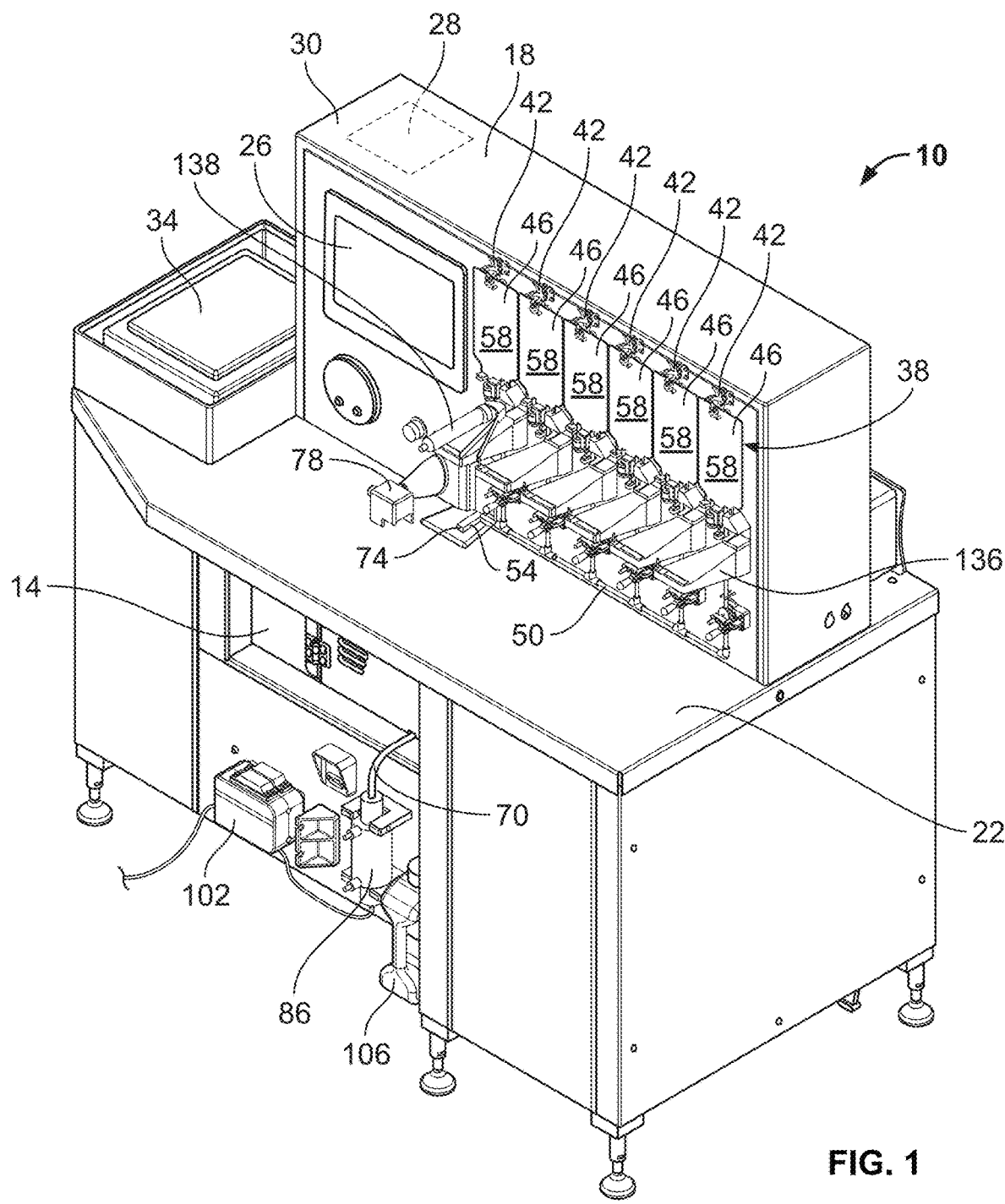
FIG. 1 is a perspective view of a sterile solution product bag filling machine assembled in accordance with the teachings of the present disclosure.
Figure 2:
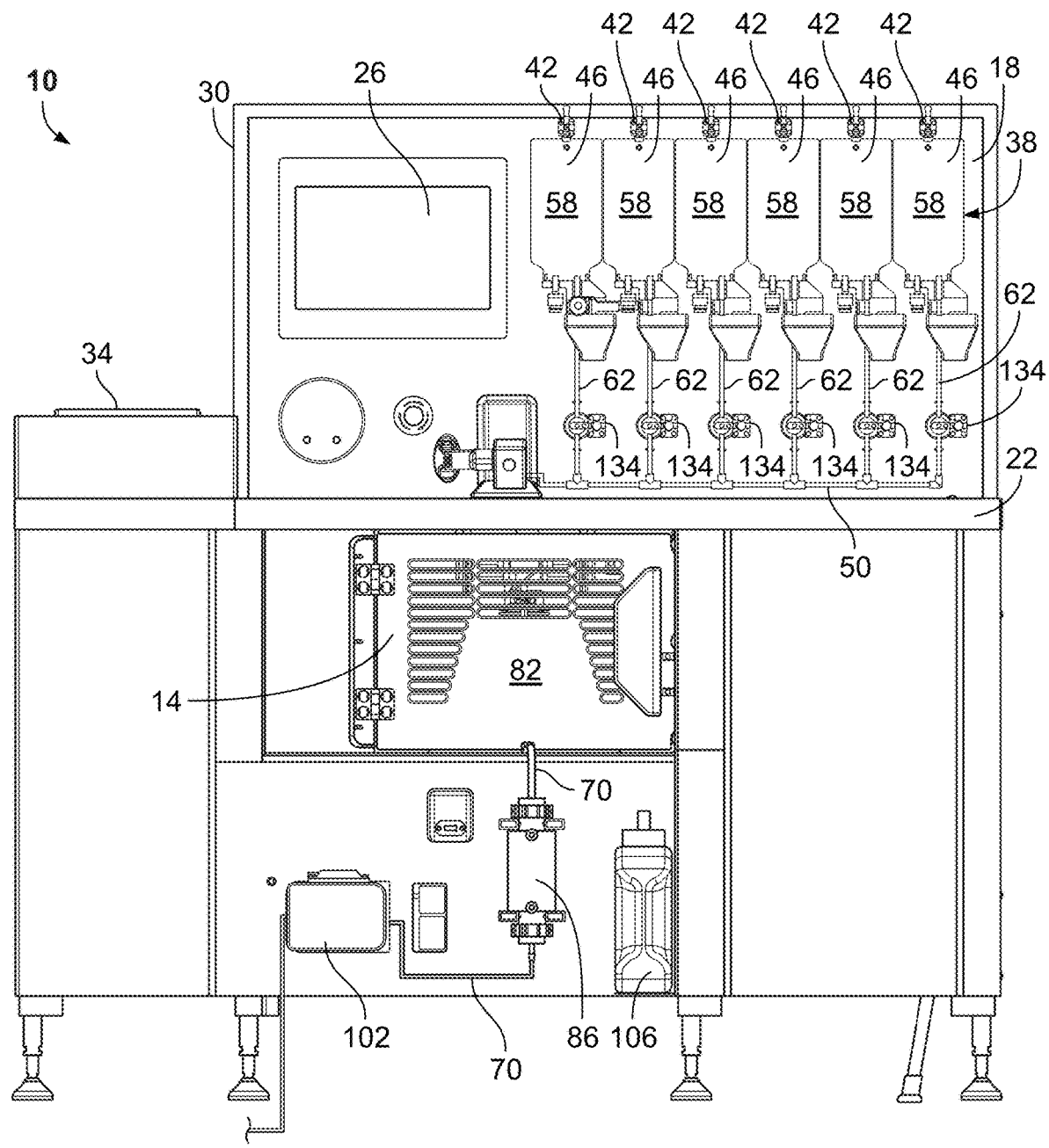
FIG. 2 is a front view of the machine of FIG. 1.
Figure 3:
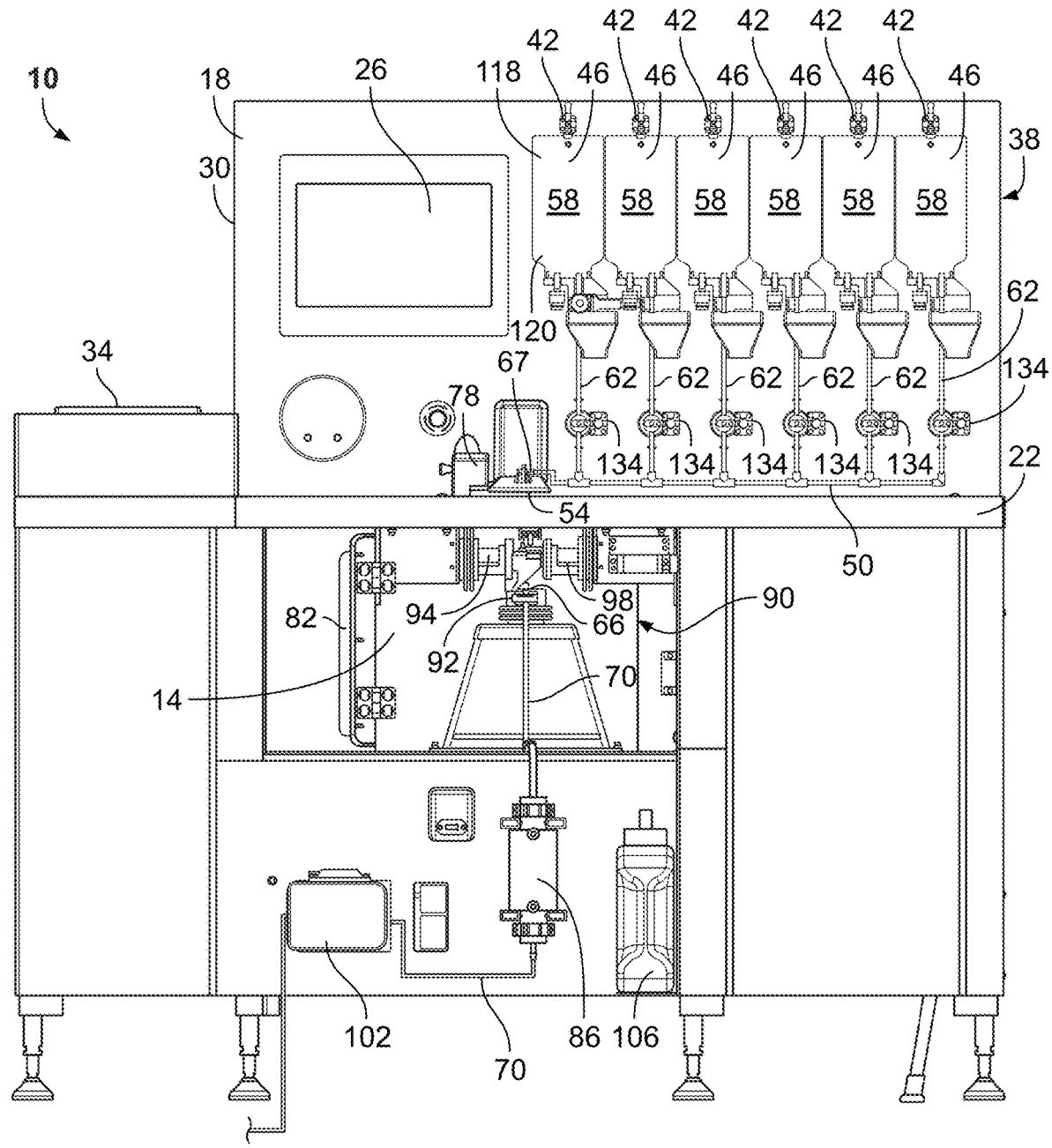
FIG. 3 is a front view of the machine of FIG. 1 with a clean chamber door open.

In FIGS. 1-3, a machine 10 for filling sterile solution product bags is constructed in accordance with the teachings of the present disclosure. The machine 10 includes a clean chamber 14, a support wall 18 disposed above the clean chamber 14, and a platform 22 disposed between the clean chamber 14 and the support wall 18. A user interface 26 is mounted to the support wall 18 and an on-board central processing unit (CPU) 28 is communicatively coupled to the interface 26 and is protected by a housing 30 of the machine 10. A scale 34, which is in communication with the CPU 28, is disposed adjacent to the support wall 18 and on top of the platform 22. However, in other examples, the scale 34 may be located elsewhere relative to the machine 10. The machine 10 is mobile to permit an operator to move the machine 10 easily, however, in other examples, the machine 10 may be semi-permanently or permanently installed or otherwise configured so that the machine 10 may be easily moved to a desired position such as being mounted on wheels.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As shown in FIGS. 1-4, a first exemplary manifold assembly 38 is mounted to the support wall 18 in an upside-down configuration. The manifold assembly 38 is removably coupled to the support wall 18 by a plurality of hooks (e.g., a spring-forced latch) 42 located at an upper end of the machine housing 30. The manifold assembly 38 includes a plurality of product bags 46, a connection line 50, and a manifold filter 54. As described in more detail below, each product bag 46 includes a bladder 58 and a stem 62 connected to the bladder 58. Each stem 62 has a first end 63 in fluid communication with the bladder 58 of one product bag 46 and a second end 64 in fluid communication with the connection line 50. The connection line 50 is in fluid communication with each of the stems 62 of the plurality of the product bags 46, and is perpendicularly situated relative to each stem 62. The manifold assembly 38 is a closed system that is pre-sterilized such that the filter, filter housing, and any fluid contact surface downstream of the filter is sterile.

Like the manifold assembly 38, the manifold filter 54 is disposed in an upside-down configuration such that an inlet 65 of the manifold filter 54 faces downward. The manifold filter 54 includes the inlet 65 and an outlet 67 where the inlet 65 is operatively coupled to a nozzle 66 of a feed line 70 when the nozzle 66 is coupled to the manifold assembly 38. The outlet 67 of the manifold filter 54 is operatively coupled to the connection line 50 of the manifold assembly 38 such that all fluid flowing through the connection line 50 has already passed through the manifold filter 54. Preferably, when the manifold filter 54 is coupled to the machine 10, the inlet 65 is disposed in the clean chamber 14 and the outlet 67 is disposed above the platform 22.

The filter material of the manifold filter 54 may be a fibrous material designed and rated to be a sterilizing grade filter. In one example, the fibrous material may be produced with a porosity of 0.2 microns (µm). In other examples, the porosity of the fibrous material can vary to address filtration requirements. By way of example, the porosity can be less than 0.2 microns. Other versions of sterilizing grade filters are also contemplated. The filter pore size of the manifold filter 54 effectively sterilizes the solution and removes non-viable contaminants. By way of example, the porous membrane material can be treated such as to impart a static electrical charge to the membrane in order to further facilitate removal of viable and non-viable content from the fluid being filtered. The manifold assembly 38 is not limited to the example illustrated in FIGS. 1-4, but may have a different manifold assembly configuration having a filtering capacity and that adequately sterilizes the solution and removes non-viable contaminants in the solution. Sterilization and contaminant removal requirements as it relates to filter pore size may vary according to the fluid being processed.

The clean chamber 14 is enclosed by a slotted door 82 and is shown in a closed position in FIG. 2 and in an open position in FIG. 3. Depicted in FIG. 3, the feed line 70 is coupled to the nozzle 66, is at least partially disposed in the clean chamber 14, and extends outside of the clean chamber 14 to connect to a batch filter 86. Also disposed in the clean chamber 14 is the nozzle 66 and a connection assembly 90 including a nozzle holder 92, a cutting tool 94, and a support tool 98 (also referred herein as a "line grip"). The connection assembly 90 may be an automated process of the machine 10 to prevent touch contamination during the connection of the nozzle 66 to the manifold assembly 38. The clean chamber 14 is kept "clean" by continuously passing air through a HEPA filter disposed in the back of the clean chamber 14 to form a laminar flow from the rear of the chamber through the slots in the slotted door 82 when in the closed position. A filter train is partially depicted in FIG. 3 and includes the feed line 70 and the batch filter 86. The feed line 70 extends from the batch filter 86 and makes a sterile connection at a valve port with a mix tank.

"Clean" or "clean air," in the context of cleanroom environments, for example can be defined by one of two standards used to test and categorize the class of air. These two standards include the United States Federal Standard 209E and the International Standard ISO 14644-1. Both standards define terms, identify procedures for collecting and testing the air, and provide the statistical analysis required to interpret the data. Federal Standard 209E classifications of air include Class 1, Class 10, Class 100, Class 1,000, Class 10,000, and Class 100,000. The class number (e.g., 100) is the maximum allowable number of particles 0.5 microns and larger per cubic foot of air; the lower the number, the cleaner the air. The ISO classifications are rated as ISO Class 1, ISO Class 2, ISO Class 3, etc. through ISO Class 9. Class 1 under both standards indicates the cleanest, ultrapure air. The ISO Class 2 correlates most closely to Federal Standard Class 100. Therefore, in accordance with the present application, "clean" or "clean air" can include, for example, any air classified in the range of classes from class 100 to class 100,000 under US Federal Standard 209E and, in one embodiment, in the range of classes from class 10,000 to class 100,000 under US Federal Standard 209E or Grade A under European classification system of "Grade" air.

Below the clean chamber 14, a pump 102, such as a peristaltic pump, is coupled to the feed line 70 of the filter train and is configured to selectively pump a solution from a mix tank through the batch filter 86, the feed line 70, the nozzle 66, the manifold filter 54, the connection line 50, and into each of the plurality of product bags 46. Also below the chamber 14, a receptacle 106 is attached to the machine 10 and is positioned to collect any waste from the clean chamber 14 (such as solution leaked at the nozzle 66 or manifold filter 54). As referred herein, the term "solution" is a fluid, such as saline and/or any type of fluid medicinal product. The solution, in this example, is mixed in a mix bag or tank, which may be sterile and single-use, in the same facility, and in some cases, the same room as the filling machine 10. The solution may be mixed in a system such as the mix bag system disclosed in U.S. patent application Ser. No. 16/392,074 filed Apr. 23, 2019, the contents of which are incorporated entirely by reference. The solution may also be mixed in a pharmaceutical solution mixing vessel found in many pharmaceutical solution production facilities. For example, the mix tank may have a disposable container or may have an impeller to mix the solution. In some examples, the mix tank may be a stainless steel pharmaceutical grade mix tank.

Figure 4:
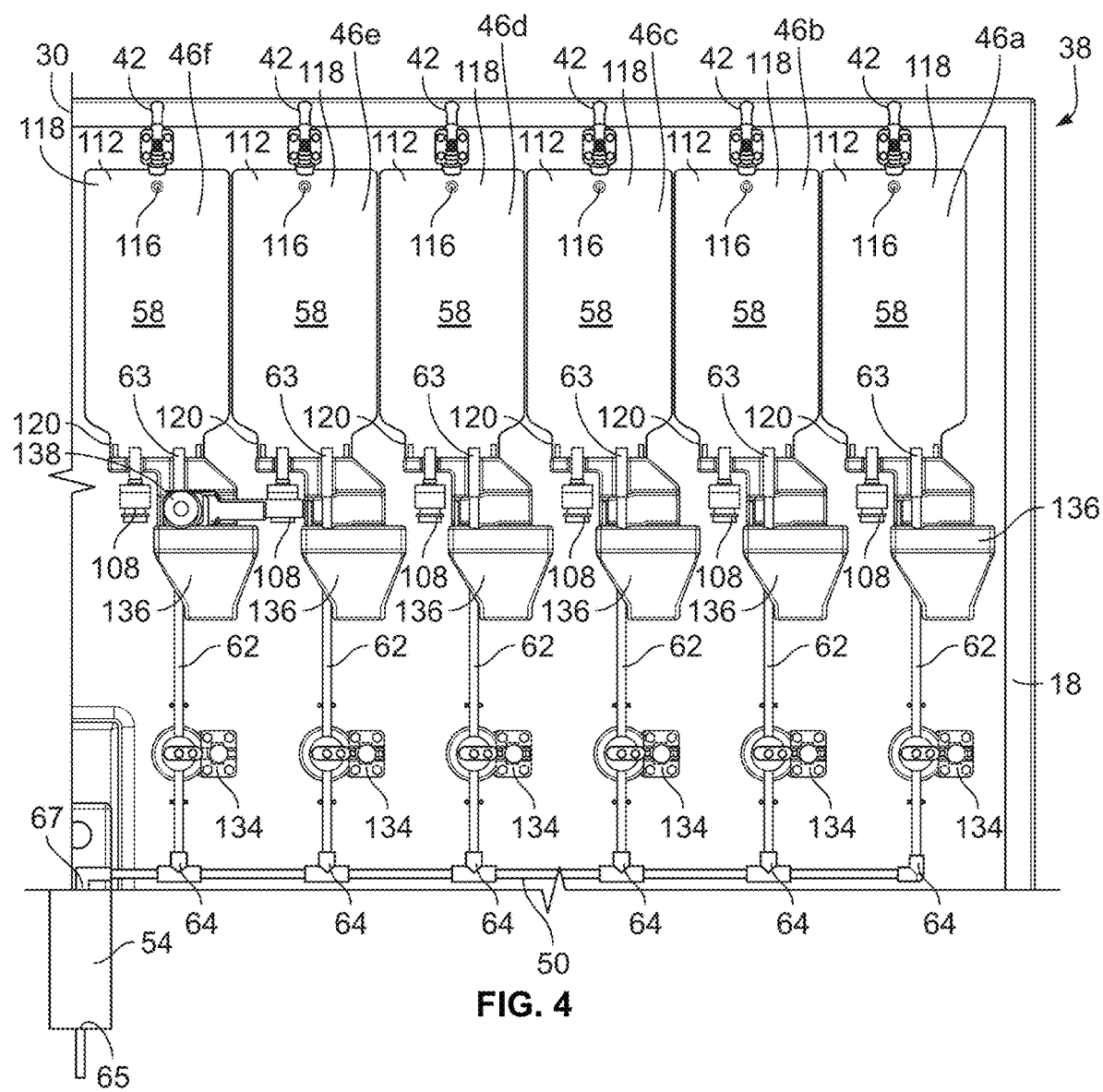
FIG. 4 is a front, magnified view of a first exemplary manifold assembly attached to the machine of FIG. 1 and with a sealing tool in position.

In FIG. 4, the support wall 18 and the first exemplary manifold assembly 38 are more clearly illustrated. The manifold assembly 38 includes six product bags 46a, 46b, 46c, 46d, 46e, 46f where each product bag 46 is attached to the support wall 18 by the spring-force latch 42, or in other examples, a different hook, mounting pin, or other removable fastener. Each product bag 46 includes the bladder 58, the stem 62, and a sealed or plugged administration or medication port 108. The bladder 58 is a fillable pouch that can have a standard volume capacity with an interior that is pre-sterilized. At least partially surrounding a perimeter of the fillable pouch is a sealed border 112 having an aperture 116 configured to receive the spring-force latch 42, hook, or mounting pin for mounting the bag 46 to the support wall 18 of the machine 10. In particular, the aperture 116 is formed at a first end 118 of the product bag 46, and the bladder 58 is fluidly connected to the stem 62 at an opening at a second end 120 of the bladder 58. While the illustrated manifold assembly 38 includes six product bags, other exemplary manifold assemblies 38 may have more or fewer than six product bags.

The CPU 28 may be programmed to store data for each batch of viable product bags 46 that have been filled and tested for sterility. Before filling, an operator may enter a serial number associated with the manifold assembly 38 into the CPU 28 via the user interface 26 to store type of solution, solution expiration, filling date and location, fluid conductivity and integrity results, and other information pertaining product bags 46. In other examples, each batch of filled product bags 46 may be serialized with a barcode, QR code, RFID tag or other identifier to identify critical information related to the filled bag 46 with or without the use of the CPU 28.

The manifold assembly 38 is positioned above the nozzle 66 so that the pump 102 works against gravity to fill each product bag 46. The connection line 50, which is disposed below the plurality of bags 46, is in fluid communication with the inlet of each bladder 58 of the plurality of product bags 46 via the stem 62. The connection line 50 is connected to the stems 62 of each product bag 46, and each stem 62 is clamped in vertical alignment to the support wall 18 by a wall clamp or a occlusion valve 134. Above the occlusion valves 134 and below each product bag 46, a plurality of shelving units 136 protrude from the support wall 18 to provide a stable mount for each of the sealing and cutting tools 138, 174. For example, in FIGS. 1-4 a sealing tool 138 is placed below the sixth bag 46f (in FIG. 4) and rests on the shelving unit 136 below the bag 46f.

In FIG. 4, a plurality of occlusion valves 134 are arranged to couple to the stems 62 of the plurality of product bags 46. Each occlusion valve 134 is movable between a compressed position and an extended position to, respectively, prevent and allow air and/or fluid to flow through the stem 62 and into the product bag 46. In the compressed position, the occlusion valve 134 compresses the stem 62 of the associated product bag 46 to prevent air and/or fluid from flowing through the stem 46 and into the bladder 58. In the extended position, the occlusion valve 134 releases the compression of the stem 62 of the associated product bag 46 and permits air and/or fluid to flow through the stem 62 and into the bladder 58 of the associated product bag 46. When one occlusion valve 134 is in the extended position, fluid and/or air may flow into the associated product bag 46 and the remaining occlusion valves 134 are in compressed positions. This ensures that only one product bag 46 is filled at a time and in particular order. After the filling process for a given bag 46 is complete, each of the occlusion valves 134 returns to the compressed position.

Figure 5:
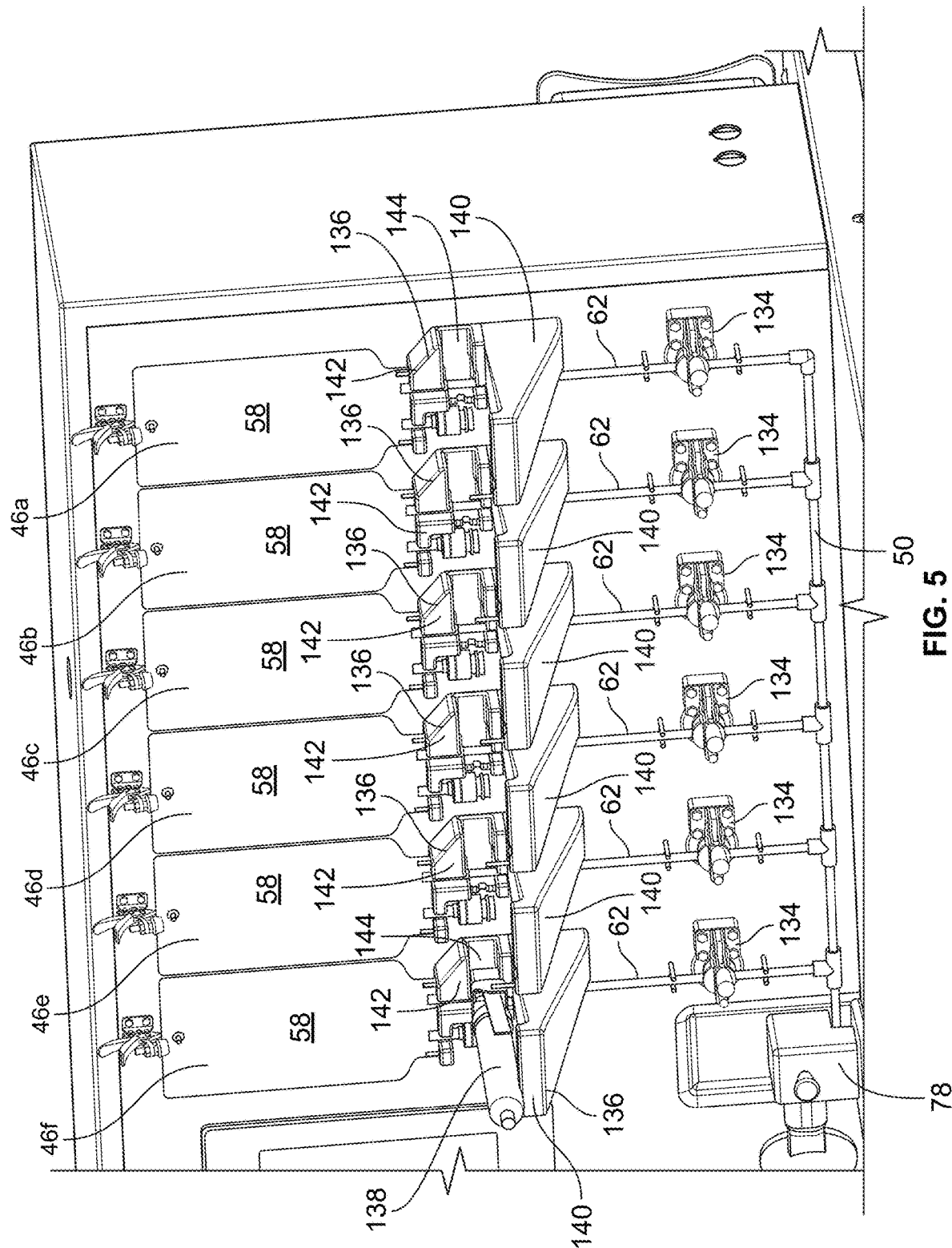
FIG. 5 is a perspective view of the manifold assembly attached to the machine of FIG. 4.

Shown in greater detail in FIG. 5, the sealing tool 138 is coupled to one of the plurality of shelving units 136 of the machine 10. Each of the plurality of shelving units 136 includes a protruding platform 140 and a stem grip 142 disposed over the platform 140 and configured to grip a portion of the second end 120 of the product bag 46. The stem grip 142 extends downward towards the platform 140 and provides a notch 144 that is sized to receive and accurately register a head (also referred herein as a "clamp" of the sealing tool and a "stop" of the cutting tool 174) of both the sealing tool 138 and a cutting tool 174. When resting on the platform 140 and snapped into the notch 144 of the shelving unit 136, the sealing tool 138 is in position to make a wide seal without relying on the placement accuracy of an operator. The operator need only slide the sealing tool 138 onto the platform 140 toward the support wall 18, slide the head or clamp of the sealing tool 138 toward the stem 62 and into a registration position within the notch 144, and activate the sealing tool 138 to make an accurately positioned seal. Activating the sealing tool 138 may include, for example, emitting radiofrequency (RF) energy into the material of the stem 62 to seal. The configuration of the platform 140 and notch 144 of the shelving unit 136 is shaped and sized to receive and register a cutting tool 174 in the same or similar way as the sealing tool 138 to ensure that the cutting tool 174 is in proper alignment with the wide seal made by the sealing tool 138. When placed on the platform 140 and snapped into the notch 144, the cutting tool 174 is in place to make an accurately positioned cut to separate the sealed and filled product bag 46 from the connection line 50. The connection line 50 and the stem 62 attached to the product bag 46 are both sealed because of the wide seal and cut centered relative to the seal.

Figure 6:
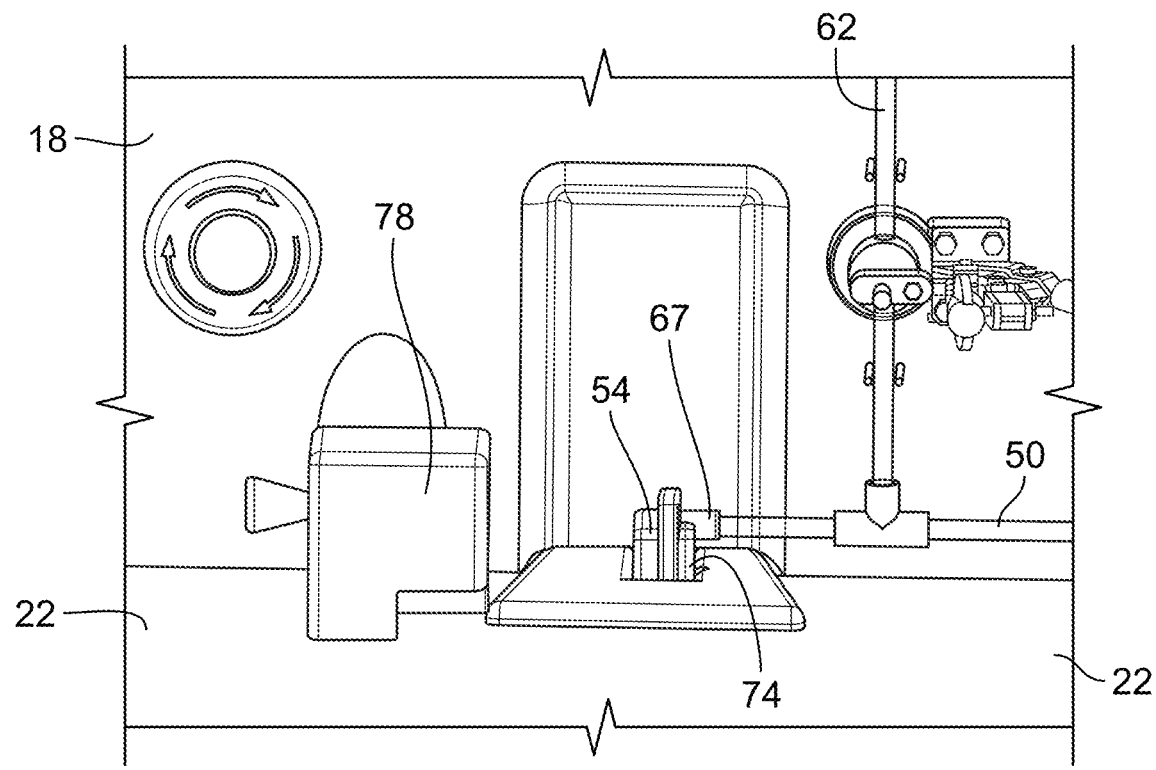
FIG. 6 is a front, magnified view of the machine of FIG. 1, showing a filter attached to the manifold assembly and a protective door in an open position and assembled in accordance with the teachings of the present disclosure.
Figure 7:
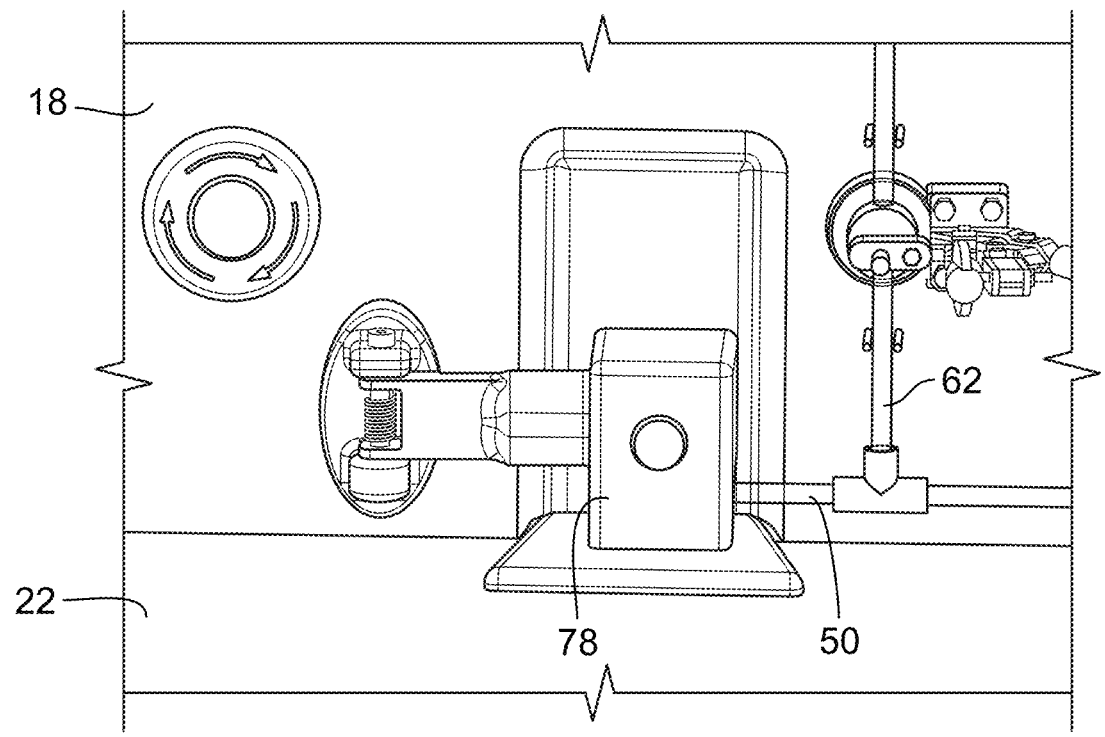
FIG. 7 is a front, magnified view of the machine of FIG. 6, showing the protective door in a closed position.
Figure 8:
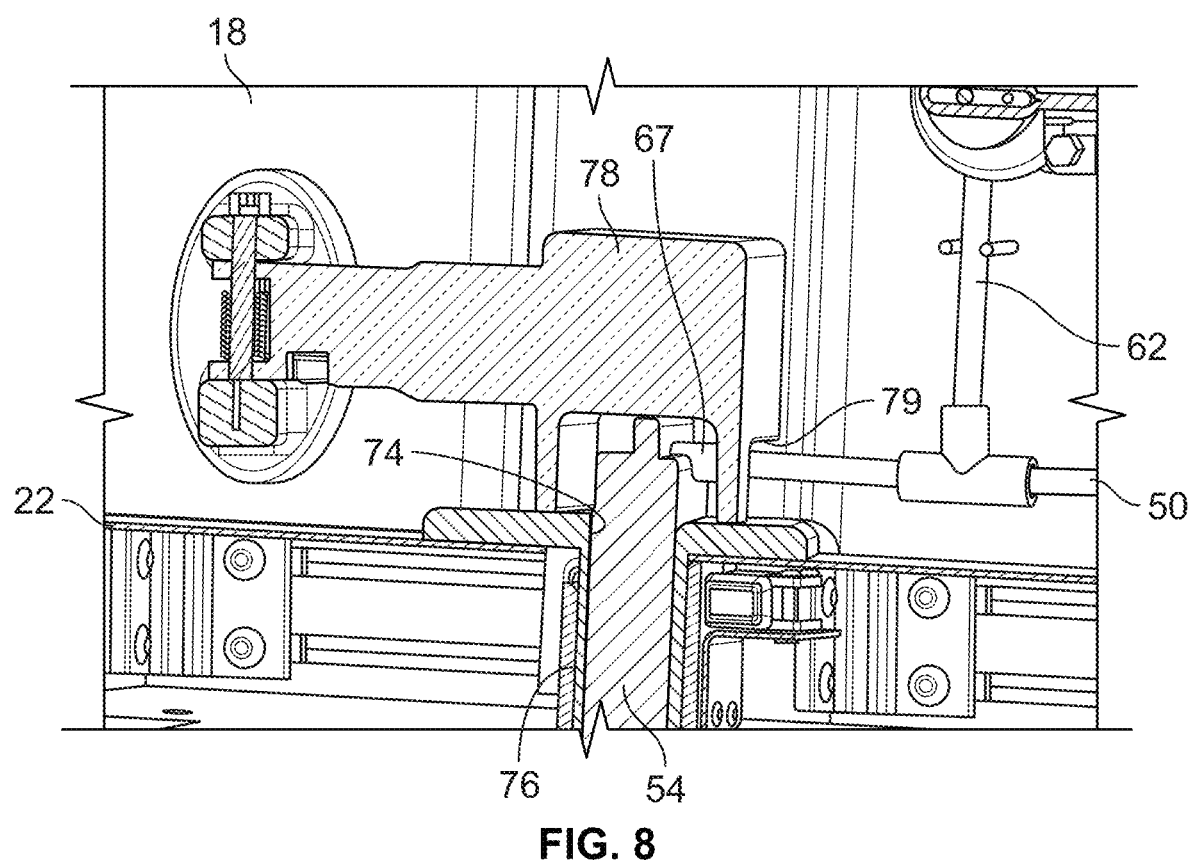
FIG. 8 is a cross-sectional view of the filter and the protective door of FIG. 7 in the closed position.

In FIGS. 1 and 6-8, the platform 22 is clearly illustrated. In addition to providing a table-top surface for temporarily placing items not yet in use (e.g., the manifold assembly 38, a sealing tool 138, a cutting tool 174) when operating the machine 10, the platform 22 includes an opening 74 in which the manifold filter 54 is removably disposed. The opening 74 is protected by a hinged, protective door 78 that swings to an open position, as shown in FIG. 6, to access the manifold filter 54, and a closed position, as shown in FIGS. 7 and 8, to register the manifold filter 54 and, in a preferred embodiment, protect the clean chamber 14 from the surrounding environment. The hinged door 78 includes a notch 79 sized so that the door 78 does not interfere with the connection between the outlet 67 of the manifold filter 54 and the connection line 50. The hinged door 78 also provides a rigid support to a top portion of the manifold filter 54 such that the filter 54 remains in place when for example, the nozzle 66 couples to the inlet 65 of the filter 54.

In FIG. 8, a compartment 76 defines the opening 74 and the opening 74 is configured to receive the particular shape and size of the manifold filter 54 such that when the manifold filter is inserted downward into the opening and registered within the compartment 76, at least part of the manifold filter 54 is disposed above the platform 22 and at least another part of the manifold filter 54 is disposed below the platform 22 and in the clean chamber 14. To remove and replace the manifold filter 54 between filling phases, an operator need only open the hinged door 78, lift the manifold filter 54 out of the opening 74, slide a new manifold filter 54 into the opening 74, and close the door 78. In some examples, the opening 74 is sized to receive a cartridge capable of holding and containing a number of different sized filters.

Figure 9:
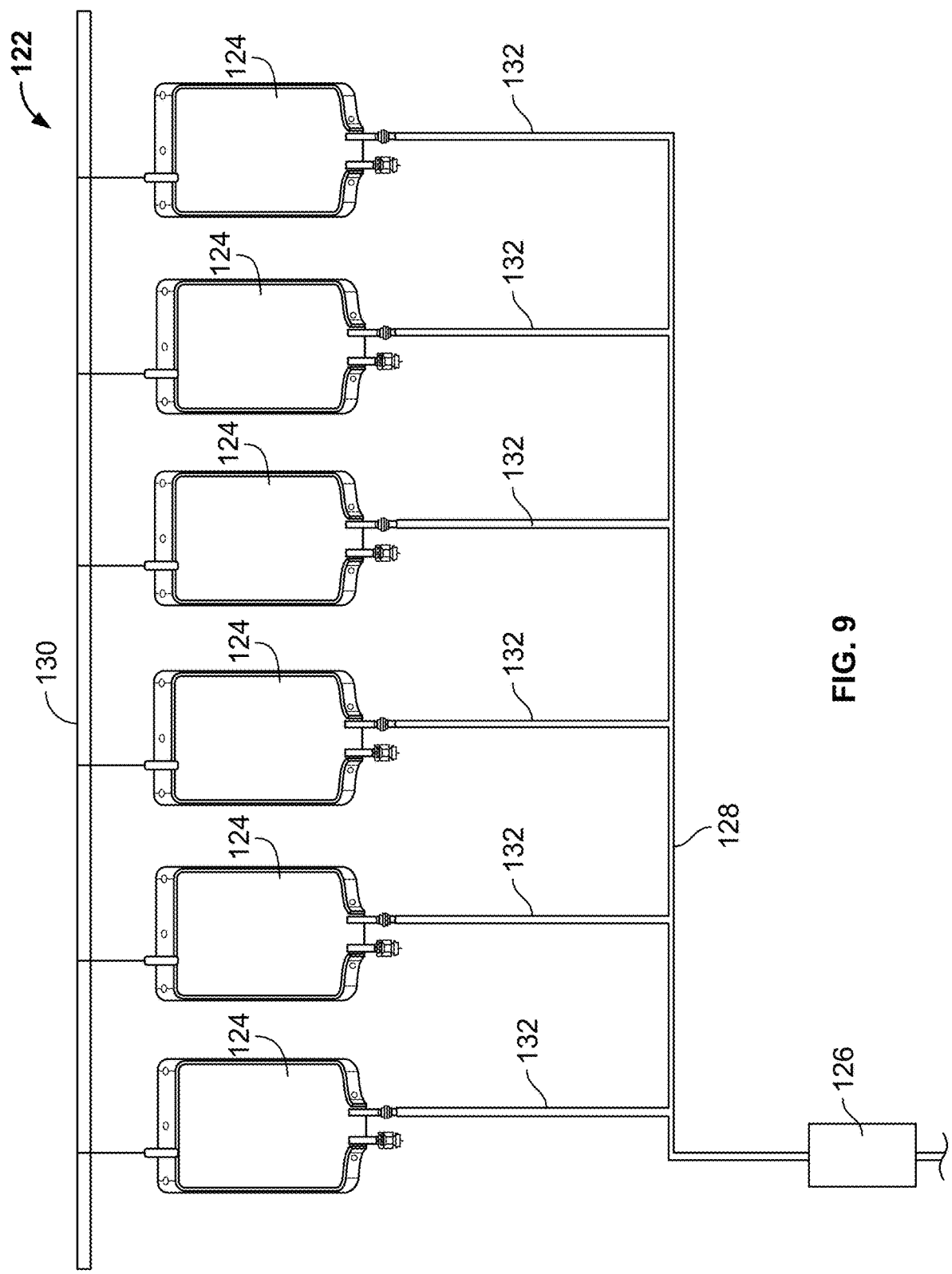
FIG. 9 is a front view of a second exemplary manifold assembly assembled in accordance with the teachings of the present disclosure.

In FIG. 9, a second exemplary manifold assembly 122 that may be used with the machine 10 of FIGS. 1-3 is constructed in accordance with the teachings of the present disclosure. The second exemplary manifold assembly 122 is similar to the first exemplary manifold assembly 38, and includes a plurality of product bags 124, a manifold filter 126, and a connection line 128 in fluid communication with the product bags 124 and the manifold filter 126. The second exemplary manifold assembly 122 differs from the first exemplary manifold assembly 38 in its connection to the support wall 18. As shown in FIGS. 1-4, each product bag 46 of the first exemplary manifold assembly 38 is secured to the support wall 18 by clamping the spring-force latch 42 at least partially through the aperture 116 of the product bag 46. In the second exemplary manifold assembly 122 of FIG. 9, each product bag 124 is pre-assembled to a suspension bar 130 so that each bag 124 is evenly spaced apart to ensure that each corresponding stem 132 is in vertical alignment (i.e., perpendicular relative to the connection line 128). An operator need only align the suspension bar 130 to the support wall 18 and secure the suspension bar 130 to one or more fasteners or hooks of the machine 10. In this example, the second exemplary manifold assembly 122 obviates the need to individually clamp each bag 124 to the support wall 18. Each of the bags 124, once filled, remains attached to the suspension bar 130 to facilitate removal of the manifold assembly 122 from the machine 10. All other features of the second exemplary manifold assembly 122 may be the same or similar as the first exemplary manifold assembly 38.

Figure 33:
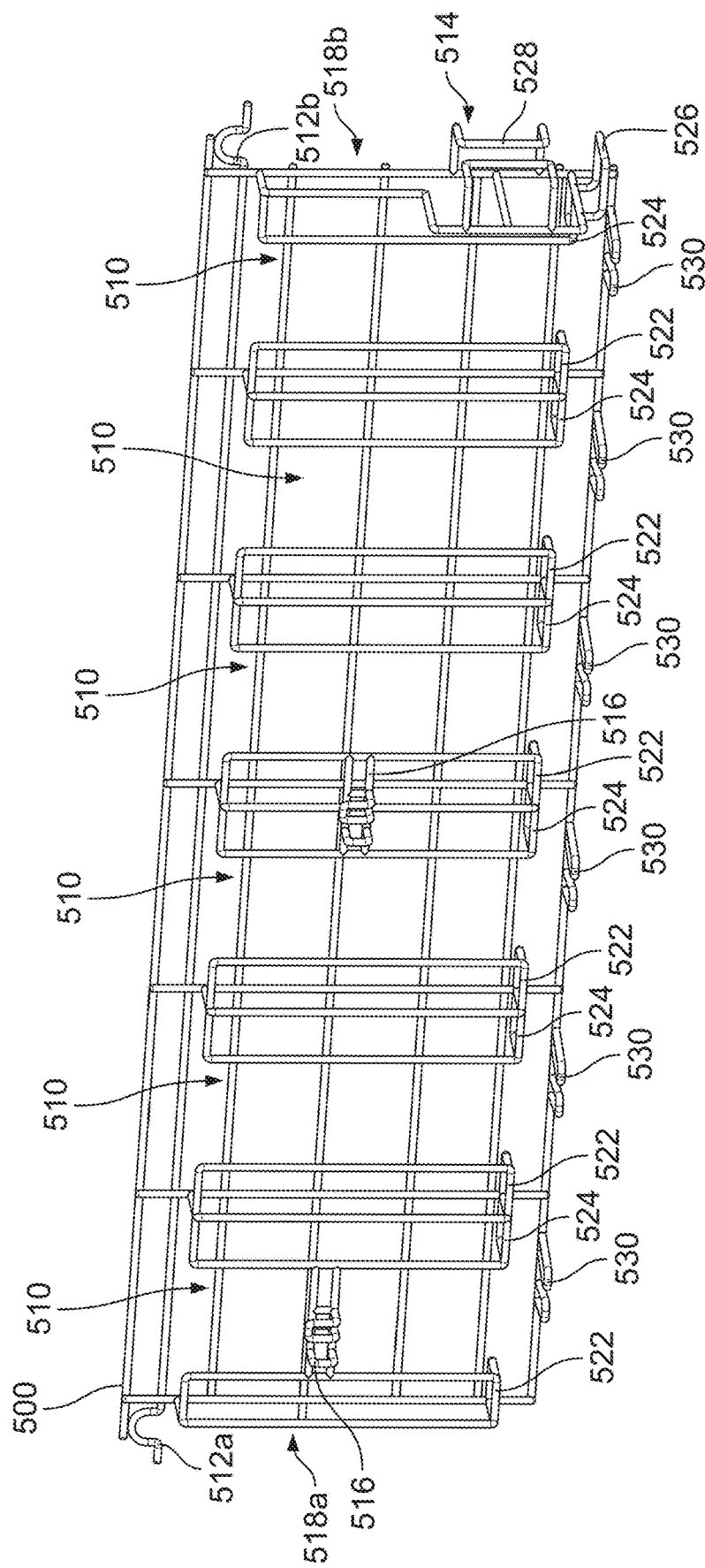
FIG. 33 is a perspective view of a bracket for holding a manifold assembly assembled in accordance with the teachings of the present disclosure.
Figure 34:
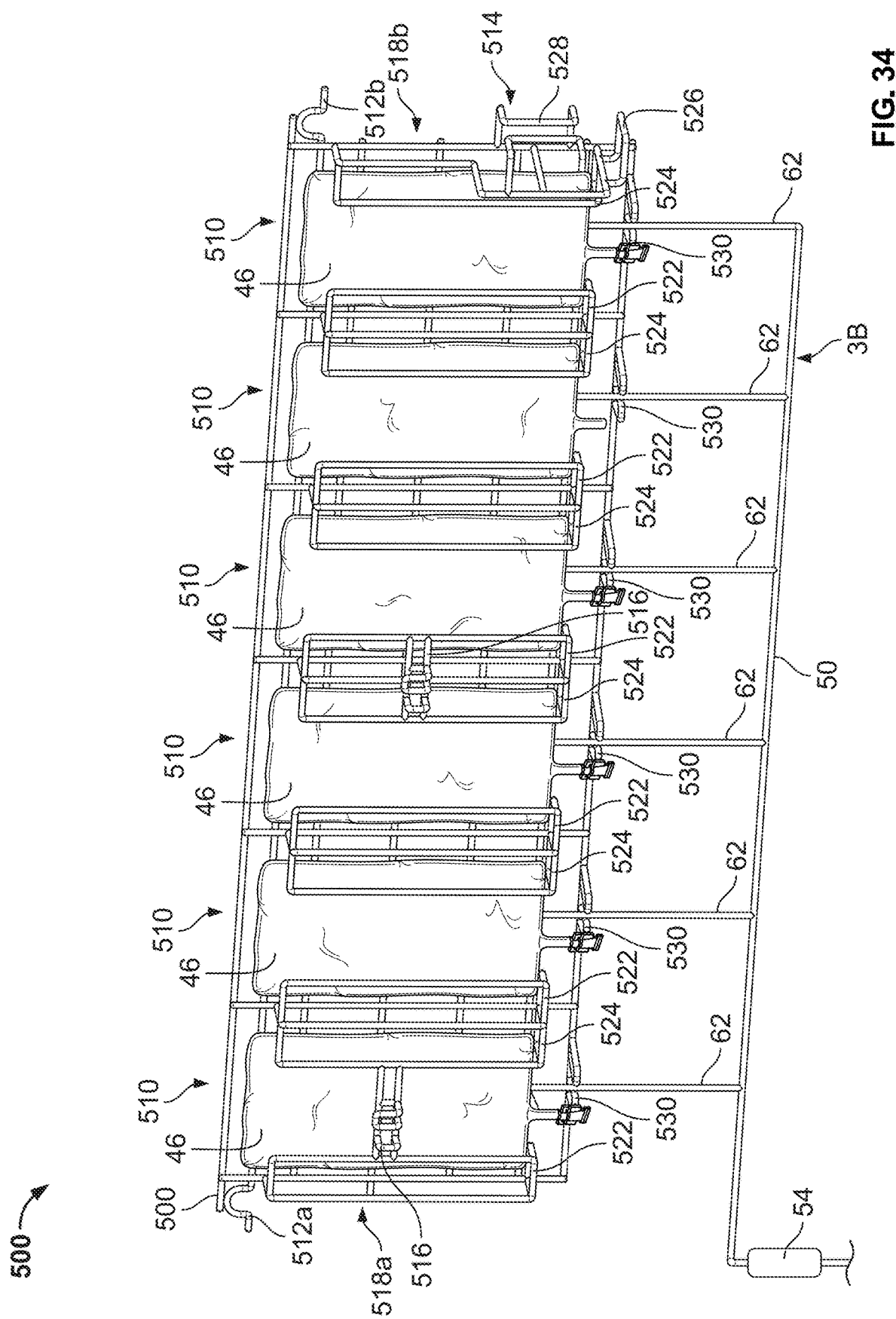
FIG. 34 is a perspective view of the first exemplary manifold assembly loaded onto the bracket of FIG. 33.

Turning to FIG. 33, a bracket 500 for holding a manifold assembly 38 is constructed in accordance with the teachings of the present disclosure. The bracket 500 is a wire frame for receiving, storing, and mounting a manifold assembly 38. The bracket 500 defines a plurality of bag compartments 510, a first hook 512*a* and a second hook 512*b*, a filter compartment 514, and a tubing hook 516. The bracket 500 may be loaded with a manifold assembly 38, as shown in FIG. 34, and then attached to the support wall 18 of the machine of FIGS. 1-3. The bracket 500 may also be attached first to the support wall 18, and then the manifold assembly may be loaded onto the bracket 500. The bracket 500 is arranged to receive a six-bag manifold assembly 38, however, in other examples, the bracket 500 may be arranged to receive more or fewer product bags 46.

In FIGS. 33 and 34, the bracket 500 includes the first hook 512*a* and the second hook 512*b*. As shown, the first hook 512*a* and the second hook 512*b* are disposed on first lateral end 518*a* and second lateral end 518*b*, respectively. Each hook 512*a* and 512*b* is configured to latch onto a tab (shown in FIG. 35) disposed on the support wall 18 of the machine 10 or a rod (shown in FIG. 36) of a storage rack. As a result, the entire bracket and loaded manifold assembly 500 may be easily transferred from the machine 10 to storage or vice versa.

The bracket 500 defines a plurality of bag compartments 510 for holding and supporting a plurality of product bags 46. In this example, the bracket 500 defines six adjacent compartments for receiving a manifold assembly 38 with six or fewer product bags 46. Each compartment 510 is sized to receive at least one product bag 46. The product bag 46 is supported at a lower portion of the bag 46 by a first wireframe retaining member 522 and a second wireframe retaining member 524 disposed on either side of the compartment 510. The first and second wireframe retaining members 522 and 524 include a horizontal ledge and a vertical wall to retain the product bag 46 in the bladder compartment 510. As a result, the product bag 46 is not suspended from the top of the bag 46 by a latch or hook.

The bracket 500 also includes the filter compartment 514 on the second lateral end 518*b* of the bracket 500. The filter compartment 514 includes a horizontal retaining member 526 and a vertical retaining member 528. The filter compartment 514 provides easy storage for a filter 54 after each of the bladders 58 have been filled. While the filter compartment 514 is disposed on the second lateral end 520*b* of the bracket 500, in another example, the filter compartment 514 may be formed on the first lateral end 520*a*.

Additionally, as shown in FIG. 34, the bracket 500 includes various slots and hooks for managing tubing of the manifold assembly 38. For example, a plurality of two-prong guides 530 are disposed below and between the compartments 510 of the bracket 500. When assembling the loaded bracket 500 to the machine 10, the stem 62 of each product bag 46 is placed in a slot of the two-prong guide 530. The guides 530 help align the stems 62 of the manifold assembly 38 and to avoid any kinks or bends in the tubing, thereby ensuring efficient and accurate filling. Each guide 530 is placed below the port of each stem 62 so that the stems 62 hang straight from the product bags 46.

The bracket 500 also includes one or more tubing hooks 516. The tubing hooks 516 are used to help store the manifold assembly 38 after each stem 62 is sealed and cut. The tubing hooks 516 support the sealed connection line 50 with each sealed and cut stem 62. In this way, even after the connection line 50, stems 62, and filter 54 are separated from the filled product bags 46, all parts of the manifold assembly 38 can remain attached to the bracket 500 until after a filter integrity test is performed on the filter 54. In the illustrated example of FIG. 34, the bracket 500 includes two tubing hooks 516 approximately located at a mid-point of the product bags 46. However, in other examples the bracket 500 may include more or fewer tubing hooks 516. For example, in FIG. 35, the bracket 500 includes three tubing hooks 516 equally spaced along a length of the bracket 500 and closer to the guides 530.

Figure 35:
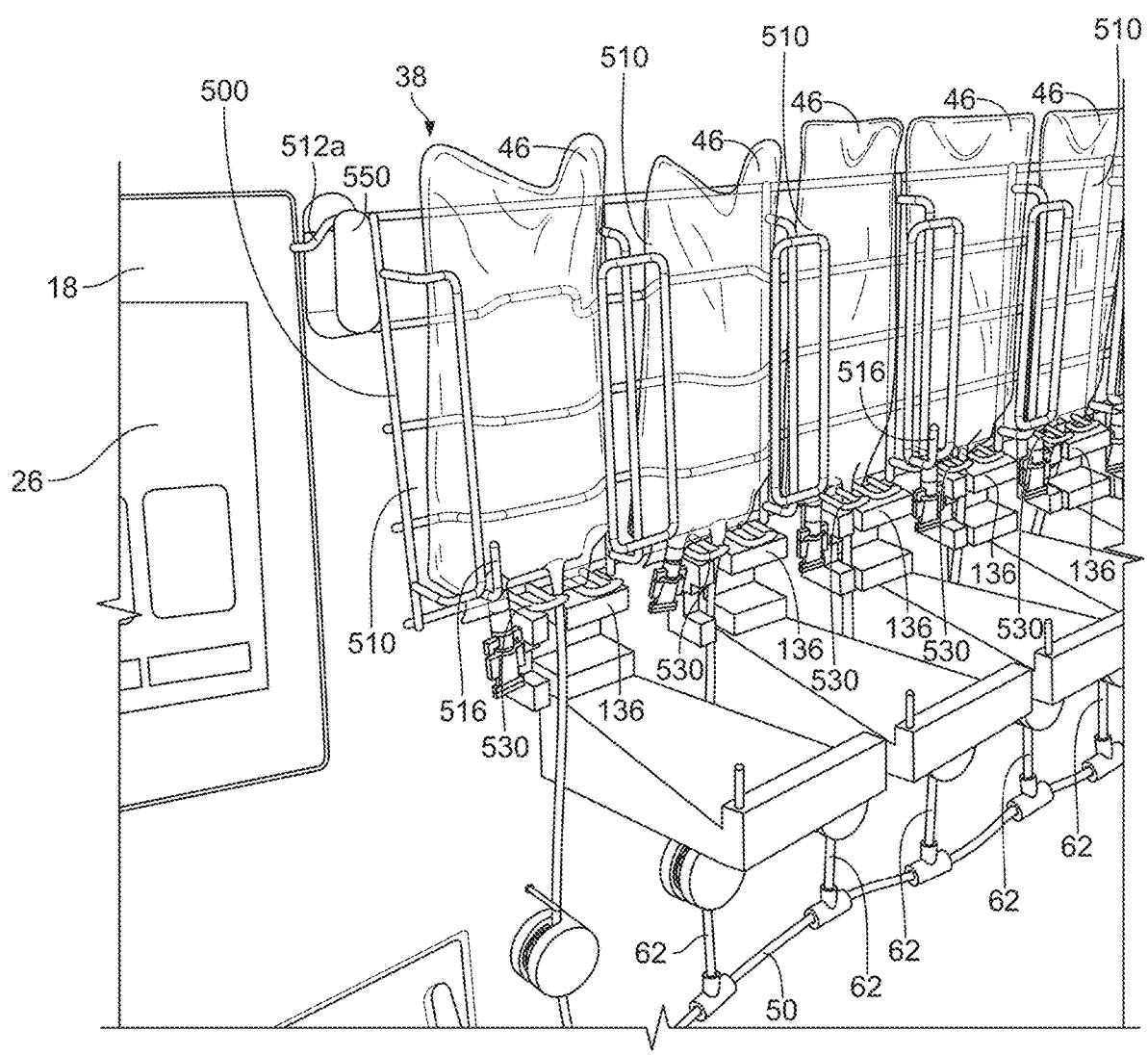
FIG. 35 is a perspective view of the loaded manifold bracket attached to the machine of FIG. 3.

Shown in greater detail in FIG. 35, the bracket 500 loaded with the manifold assembly 38 is assembled on the machine 10. A tab 550 on the support wall 18 receives the first hook 512a, and on the opposite end of the bracket 500, a second tab receives the second hook 512b of the bracket 500. Accordingly, an operator may easily and quickly install the loaded bracket 500 on the machine 10 by simply positioning the bracket 500 onto the tabs 550 of the support wall 18. When the bracket 500 is in place on the support wall 18, the guides 530 align with the shelving units 136 so that each stem 62 of the manifold assembly 38 is in place. The guides 530 align with the shelving units 136, and may even rest on the shelving units 136. In this way, the shelving units 136 may support and distribute the weight of the bracket 500 and loaded manifold assembly 38 on the machine 10. However, in some cases, the guides 530 stop short from engaging the shelving units 136. After the bracket 500 is placed on the machine 10, gravity retains the bracket 500 and manifold assembly 38 on the tabs 550 disposed on the support wall 18 of the machine 10.

An operator may load a bracket 500 with a manifold assembly 38 before the bracket 500 is placed on the machine 10. In fact, the operator may load a plurality of brackets 500 with manifold assemblies 38 to streamline the assembly process. The operator may instead place the manifold assembly 38 onto the bracket 500 after the bracket 500 is hung on the machine 10.

After the product bags 46 are disposed in the compartments 510 and the bracket 500 is disposed on the machine 10, an operator may load the filter 54 into the filter compartment 76 of the machine 10 to initiate the filling process. The machine 10 can then be operated to fill each product bag 46.

Figure 36:
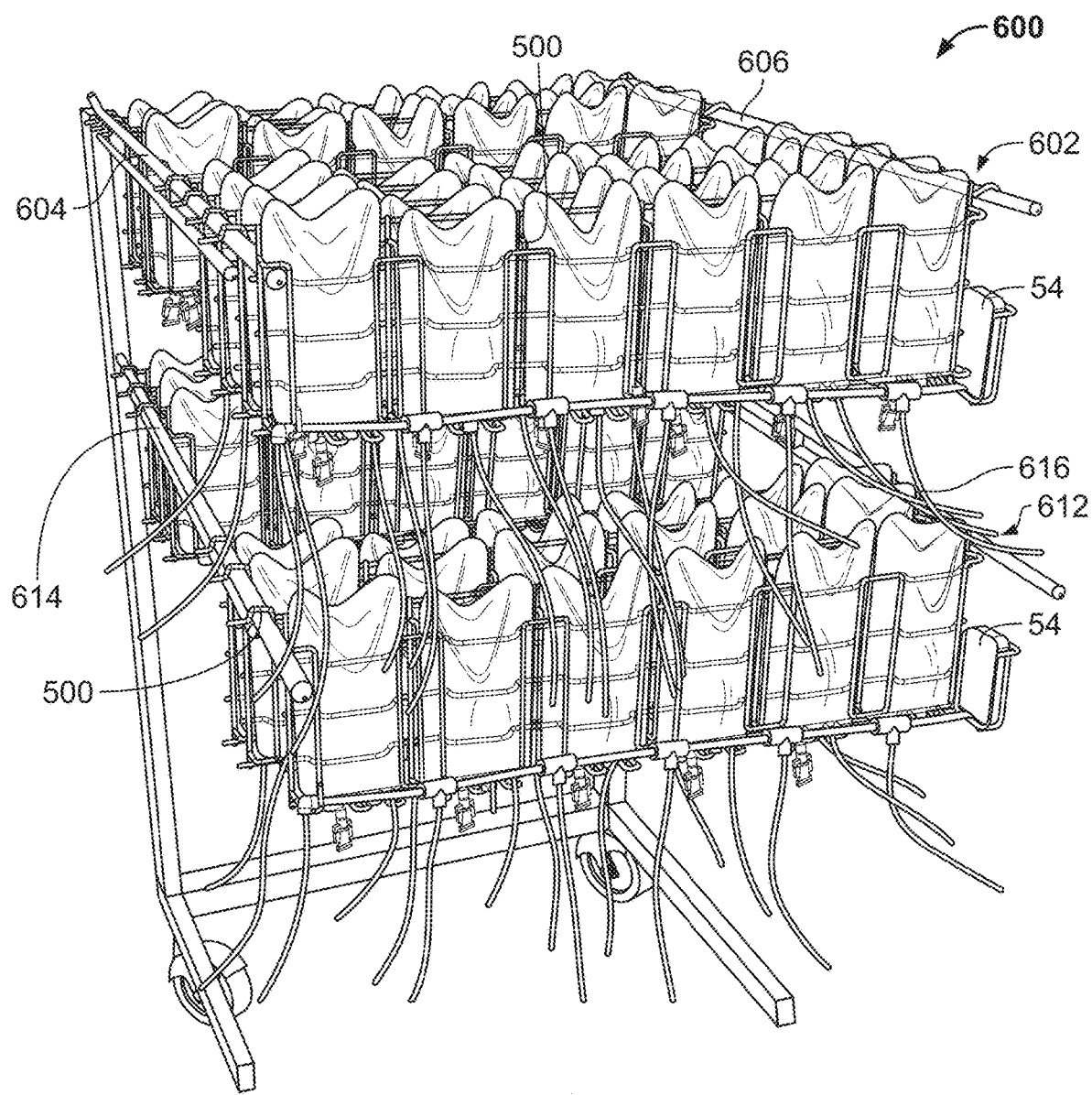
FIG. 36 is a perspective view of a storage rack holding a plurality of brackets with filled product bags assembled in accordance with the teachings of the present disclosure.

FIG. 36 illustrates a storage rack 600 for holding and storing a plurality of loaded brackets 500. The storage rack 600 includes a first row 602 with a first and second parallel rods 604, 606, and a second row 612 with a first and second parallel rods 614, 616. In FIG. 36, the storage rack 600 provides short-term storage of the loaded bracket 500 after the product bags 46 are filled and sealed, and before the filter 54 is tested. Accordingly, the storage rack 600 is designed to support the weight of a plurality of loaded brackets 500 on each row.

The first and second rods 604, 606 of the first row 602 are arranged to receive the hooks 512a and 512b of each bracket 500, respectively. Accordingly, the first and second rods 604, 606 are spaced laterally apart equal to the distance between the first hook 512a and the second hook 512b. The second row 612 is disposed beneath the first row 602 and may be substantially identical to the first row 602. While the storage rack 602 is shown with a first row 602 and a second row 612, the storage rack 600 may include more or fewer rows than presently shown.

Figure 11:
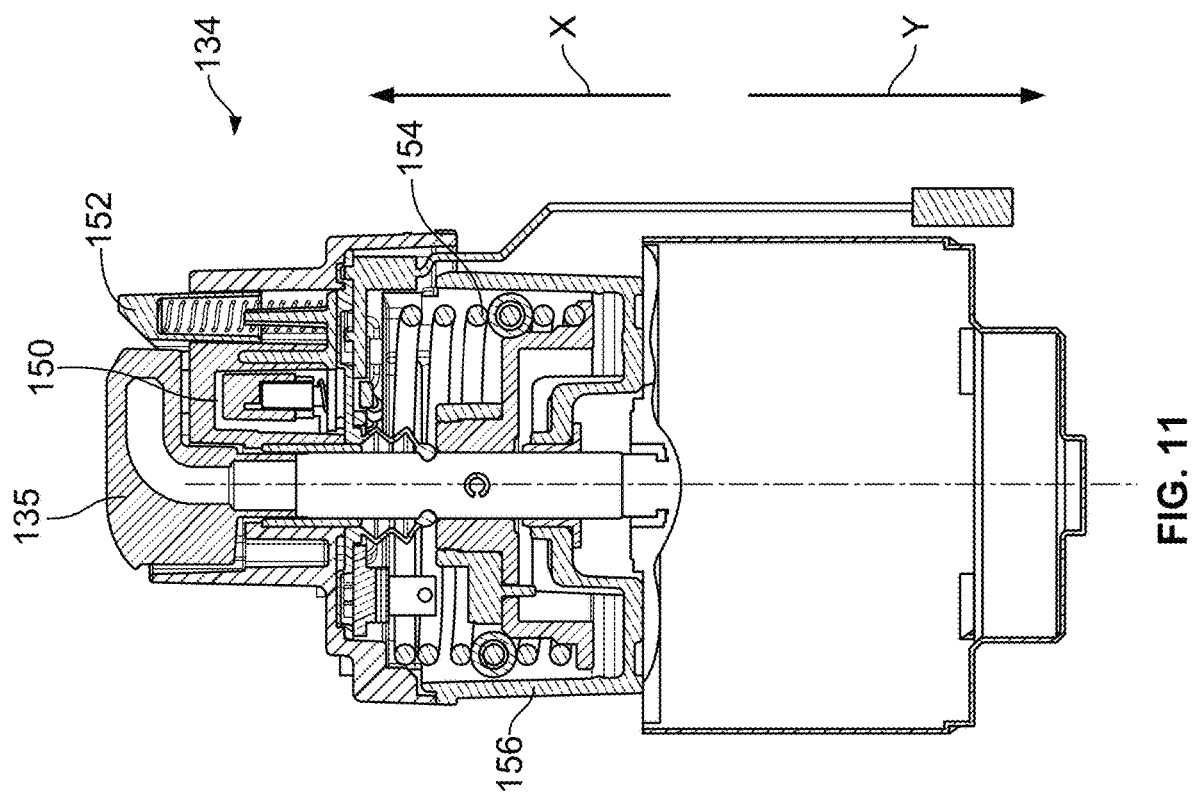
FIG. 11 is a cross-sectional view of the occlusion valve of FIG. 10 taken at A-A.
Figure 10:
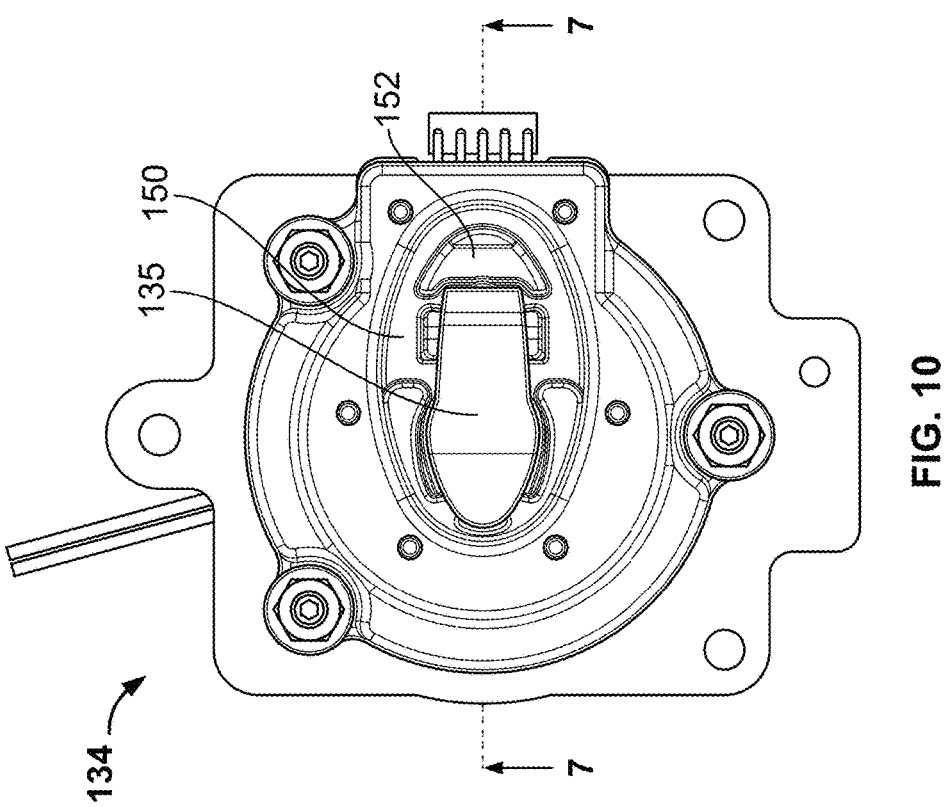
FIG. 10 is a front view of an exemplary occlusion valve used with the machine of FIG. 1 and assembled in accordance with the teachings of the present disclosure.

In FIGS. 10 and 11, an exemplary occlusion valve 134 of the machine 10 is illustrated in greater detail and is constructed in accordance with the teachings of the present disclosure. The occlusion valve 134 includes a finger 135 that is movable relative to a stop 150 between the extended position, in which the finger 135 is spaced from the stop 150, and the compressed position, as shown in FIG. 11, in which the finger 135 engages the stop 150. A portion of the stem 62 of each product bag 46 is guided between the finger 135 and the stop 150 by a lead-in ramp 152 adjacent to the finger 135. The occlusion valve 134 also includes an electrically energized solenoid 154 that operates the finger 135.

When the occlusion valve 134 is activated, the solenoid 154 is configured to move the finger 135 in a direction X to open the occlusion valve 134 (i.e., to move the occlusion valve 134 to the extended position) such that the finger 135 is spaced from the stop 150. In the extended position, the occlusion valve 134 is open to receive a portion of the stem 62 when the manifold assembly 38 is positioned on the support wall 18, or when the occlusion valve 134 unclamps the stem 62 of an attached bag 46 to permit fluid to flow into the bladder 58. To deactivate or close the occlusion valve 134, the solenoid 154 moves the finger 135 in a direction Y to close the occlusion valve 134 (i.e., to move the occlusion valve 134 to the compressed position). When the manifold assembly 38 is coupled to the support wall 18 and the occlusion valve 134 is deactivated (or in the compressed position), the finger 135 compresses the stem 62 of the product bag 46 against the stop 150 such that no air and/or fluid may pass through the stem 62 and into the bladder 58. In other examples, simple manual clamps attached to the support wall 18 may be provided instead, which may require an operator to manually clamp and unclamp each stem 62 of the product bag 46 during the filling process. The occlusion valve 134 operates in the same or similar way when the second exemplary manifold assembly 122 is used.

The solenoid 154 is protected by a housing 156 and is disposed behind a front surface 158 of the support wall 18. The occlusion valve 134 is communicatively coupled to the CPU 28 such that an operator may control the position of the occlusion valve 134 during attachment of the manifold assembly 38 to the support wall 18. Further, the CPU 28 may be programmed to operate each occlusion valve 134 when each corresponding product bag 46 is being filled by the filling machine 10.

Figure 12:
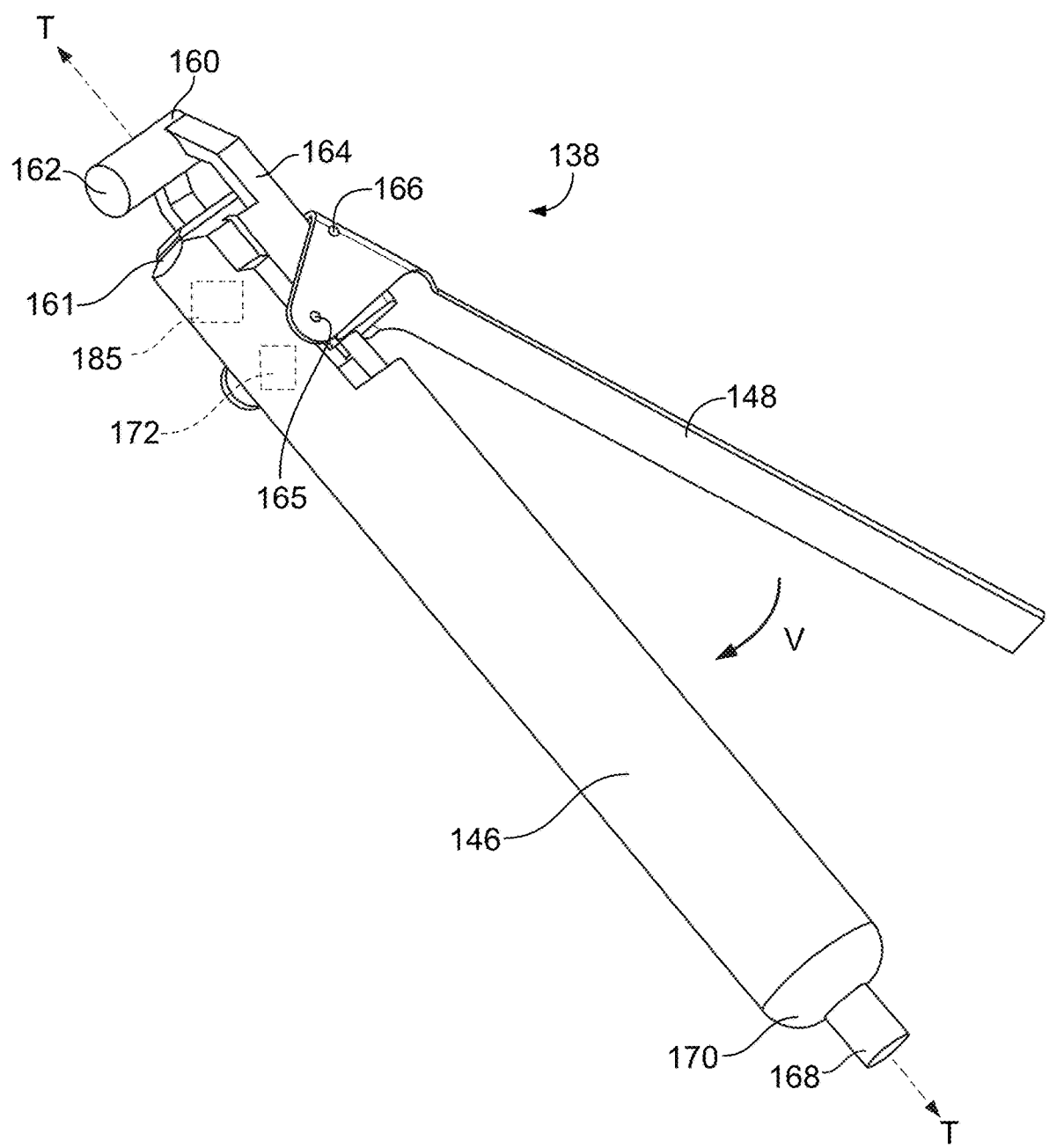
FIG. 12 is a perspective view of the sealing tool assembled in accordance with the teachings of the present disclosure.
Figure 14:
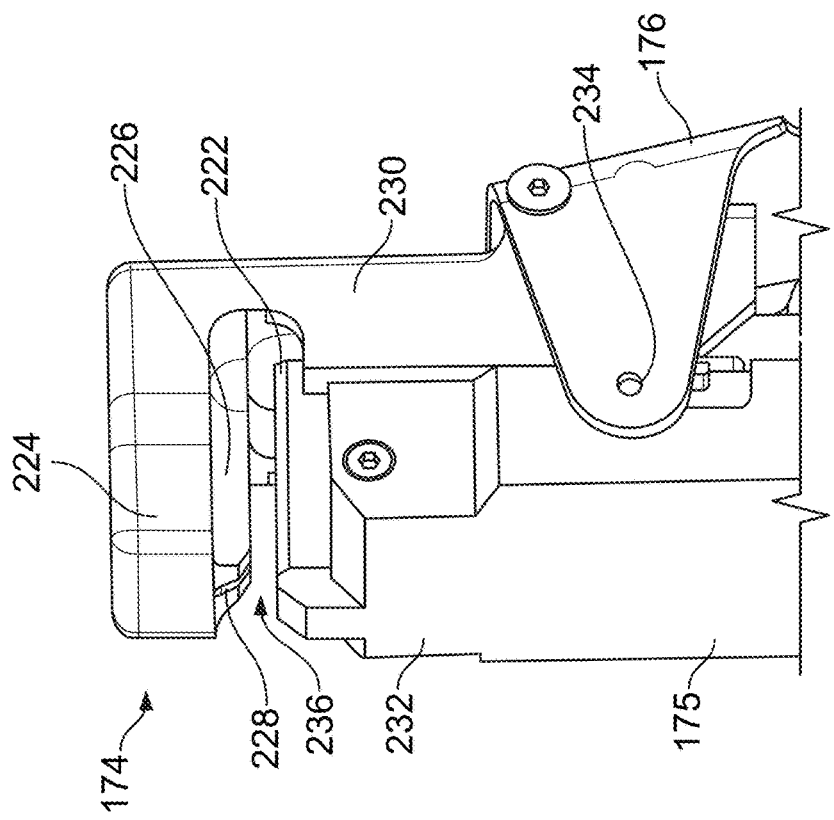
FIG. 14 is a partial perspective view of the cutting tool of FIG. 13.
Figure 13:
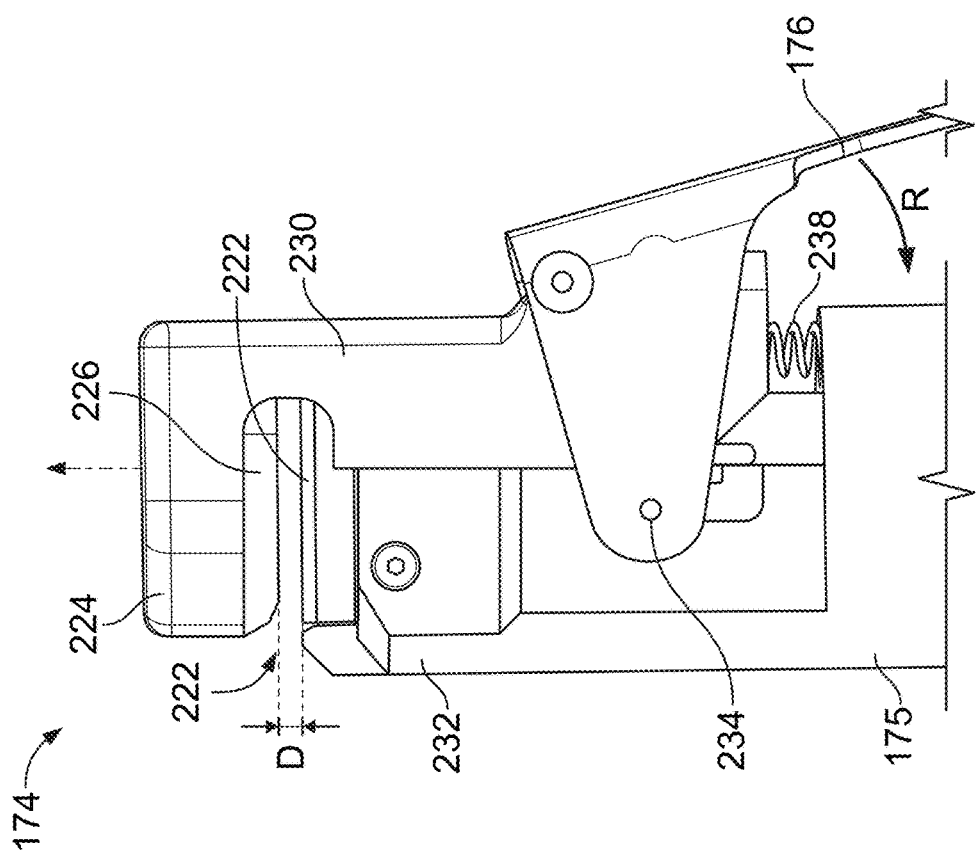
FIG. 13 is a partial side view of a cutting tool assembled in accordance with the teachings of the present disclosure.

In FIGS. 12-14, the sealing and cutting tools are illustrated and will be described in further detail. Turning first to FIG. 12, the sealing tool 138 is constructed in accordance with the teachings of the present disclosure. The sealing tool 138 has a hand grip 146, a lever 148, and a clamp 160, which is movably coupled to the lever 148 and slidably connected to the hand grip 146. The hand grip 146 includes a first end 161 that is spaced from the clamp 160 when the sealing tool 138 is in an open position, as shown in FIG. 12. To make a seal, the sealing tool 138 is movable between the open position and a clamped position, in which the first end 161 engages the clamp 160. In particular, the clamp 160 includes a sealing bar 162 that engages the first end 161 of the hand grip 146 and a connecting piece 164 that is slidably coupled to the hand grip 146 and secured to the lever 148. The sealing tool 138 emits radiofrequency ("RF") energy between the first end 161 and the bar 162 (also referenced herein as "opposing clamping surfaces"). RF energy emitted from these opposing clamping surfaces 160, 161 heats up the polymer stem 62, causing the stem 62 to melt sufficiently to bond and form a seal. The bar 162 of the clamp 160 is shaped to form a wide seal in the stem 62 of the product bag 46 when the bar 162 engages the first end 161 of the hand grip 146. The sealing tool 138 forms a wide seal having a width in a range of approximately 4 mm to approximately 6 mm, and preferably 5 mm. The width of the seal may depend on the properties of the tubing of the stem 62, and may be outside this range in order to ensure that the seal withstands a squeeze test on the bag for at least ten seconds at 20 psi.

In particular, one or more of the opposing clamping surfaces 160, 161 includes one or more electrodes to emit RF energy into the material of the stem 62 to seal. RF energy cause the molecules of the material of the stem 62 to oscillate in response to the RF field, causing the material to heat and melt. For example, one of the clamping surfaces 160, 161 is grounded and the other surface is energized by an RF field of approximately 27 MHz frequency. In another example, one or more of the clamping surfaces 160, 161 may be a heated element.

To operate the sealing tool 138, an operator may grip the hand grip 146 and the lever 148 and apply enough pressure to push the lever 148 toward the hand grip 146 in a V direction. By pushing the lever 148 toward the hand grip 146, the connecting piece 164 of the clamp 160 slides relative to the hand grip 146 along a longitudinal axis T of the handgrip 148. Specifically, the clamp 160 slides relative to the hand grip 146 when the lever 148 rotates in the V direction, and pivots at a pivot point 165 where the lever 148 is coupled to the hand grip 146. As the lever 148 rotates in the V direction, a first end 166 of the lever 148 pulls on the connecting piece 164 of the clamp 160 to move the bar 162 along the T axis and closer to the first end 161 of the hand grip 146.

An electrical port 168 is disposed at a second end 170 of the hand grip 146. The electrical port 168 is configured to electrically couple to a power source and/or to the CPU 28 so that the CPU 28 of the machine 10 can control and/or monitor the usage of the sealing tool 138. For example, the sealing tool 138 may include a sensor 185 to monitor the heat applied between the first end 161 of the hand grip 146 and the bar 162 of the clamp 160. Additionally, the sealing tool 138 includes a timer 172 to monitor a duration of the sealing tool 138 in the clamped position.

In one example, the CPU 28 may run an algorithm to determine how long the RF energy should be applied to the stem 62. For example, when the lever 148 is fully depressed against or toward the hand grip 146, a magnet in the lever 148 trips a switch in the hand grip 146, which activates the RF sealing energy between the first end 161 of the hand grip 146 and the bar 162. The RF energy will remain on until a desired impedance change between the two sealing surfaces 160, 162 is met, thereby signifying that a proper seal has been made. Once the desired impedance change is met, the RF energy is automatically turned off or deactivated. During this sealing process, the sealing tool 138 sends two signals to the CPU 28: a first signal that indicates the time that the lever 148 is fully depressed, and a second signal that indicates RF energy is applied to the stem 62. The CPU 28 receives these signals to process how long each signal is active. After the seal is made (i.e., when the RF energy turns off), the lever 148 remains depressed for two seconds while the seal cools during a cooling period.

The machine 10 may display a visual indicator to communicate with an operator for achieving an adequate seal. The visual indicator may be displayed on the user interface 26 or may be displayed elsewhere on the machine 10 that is highly visible to the operator, for example, on top of the support wall 18. For example, when the lever 148 is fully depressed, the first and second signals are sent to the CPU 28, and a light on the machine 10 turns yellow. As long as the lever 148 is depressed, the first signal communicates with the CPU 28, and the second signal communicates RF energy is applied to the stem 62. The CPU 28 monitors both signals so that while the RF energy is activated, the lever 148 remains fully depressed. After the RF energy is deactivated and the second signal stops communicating with the CPU 28, the CPU 28 will wait two seconds and the indicator light on the top of the machine 10 turns green. If, however, the lever 148 is not fully depressed while either the RF energy is on or during the two second cooling period, the CPU 28 will display an error signal on the monitor or flash a red light. Thus, CPU 28 in this example, monitors the time the lever 148 is fully depressed to ensure enough time for sealing is met, the time the RF energy is applied to the stem 62, and finally the two-second cooling time. The green light comes on after additional two seconds to alert the operator to release the lever 148.

However, in other examples where the sealing process is not automated as described above, the machine 10 may display a pressure gauge or different colored lights, to instruct an operator to apply a certain pressure to the lever 148, to start clamping the stem 62 for certain period of time, and/or to release the clamp 160 from the stem 62. Other methods with additional automation are also possible.

In FIGS. 13 and 14, a cutting tool 174 is constructed in accordance with the teachings of the present disclosure. The cutting tool 174 includes a hand grip 175, a lever 176, a blade 222 coupled to the hand grip 175, and a stop 224 coupled to the lever 176. While only partially illustrated in FIGS. 13 and 14, the hand grip 175 and the lever 176 of the cutting tool 174 are substantially like the sealing tool 138. The stop 224 includes a blade cover 226 having a groove 228 that receives the blade 222 when the cutting tool 174 is in a closed position, and a connecting piece 230 that is slidably coupled to a first end 232 of the hand grip 175. To make a cut, the cutting tool 174 is movable between an open position, as shown in FIGS. 13 and 14, in which the blade 222 is spaced from the blade cover 226 of the stop 224 a distance D, and a closed position, in which the blade 222 engages the blade cover 226 of the stop 224. The lever 176 is spring-operated and pivotably coupled to the hand grip 175 at a pivot point 234 and secured to the connecting piece 230 of the stop 224.

To operate the cutting tool 174, an operator may hold the hand grip 175 and the lever 176 and apply enough pressure to push the lever 176 in a direction R toward the hand grip 175 until the groove 228 of the blade cover 226 receives the blade 222. When the lever 176 moves in the R direction toward the hand grip 175, a spring 238 disposed between the hand grip 175 and the connecting piece 230 of the stop 224 is biased, causing the lever 176 to pull the stop 224 along a longitudinal axis F of the cutting tool 174 toward the blade 222.

The cutting tool 174 is particularly designed to have a limited opening 236 (i.e., the space between the blade 222 and the blade cover 226) to ensure that only a sealed portion of the stem 62 can fit within the opening 236. To prevent mistakenly cutting above or below the seal created in the stem 62, the opening 236 will not receive any unsealed portion of the stem 62. In one example, the blade cover 226 of the stop 224 may be spaced away from the blade 222 a distance D, which is wide enough to accept the thickness of the sealed tube but not wide enough to allow an unsealed tube to fit within the opening 236.

As provided above, the shelving unit 136 of the machine 10 is configured to align the cutting tool 174 with the seal of the stem 62. The clamp 160 of the sealing tool 138 and the stop 224 of the cutting tool 174 are shaped to slide or snap into the notch 144 formed in each shelving unit 136 of the machine 10. In this way, the shelving unit 136 guides each tool 138, 174 to a specific sealing location of the stem 62, between the bladder 58 and the connection line 50, where each bag 46 is to be sealed, cut, and separated from the manifold assembly 38.

Figure 15:
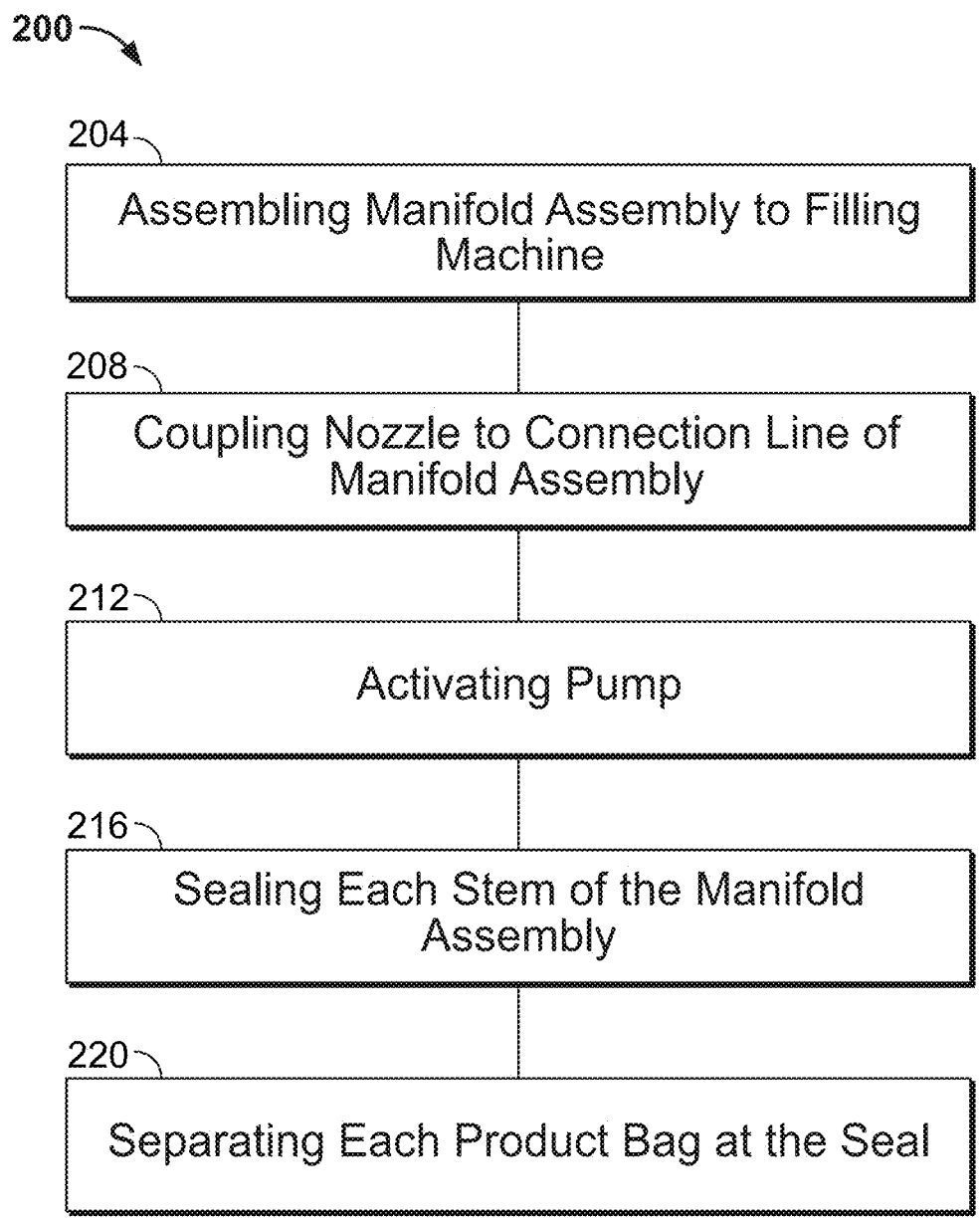
FIG. 15 is a schematic of an exemplary method of producing sterile solution product bags.

In FIG. 15, an exemplary method 200 of the filling process of the machine 10 is illustrated, and will be discussed with reference to FIGS. 1-4. The machine 10 assures production of sterile solution-filled product bags 46 by performing a plurality of steps of the method 200.

Initially, a mix tank for containing a solution may be brought into the same room as the machine 10. A cap removal tool (for removing a cap attached to the nozzle 66) is placed onto the machine 10 and extends downward into the clean chamber 14. A laminar air source is turned on to provide air flow through the clean chamber 14. A sterile filter train may then be removed from its sterile packaging, and hooked up to the machine 10 connecting the machine 10 to the mix tank. The capped nozzle 66 of the filter train is installed in a nozzle holder in the clean chamber 14, and the feed line 70 connected to the nozzle 66 is threaded out of the clean chamber 14, and the slotted door 82 of the clean chamber 14 is closed. The installation of the nozzle 66 may be set up first because the nozzle 66 must be kept away from contacting other surfaces during installation as it is downstream from the other elements of the filter train. The feed line 70 extending from the slotted door 82 is then wrapped around the peristaltic pump 102. Finally, a sterile connector of the filter train is connected to a sterile connector on the mix tank and a valve controlling the flow of solution from the mix tank is turned on. In other examples, however, the solution may come from a different source coupled to the filter train.

To prepare the machine 10 for filling, an automated process of readying the nozzle 66 of the filter train for sterile connection to the manifold assembly 38 may then be performed. This automated process may include, for example, lowering the nozzle 66 away from the cap removal tool. The cap removal tool is shaped to hold the cap of the nozzle 66 such that as the tubing extending from the nozzle 66 is pulled downward and away from the cap removal tool, the cap removal tool removes the cap from the nozzle 66. This automated process of removing the cap may be performed once for each new filter train. However, multiple bag sets 46 may be filled before the filter train needs replacing and decapping. Details related to this process are described further below.

After this initial setup, the method 200 begins with a step 204 of positioning the manifold assembly 38 onto the filling machine 10. The individual bags 46 of the manifold assembly 38 are hung with the stems 62 threaded through the occlusion valves 134. The manifold assembly 38 is suspended such that the stem 62 of each product bag 46 is disposed below the bladder 58 of each bag 46 so that a solution is pumped against the force of gravity and through the stem 62 to fill the bladder 58 of each bag 46. Before filling each product bag 46, the method includes a step 208 of coupling the nozzle 66 to the connection line 50 of the manifold assembly 38 in the clean chamber 14. The nozzle 66 is in fluid communication with the batch filter 86 via the feed line 70, and the batch filter 86 is disposed upstream from the manifold filter 54 such that the solution can pass through the batch filter 86 before being pumped through the nozzle 66 and through the manifold filter 54. An exemplary step 208 of coupling the nozzle 66 will be described in further detail below and with reference to FIGS. 16-23. The machine 10 is then activated.

After the nozzle 66 is coupled to the connection line 50 of the manifold assembly 38, and more particularly, to a portion of the connection line 50 in fluid communication with the inlet 65 of the manifold filter 54, a step 212 includes activating the pump 102, which is disposed upstream from the batch filter 86. The pump 102 is configured and controlled to at least partially fill one or more of the bladders 58 associated with the plurality of bags 46 by pumping solution from the mix bag or other source of solution through the feed line 70, batch filter 86, the nozzle 66, the manifold filter 54, and the connection line 50, thereby creating one or more at least partially filled product bags 46. In this example, the plurality of occlusion valves 134 are controlled to permit filling of one bag 46 at a time. The pump 102 may be automated by the machine 10, or manually controlled by an operator.

Once the filling process is complete and each of the stems 62 is compressingly sealed by the associated occlusion valve 134, a step of sealing 216 the stem 62 of each of the at least partially filled product bags 46 is performed. The stem 62 of each product bag 46 is sealed at a location between the connection line 50 and the bladder 58 of the at least partially filled product bags 46, thereby creating one or more at least partially filled and sealed product bags 46. The sealing step 216 may be an automated function performed by the machine 10 or an operator may make each seal using the sealing tool 138. An exemplary step 216 of sealing is described in more detail below and with reference to FIGS. 24-26. Finally, each of the at least partially filled and sealed product bags 46 is separated, at the seal, from the connection line 50 in method step 220, thereby creating a plurality of filled product bags 46 that are separated, sealed, and ready for storage and/or shipment. The separation step 220 may be performed automatically by the machine 10 or an operator may cut the stem 62 at the seal using the cutting tool 174 to separate each bag 46 from the rest of the manifold assembly 38. An exemplary step 220 of separating is described in more detail below and with reference to FIGS. 24-26.

The method 200 is performed at least three times to produce a plurality of viable at least partially filled, sterile, sealed, product bags 46. In a first round of steps 204, 208, 212, 216, 220, the machine 10 and filter train are primed such that the batch filter 86 is completely wetted to eliminate the chance of receiving a false positive in a filter integrity test. Additionally, by completely wetting the batch filter 86, any air trapped in the batch filter 86 is transferred to the product bags 46, and particularly, a first product bag 46A (FIG. 4). One or more of the filled bags 46 of the priming phase can be useful for sending to a lab for testing the fluid.

A second round of steps 204, 208, 212, 216, 220 includes attaching a second manifold assembly 38 to the machine 10 and calibrating the machine 10 to ensure that an equal amount of headspace (e.g., 5 mL) and solution are filled in each product bag 46. The machine 10 then indicates to the operator to weigh each filled product bag 46 using the scale 34. The weight of each bag 46 is recorded for tracking and checked against a tolerance factor of the pump 102 to determine the exact amount of solution that will be filled in the final round of filling. After weighing all six bags 46, the calibration pump factor is set by the CPU 28. During the calibration phase, the occlusion valves 134 are tested to ensure that no air passes through the stems 62 when the occlusion valves 134 are deactivated.

In the third filling round, the batch filter 86 has been completely wetted, and a third manifold assembly 38 is attached to the machine 10. The third and any subsequent rounds produce viable product bags 46 that if determined to be sterile, are not discarded like the product bags 46 of the priming and calibrating rounds. The third bag set is weighed as a confirmation of the calibration adjustment performed after the second bag set. Once the machine 10 is primed and calibrated, the method 200 may be repeated until the mix tank is empty or the batch filter 86 meets its filtration capacity. After each subsequent round, the manifold filter 54 of each manifold assembly 38 is tested. Further, a subsequent or additional calibration cycle may be run to recalibrate the machine 10.

In each round of the filling process, one bag 46 is filled at a time. To fill each bag 46 separately, one occlusion valve 134 is activated at a time to move from the collapsed position to the extended position to permit solution to flow into each product bag 46. To fill the first bag 46a, solution from the nozzle 66 is pumped through the manifold filter 54 and connection line 50, and pushes air that is trapped in the connection line 50 into the bladder 58 of the first bag 46a. When the first bag 46a has a predetermined amount of fluid in the bladder 58, which may be measured by a predetermined number of turns made by the peristaltic pump 102, the method 200 includes deactivating the occlusion valve 134 associated with the first bag 46a to move the occlusion valve 134 from the extended position to the collapsed position. The machine 10 may then automatically activate a second occlusion valve 134 adjacent to the stem 62 of the second product bag 46b to move the occlusion valve 134 from the collapsed position to the extended position to permit fluid flow into the bladder 58 of the second product bag 46b. Activating the second occlusion valve 134 may simultaneously occur when the first occlusion valve 134 is deactivated, thus pumping the solution can be continuous. When the machine 10 is filling the second product bag 46b, the other occlusion valves 134 are in the collapsed position. In some examples, the at least partially filled first bag 46a has a different headspace in the bladder 58 than the other product bags 46 because the first bag 46a receives the trapped air in the connection line 50. As such, the first bag 46a may be discarded with the bags 46 of the priming and calibrating rounds. Alternatively, the first bag 46a may include a valve that releases the air trapped in the connection line 50 such that each of the six product bags 46 are uniform in terms of volume of solution and headspace.

In one example, the on-board CPU 28 of the machine 10 operates and controls the filling process 200 and may interact with an operator by displaying commands and status updates via the user interface 26. The CPU 28 communicates with the pump 102, the connection assembly 90, and the occlusion valves 134 of the machine 10 to receive information, and communicate various commands via the user interface 26 for operating the machine 10. Generally, the CPU 28 is configured to receive signals from proximity switches, transmit commands or signals to actuating devices, monitor sensors, and process information gathered and received from the sensors. For example, the CPU 28 communicates with the pump 102 to begin pumping a solution and to stop pumping the solution when each of the product bags 46 has been filled to a desired capacity. More particularly, in this example, the CPU 28 communicates with each occlusion valve 134 to permit filling and inhibit filling of each product bag 46 in sequence by activating and deactivating each occlusion valve 134. The CPU 28 is programmed for each phase of the filling process, and communicates results for the priming and calibration steps to ensure adequate filling to achieve best results. In the illustrated example, the CPU 28 controls the operation of the machine 10 locally (e.g., a wired connection) and may be accessed by a control panel of the user interface 26 located on the support wall 18 of the machine 10. In other embodiments, the CPU 28 may remotely control the operation of the machine 10 via wireless communication systems.

The CPU 28 may be programmed to store data for each batch of viable product bags 46 that have been filled and tested for sterility. Before filling, an operator may enter a serial number associated with the manifold assembly 38 into the CPU 28 via the user interface 26 to store type of solution, solution expiration, filling date and location, fluid conductivity and integrity results, and other information pertaining to product bags 46. In other examples, each batch of filled product bags 46 may be serialized with a barcode, QR code, RFID tag or other identifier to identify critical information related to the filled bag 46 with or without the use of the CPU 28. For example, each bag 46 may have information relating to the filling of that bag 46 such as, for example, the machine 10 used to fill the product bag 46, the time and date of filling, and other data associated with the contents of the bag 46. This identifier can help track the shipment and distribution of each bag 46. For example, in the case that the contents of the bag 46 is contains contamination, the other bags 46 produced in that same batch can be located and/or discarded. In one example, if a filter 54 of the bag set fails, then each of the corresponding bags 46 may be segregated out for discard. This tracking could also help identify any problems in the machine 10. The label or identifier may be placed on the outside surface of the bladder 58, sealed border 112, stub of the access ports 108, or other part of the bag 46. The bags 46 may be labeled before or after the bags 46 are filled.

To ensure sterility of the contents of the product bag 46, the manifold filter 54 is sealed off and separated from the connection line 50 for testing in a filter integrity test machine. In particular, the downstream or outlet tube from the filter 54 is trimmed. The tube is trimmed such that it is long enough so the outlet end can be placed in a receptacle to catch any drips during the test. Each filter 54 may be tested individually, or three filters 54 are tested simultaneously. For example, three leads from the filter testing device are connected to the inlet of each of three filters 54. If there is a failure then each of the three filters 54 is individually tested.

The filter testing device may be pre-programmed or controlled to perform a filter integrity test, such as a bubble point test, a pressure degradation test, water intrusion test, a water flow test, or any suitable test known in the art. A pressure degradation test is a method for testing the quality of a filter either before or after the filter has been used. To perform the integrity test, a test head of the filter testing device engages the inlet 65 of the manifold filter 54. The filter integrity test determines the presence of any structural flaws in the filter membrane that may prevent the filter 54 from adequately sterilizing a fluid. For example, a hole having a diameter larger than 0.2 microns ($\mu$m) in the filter membrane may allow particulates in the fluid to pass through the filter 54 and compromise or contaminate the sterile environment of the bladder 58.

To perform the filter integrity test using a pressure degradation test procedure, the test head engages the inlet 65 of the filter 54 and applies an air pressure of a predetermined value to the inlet 65 and filter membrane. In one example, the predetermined value is the pressure where gas cannot permeate the membrane of an acceptable filter. A pressure sensor, or other method of measuring the integrity of the filter, is located within the test head and measures the pressure decay or diffusion rate through the filter membrane. The results from the integrity test are assessed to determine the quality of the filter 54, and therefore the quality of the solution of the filled product bags 46. If the pressure sensor measures a decay or an unexpected rate of decay, then the filter 54 fails the test.

Alternatively in a bubble point test, the test head gradually increases the pressure applied to the filter 54, and the increase in pressure is measured in parallel with the diffusion rate of the gas through the filter media. Any disproportionate increase in diffusion rate in relation to the applied pressure may indicate a hole or other structural flaw in the filter membrane, and the filter 54 would fail the integrity test.

Based on the results of the filter integrity test, a determination that the solution of the filled product bag 46 is either sterile or has the potential of being compromised may be made with a high degree of certainty. The filter integrity test performed in a filter integrity test machine is not limited to those methods described herein, and may include a different acceptable filter test designed to assess the quality and performance of the filter 54.

Figure 20:
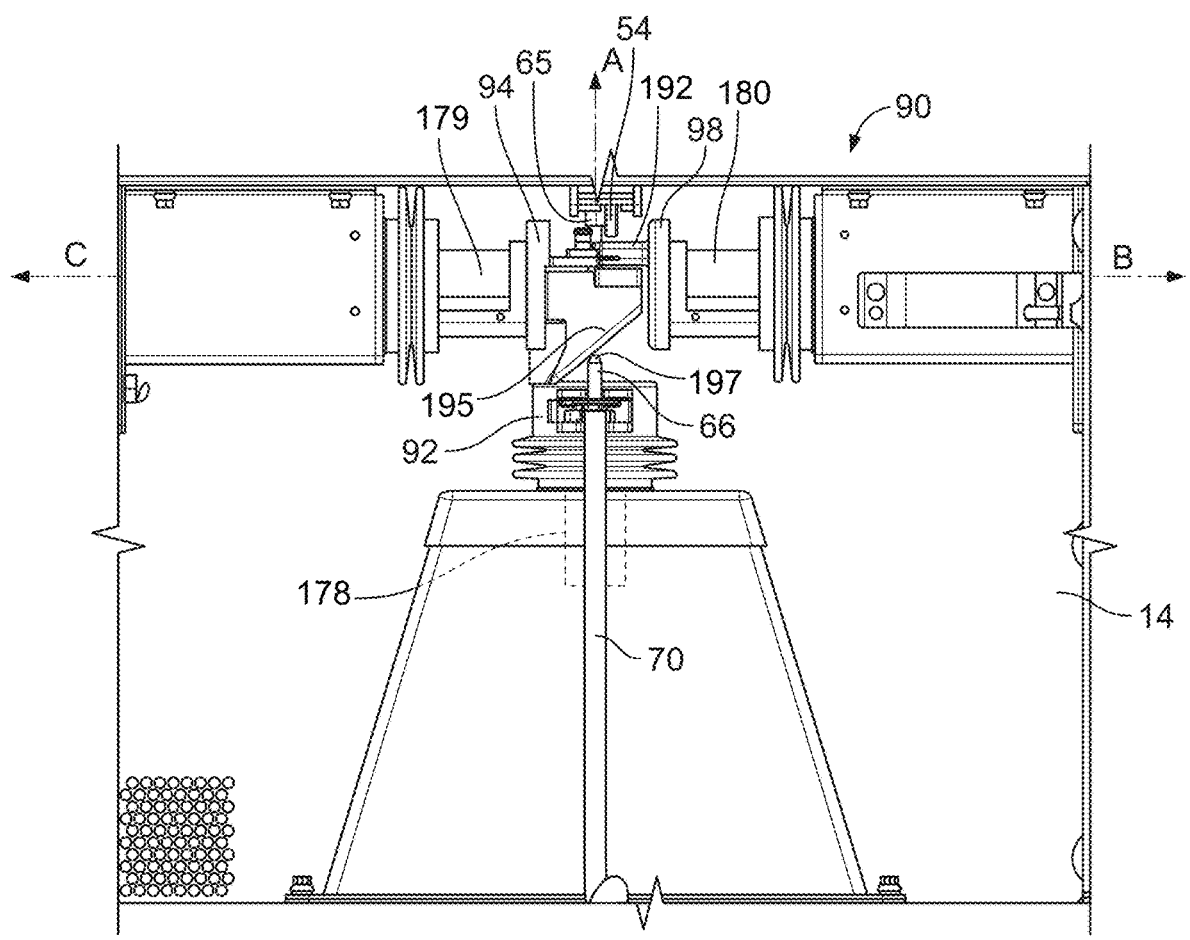
FIG. 20 is a front view of the connection assembly of the clean chamber of FIG. 1, showing a cutting tool engaging the connection tube.
Figure 21:
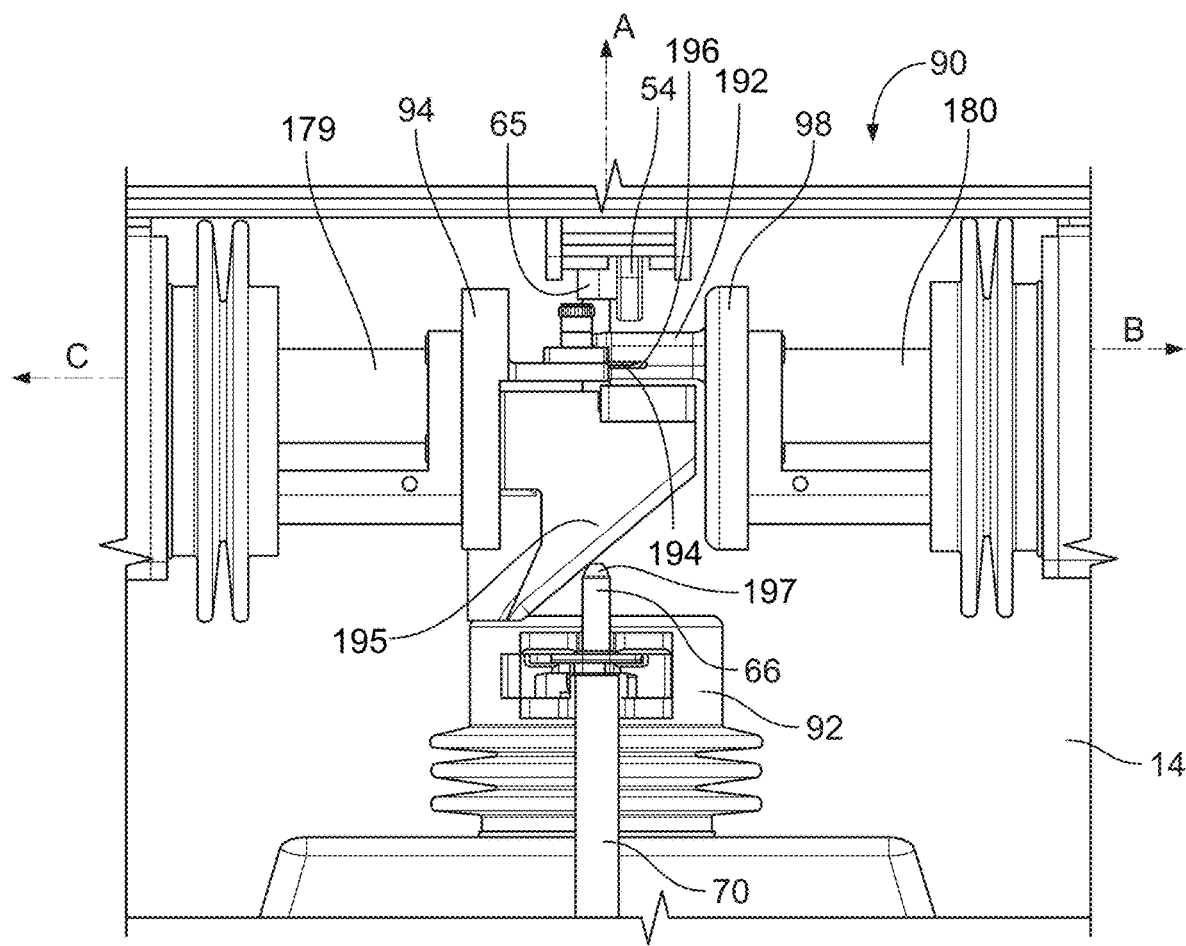
FIG. 21 is a front, magnified view of the connection assembly of FIG. 20.
Figure 22:
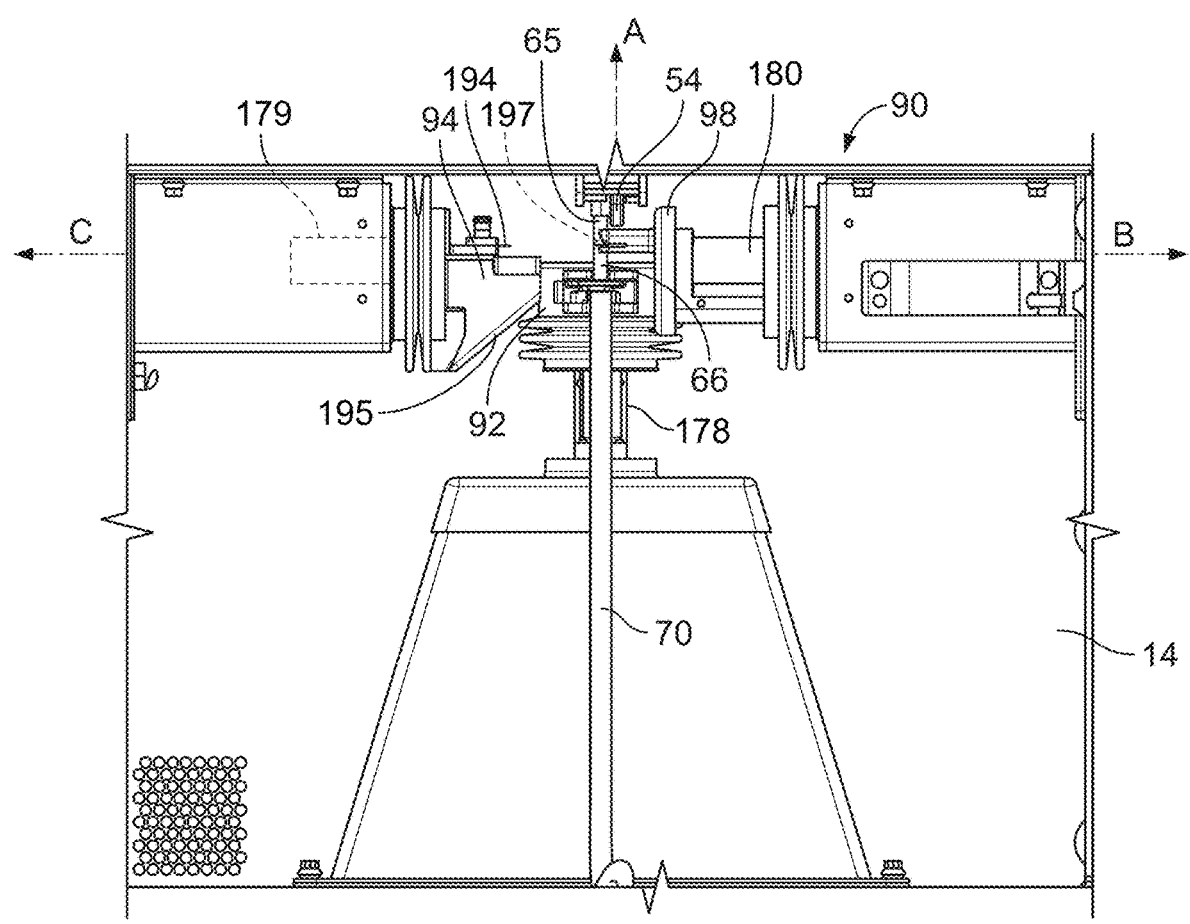
FIG. 22 is a front view of the connection assembly of the clean chamber of FIG. 1, showing the nozzle engaged with the connection tube.
Figure 23:
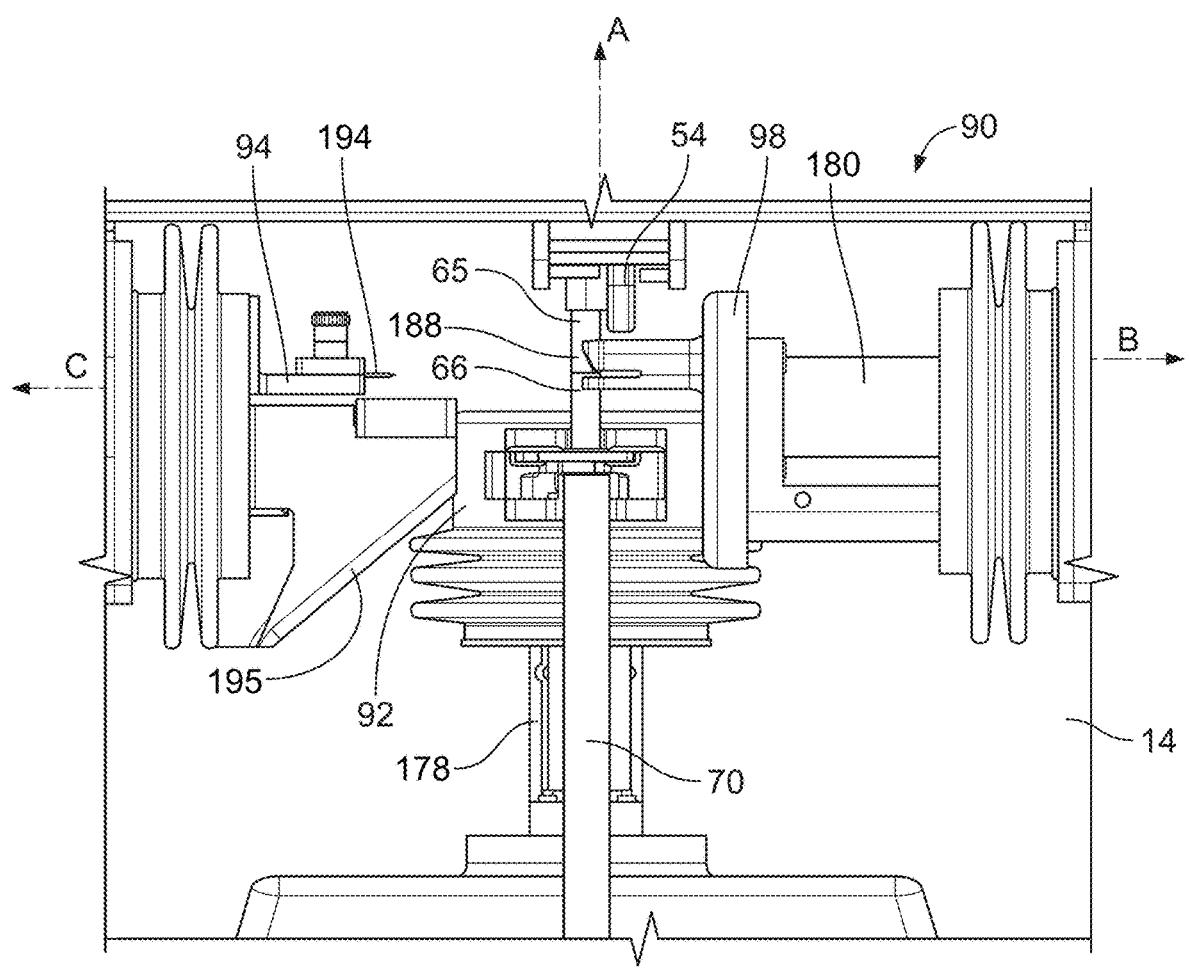
FIG. 23 is a front, magnified view of the connection assembly of FIG. 22.

Turning now to FIGS. 16-23, the step 208 of coupling the nozzle 66 to the connection line 50 of the manifold assembly 38 of the method 200 of FIG. 15 will now be described in further detail. The step 208 includes a plurality of intermediate steps before the pump 102 is activated to begin pumping. Exemplary performance of these intermediate steps are illustrated in FIGS. 16-23, and include a nozzle de-capping phase (FIGS. 16 and 17), a manifold filter insertion phase (FIG. 18), a removing a sealed end phase (FIGS. 19-21), and finally the nozzle coupling phase (FIGS. 22 and 23).

Figure 16:
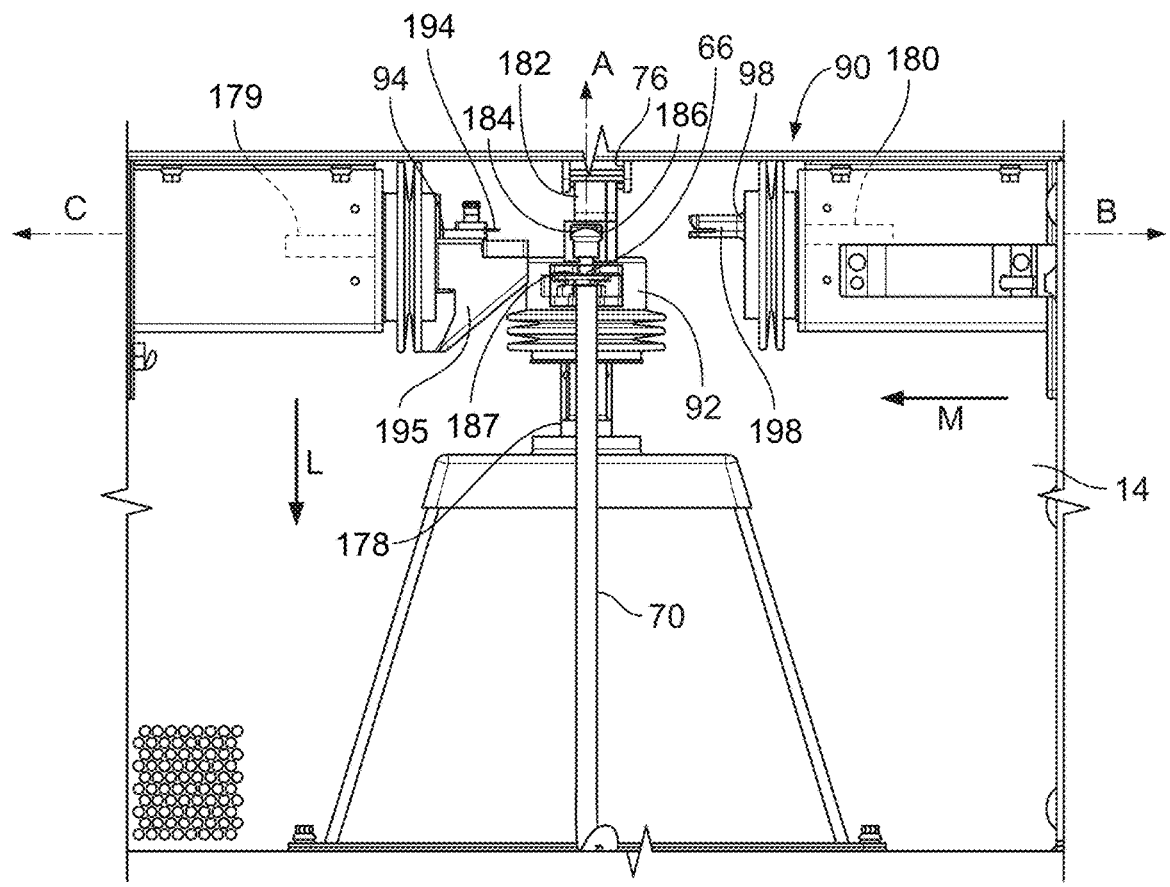
FIG. 16 is a front view of a connection assembly of the clean chamber of FIG. 1 in an initial position.

Turning first to FIG. 16, the connection assembly 90 is disposed in the clean chamber 14 and includes the nozzle holder 92 movable by a first actuator 178, the cutting tool 94 movable by a second actuator 179, and the line grip 98 movable by a third actuator 180. Each actuator 178, 179, 180 may be automatically activated to complete the step 208 of coupling the nozzle 66 to the connection line 50 by the CPU 28. In other examples, the actuators 178, 179, 180 may be activated manually by an operator.

Figure 17:
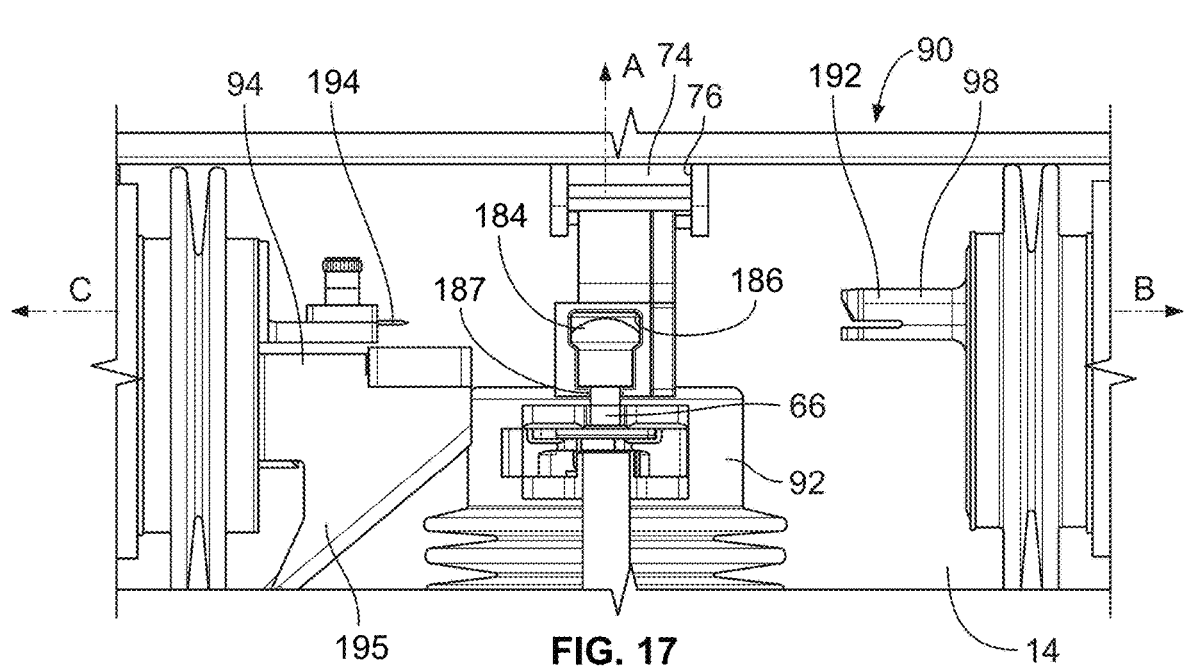
FIG. 17 is a front, magnified view of the connection assembly of FIG. 16.

In FIGS. 16 and 17, the connection assembly 90 is depicted in an initial de-capping phase. In this phase, the nozzle 66 is coupled to the nozzle holder 92 and the first actuator 178 is in an extended position, and each of the second and third actuators 179, 180 is in a retracted position. A cap removal tool 182 is removably disposed within the compartment 76 formed in the platform 22 and extends into the clean chamber 14. The cap removal tool 182 may be inserted into a receiving member of the compartment 76 in the chamber 14 so that the cap removal tool 182 can be inserted and removed easily from the chamber 14. Once the cap removal tool 182 is in place, an operator may insert a cap 184 of the nozzle 66 into a first opening 186 formed in the cap removal tool 182. The first opening 186 is perpendicular to a longitudinal A axis of the nozzle holder 92 and is sized to receive the cap 142 of the nozzle 66. Once in place, the cap 184 sits against a flange defined by cap removal tool 182 in a vertical or upright position. Once the nozzle 66 is secured to the cap removal tool 182 via the nozzle cap 184, the operator closes the door of the compartment and laminar air flows through the chamber 14.

The cap removal tool 182 also includes a second opening 187 disposed orthogonally relative to the first opening 186 and is sized to slidably receive the nozzle 66. The second opening 187 formed in a bottom side of the cap removal tool 182 is sized to permit movement of the nozzle 66 away from the cap removal tool 182, but is too narrow to permit the cap 184 to slide with the nozzle 66.

To remove the cap 184 from the nozzle 66, the first actuator 178 moves from the extended position to a retracted position, carrying the nozzle holder 92 and the nozzle 66 downward in a L direction. As the nozzle holder 92 and nozzle 66 move downward, the nozzle 66 slides through the second opening 187 of the cap removal tool 182, and the cap 184 is removed from the nozzle 66 and remains, temporarily, in the cap removal tool 182. In particular, the second opening 187 is too narrow to permit the cap 184 from moving with the nozzle 66 in the L direction. A flange of the cap removal tool 182, which defines the second opening 187, engages a lower edge of the cap 184 as the nozzle holder 92 moves downward. The cap removal tool 182 thereby retains the cap 184 in the opening of the cap removal tool 182 and separates the cap 184 from the nozzle 66. The cap 184, now removed from the nozzle 66, is retained in the cap removal tool 182 until the cap is removed when the cap removal tool is removed from the machine 10. This automated process prevents an operator from needing to form any touching contact with the nozzle 66 once the nozzle 66 is placed in the clean chamber 14. In this way, the clean environment of the nozzle 66 and/or the chamber 14 is not compromised and the inlet 65 of the manifold filter 54 makes a connection with the nozzle 66 during this step within the sterile environment of the clean chamber 14.

Figure 18:
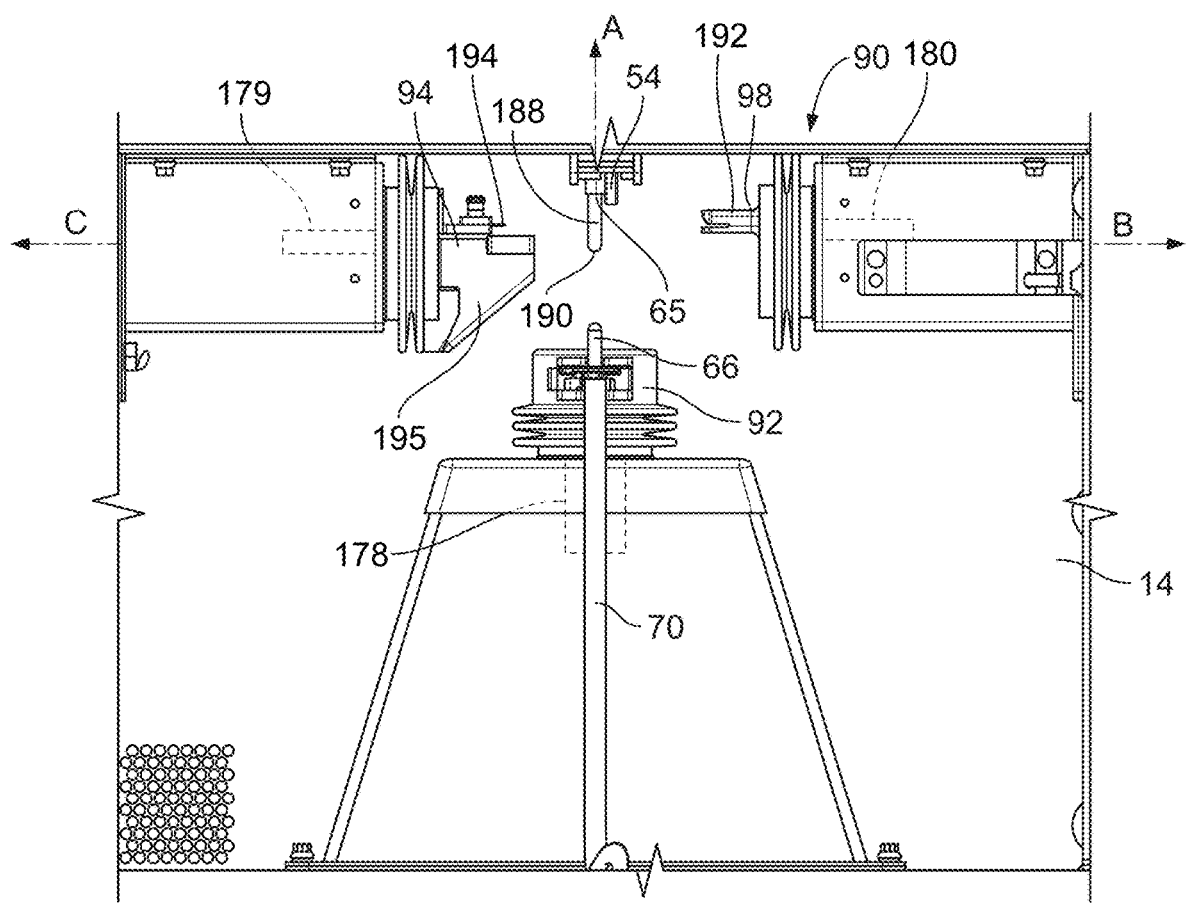
FIG. 18 is a front view of the connection assembly of the clean chamber of FIG. 1 after a cap of a nozzle is removed.

After the cap 184 is removed, the cap removal tool 182 may be removed from the compartment 76 and replaced with the manifold filter 54, as shown in FIG. 18. During the manifold filter insertion phase, the first, second, and third actuators 178, 179, 180 are in the retracted positions. An operator opens the protective door 78 and slides the manifold filter 54 into the compartment 76 defined by the opening 74 in the platform 22, as shown in FIG. 6. Once the manifold filter 54 is partially extending above the platform 22 and partially extending into the clean chamber 14, the manifold filter 54 is in place, and the protective door 78 is closed, as shown in FIG. 7. The compartment 76 is particularly configured to align the inlet 65 of the manifold filter 54 with the longitudinal A axis of the nozzle 66.

The step 208 of coupling the nozzle 66 to the connection line 50 of the manifold assembly 38 more specifically includes coupling the nozzle 66 to the manifold filter 54. As shown in FIG. 18, the manifold filter 54 includes a connection tube 188 connected to the inlet 65 of the filter 54. In an embodiment, the connection tube is formed as a flexible, polymeric tubing segment having an outlet end section bonded to a rigid inlet port of the filter housing 54. The connection tube 188 has a sealed end 190 that is opened before the nozzle 66 connects to the inlet 65 of the filter 54 to fluidly couple the nozzle 66 to the connection line 50 of the manifold assembly 38. From the perspective of FIG. 18, the sealed end 190 is disposed between the nozzle 66 and the inlet 65 of the manifold filter 54. Opening the sealed end 190 includes cutting the connection tube 188 at a location between the sealed end 190 and the filter inlet 65, thereby creating an inlet to the connection tube 188, an opening, and fluid connection to the manifold assembly 38. The sealed end 190 may be integrally formed with the connection tube 188 by sealing an end section of the tube 188 together using, for example, RF or heat sealing. However, in other examples, the sealed end 190 may be sealed shut by a sealing cap or other piece bonded to the end of the connection tube 188. In this case, opening the sealed end 190 may include removing a sealing cap or other component from the connection tube 188.

Figure 19:
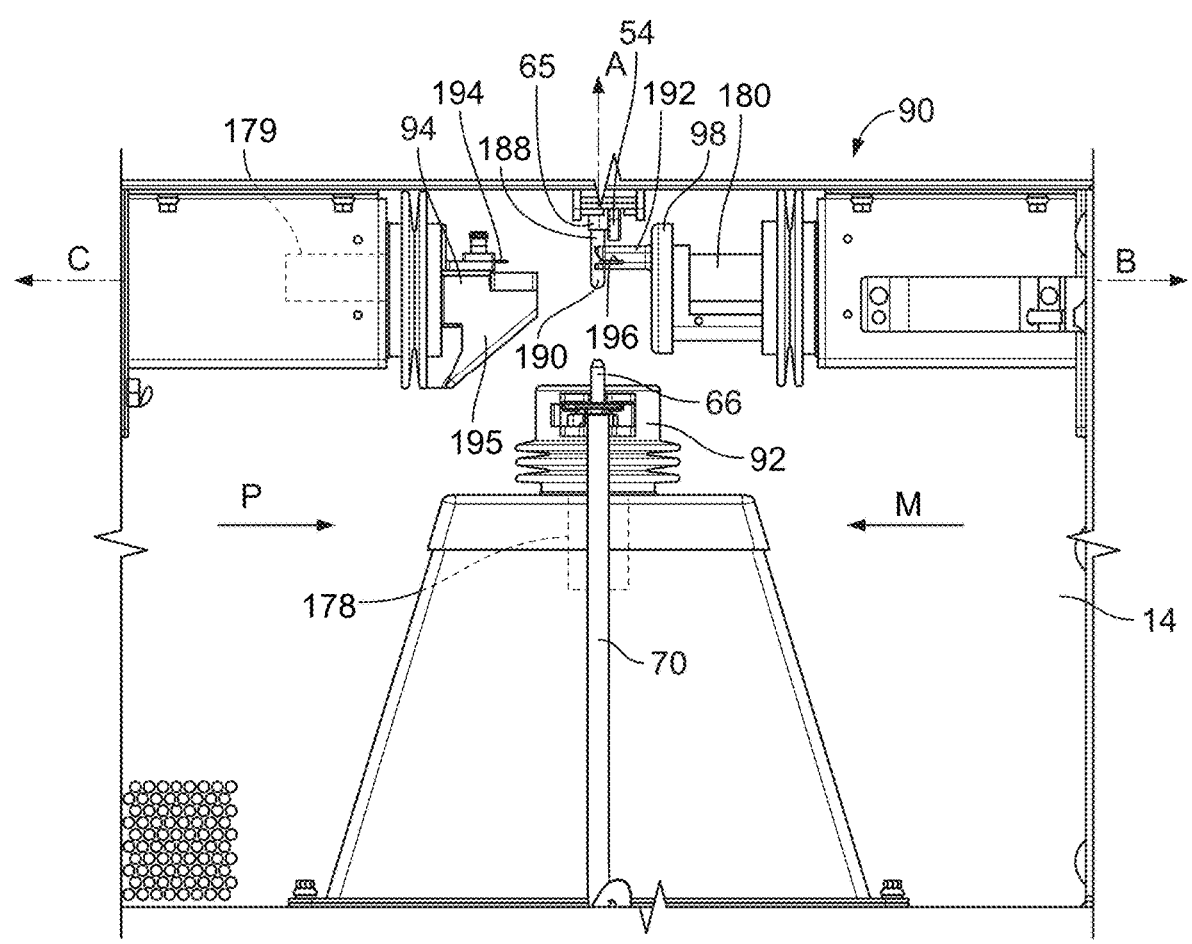
FIG. 19 is a front view of the connection assembly of the clean chamber of FIG. 1, showing a connection tube being held in vertical alignment with the nozzle.

In FIG. 19, opening the sealed end 190 includes holding the connection tube 188 via the line grip 98 and moving the cutting tool 94 toward the connection tube 188 to cut off the sealed end 190 (as shown in FIG. 20) at a location between the sealed end and the inlet port of the filter housing 54. The line grip 98 engages the connection tube 188 when the line grip 98 is in the extended position. Specifically, a protruding tab 192 of the line grip 98 has an opening sized to receive the circumference of the connection tube 188 and hold the connection tube 188 in vertical alignment. The line grip 98 facilitates the opening of the sealed end 190 by holding the connection tube 188 in place while the cutting tool 94 removes the sealed end 190 of the connection tube 188. The third actuator 180 carries the line grip 98 to move in a direction M, relative to a B axis, to engage the connection tube 188. In other examples, the line grip 98 may not be needed for opening the connection tube 188.

The cutting tool 94 includes a blade 194 and an angled chute 195 disposed below the blade 194. The cutting tool 94 is movable by the second actuator 179 between the retracted position, as shown in FIG. 19, and an extended position, as shown in FIGS. 20 and 21. The second actuator 179 moves in a direction P, relative to a C axis, which is perpendicular to the longitudinal A axis of the nozzle 66 and parallel to the B axis. As shown in FIGS. 20 and 21, opening the sealed end 190 includes holding the connection tube 188 via the line grip 98 and moving the cutting tool 94, via the second actuator 179, along the C axis toward the connection tube 188. The blade 194 is sharp to pierce the connection tube 188 and sever the sealed end 190 from the remainder of the connection tube 188. More clearly shown in FIG. 21, the gripping tool 98 includes a slot 196 sized to receive the blade 194 of the cutting tool 94 when the second actuator 179 is in the extended position and the third actuator 180 is in the extended position. The severed sealed end 190 falls into the angled chute 195 and is discarded.

In FIGS. 22 and 23, the final phase of coupling the nozzle 66 to the connection line 50 of the manifold assembly 38 includes directly coupling the nozzle 66 with an open end of the of connection tube 188. To couple the nozzle 66 with the connection tube 188, the first actuator 178 moves the nozzle 66 along the longitudinal A axis of the nozzle 66. As the nozzle 66 moves from the retracted position to the extended position, a tapered tip 197 (FIG. 21, which may have a chamfered end) of the nozzle 66 slides into the open end (hidden from view) of the connection tube 188 to sealably couple the nozzle 66 to the manifold filter 54. The inlet end of the now cut connection tube 188 envelopes the tip 197 of the nozzle 66, thereby creating a seal by an elastomeric hoop stress around the nozzle 66. In other words, the cut connection tube 188 stretches around the chamfered end 197 to connect with the nozzle 66, thereby creating a seal between an interior wall of the connection tube 188 and an outer surface of the nozzle 66. At or around the same time, a portion of the connection tube 188 immediately adjacent a rigid end of the inlet port of the filter housing 54 is pinched between the nozzle tip 197 and the rigid end. Together, the hoop stress seal and the pinching seal may provide an additional measure to keep the connection from leaking because a high degree of back pressure will be caused by flowing the fluid through the filter immediately downstream of the connection at the desired flow rate for filling the product bags 46. Once this connection is made, the pump 102 may start pumping solution through the feed line 70, nozzle 66, connection tube 188, manifold filter 54, and into the connection line 50 of the manifold assembly 38 to fill the product bags 46. The product bags 46 are filled one at a time and sequentially.

To disconnect the nozzle 66 from the manifold filter 54, the pump 102 is reversed, drawing solution disposed in the connection line 50 away from the nozzle 66. By reversing the pump, a negative pressure in the connection line 50 is created, causing the connection line 50 to partially collapse. Thus, when the nozzle 66 is moved in the L direction to decouple the nozzle 66 from the connection line 50, the connection line 50 recovers so that the solution is drawn away from the interface between the connection line 50 and the nozzle 66 to prevent the solution from spilling onto the nozzle 66 or other equipment in the clean chamber 14.

By providing a sterile connecting enclosure within the filling machine 10, the distance of the downstream tubing to the filter and manifold 38 is minimized, thereby reducing product loss in that tubing and also facilitating set up.

Figure 25:
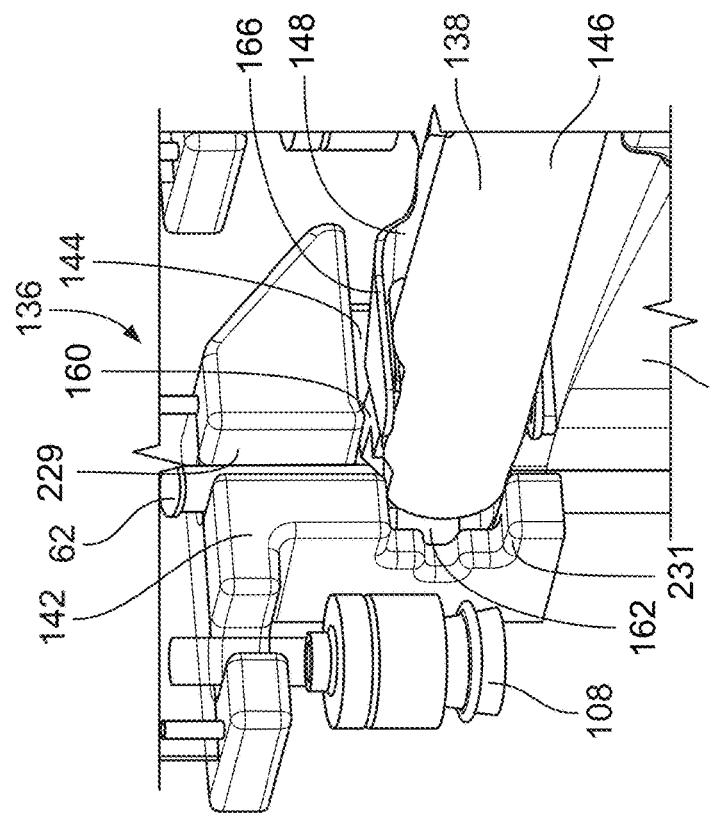
FIG. 25 is a magnified view of the sealing tool aligned with the stem of the product bag of FIG. 24.
Figure 24:
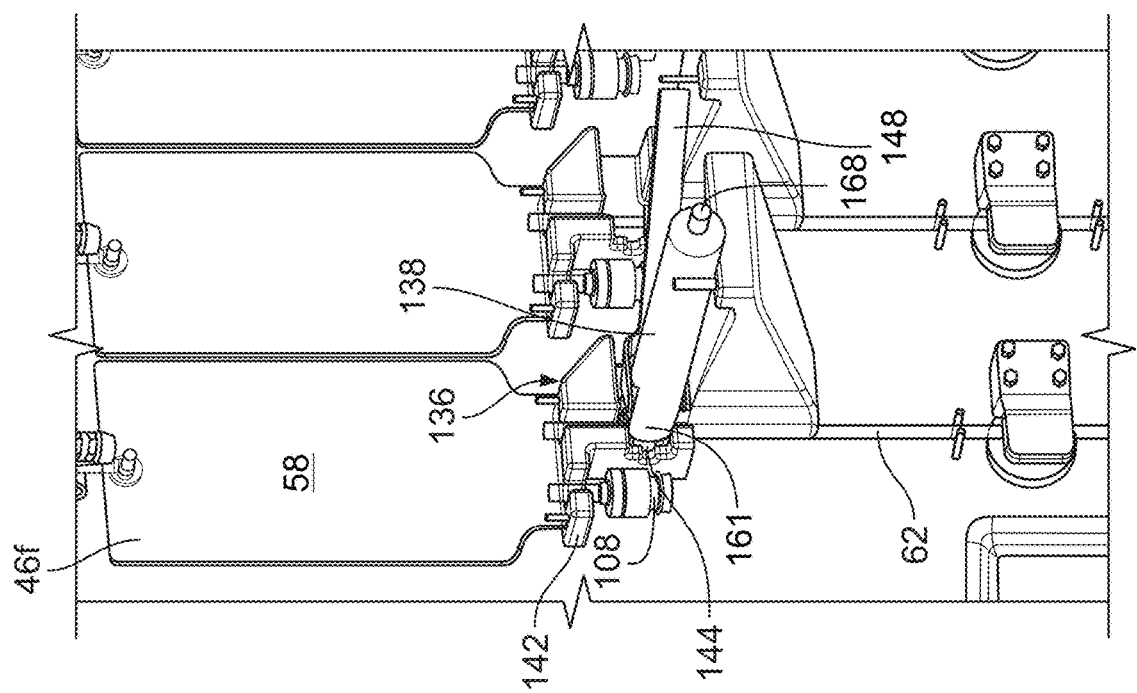
FIG. 24 is a partial view of the sealing tool of FIG. 12 aligned with a stem of a product bag of the manifold assembly of FIG. 4.
Figure 26:
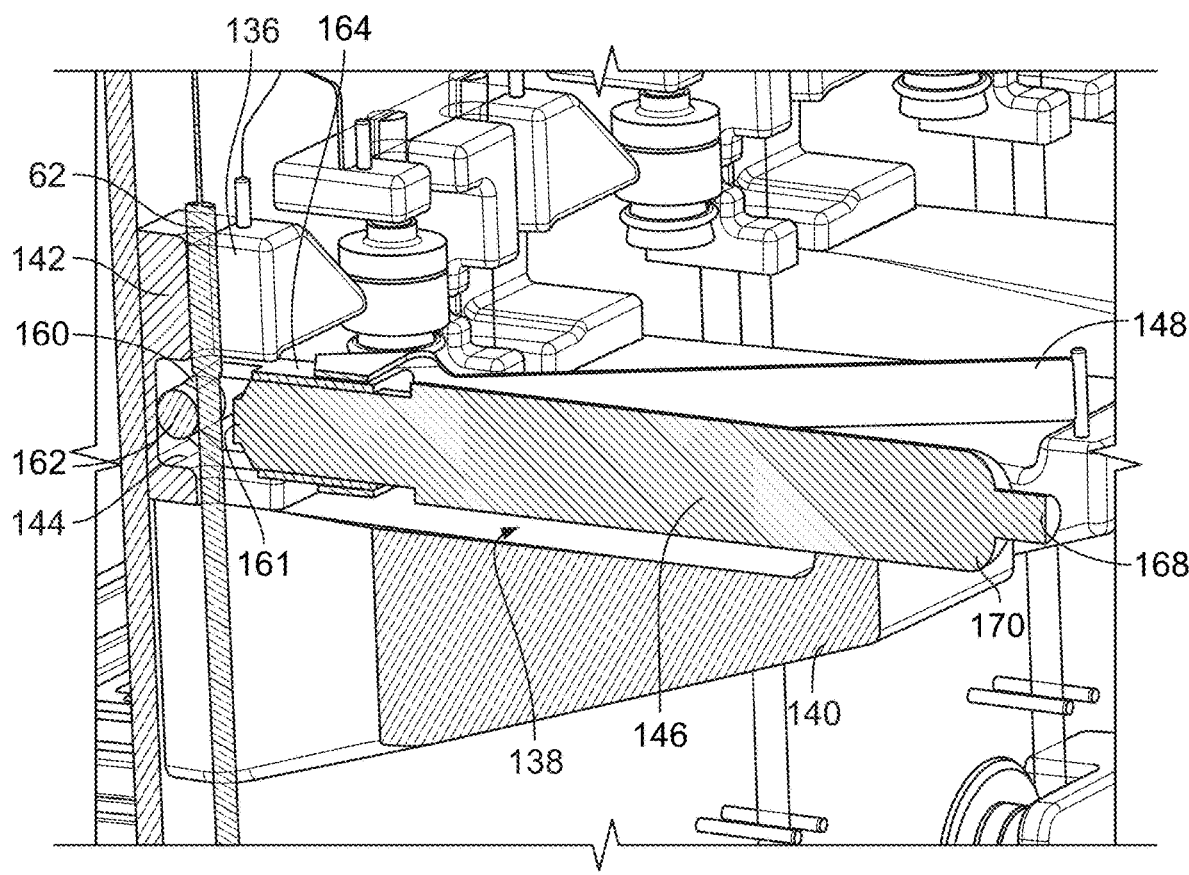
FIG. 26 is a cross-sectional, perspective view of the sealing tool aligned with the stem of the product bag of FIG. 24.

Turning now to FIGS. 24-26, an example of the step 216 of sealing the stem 62 of the product bag 46 of the method 200 is more clearly illustrated. The step 216 includes aligning the sealing tool 138 at the location between the connection line 50 and each bladder 58 of the at least partially filled product bags 46. In the illustrated example, the shelving unit 136 facilitates this alignment by guiding the sealing tool 138 to the location of sealing. As shown in FIGS. 25 and 26, the hand grip 146 of the sealing tool 138 rests against the platform 140 of the shelving unit 136, and the first end 161 of the hand grip 146 and the clamp 160) are positioned in the notch 144 formed in the stem grip 142. As shown in FIG. 25, the stem grip 142 includes a groove 229 that receives the stem 62 of the product bag 46. The notch 144 is perpendicular relative to the groove 229 and has a profile 231 shaped to receive the first end 161 of the hand grip 146 and at least a portion of the clamp 160.

As shown in FIG. 26, the stem 62 is disposed between the bar 162 of the clamp 160 and the first end 161 of the hand grip 146 when the sealing tool 138 is in the open position. Once the sealing tool 138 is coupled to the shelving unit 136 and aligned with the stem 62, the step of sealing 216 the stem 62 includes creating a wide seal by applying RF energy to the location of the stem 62 by pressing the first end 161 of the hand grip 146 toward the bar 162 of the clamp 160, thereby clamping and sealing the stem 62 from the connection line 50. The sealing tool 138 is configured to create seal having a width W in a range of approximately 4 mm to approximately 6 mm, and preferably 5 mm. To ensure an adequate seal, the step 216 of sealing the stem 62 includes clamping the stem 62 of each at least partially filled product bags 46 for at least until a desired impedance change between the two sealing surfaces 160, 161 is met.

In some examples, the sealing tool 138 may be communicatively coupled to the CPU 28 to guide an operator, step by step, to create an adequate seal. For example, the sensor 185 of the sealing tool 138 measures RF energy applied between the opposing clamping surfaces 160, 161, and the timer 172 measures the time the sealing tool 138 is in the clamped position and/or the time RF energy is applied between the opposing clamping surfaces 160, 161. The CPU 28 may be programmed to determine an adequacy of the seal by receiving real-time measurements from the sensor 185 and the timer 172. Specifically, the CPU 28 may monitor the RF generating circuit (e.g., an LCR circuit) to ensure that a forward and reflected power delivered into the stem 62 to create the seal meets established process requirements. By comparing the measurements received from the sensor 185 and the timer 172 against a sealing threshold (i.e., impedance change) and a time threshold, respectively, the CPU 28 can determine whether the sealing step 216 is satisfactorily performed. If pressure is applied beyond of this range or above/below a certain impedance threshold, the CPU 28 may activate an alarm indicating that an inadequate seal was formed in the stem 62. The seal may also be determined inadequate when the operator fails to fully depress the lever 148 while the RF energy is activated and remains depressed during the two second cooling period. In another example, a message may be displayed on the user interface 26 when the time of sealing has reached the predetermined threshold and may alert the operator to release the sealing tool 138, or the CPU 28 may automatically cut off power to the end 160 or force the sealing tool 138 to release. In other examples, the CPU 28 may monitor the physical properties of the seal, and in particular, whether a width of the seal results in a range of approximately 4 mm to approximately 5 mm.

Figure 28:
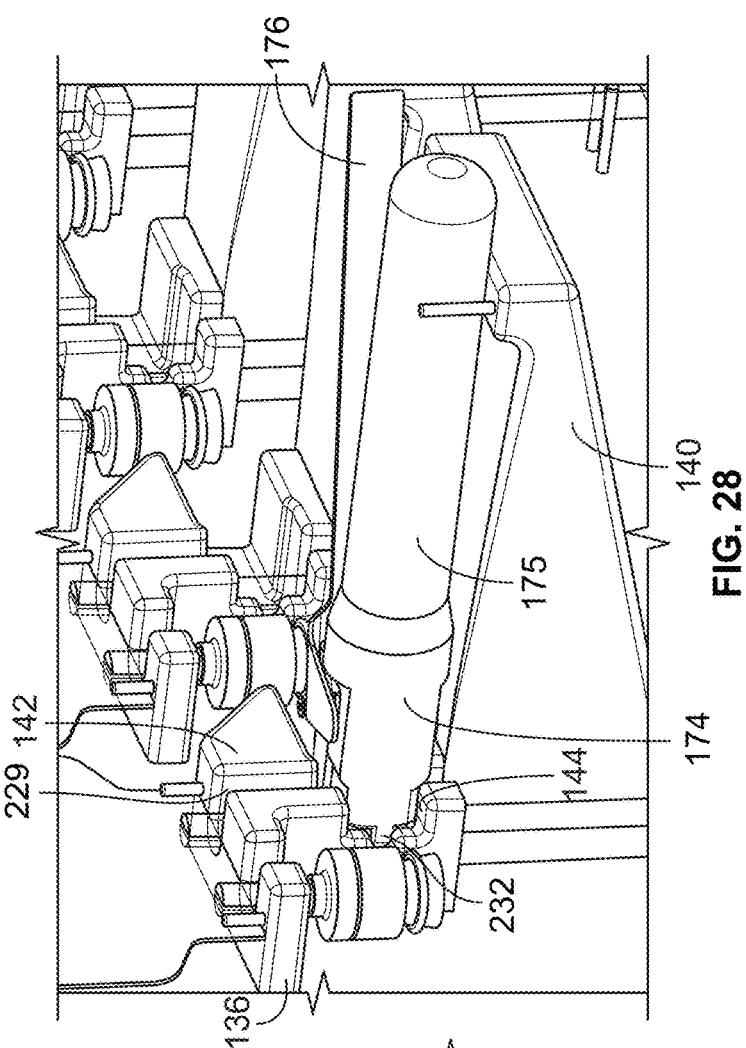
FIG. 28 is a magnified view of the cutting tool aligned with the stem of the product bag of FIG. 27.
Figure 27:
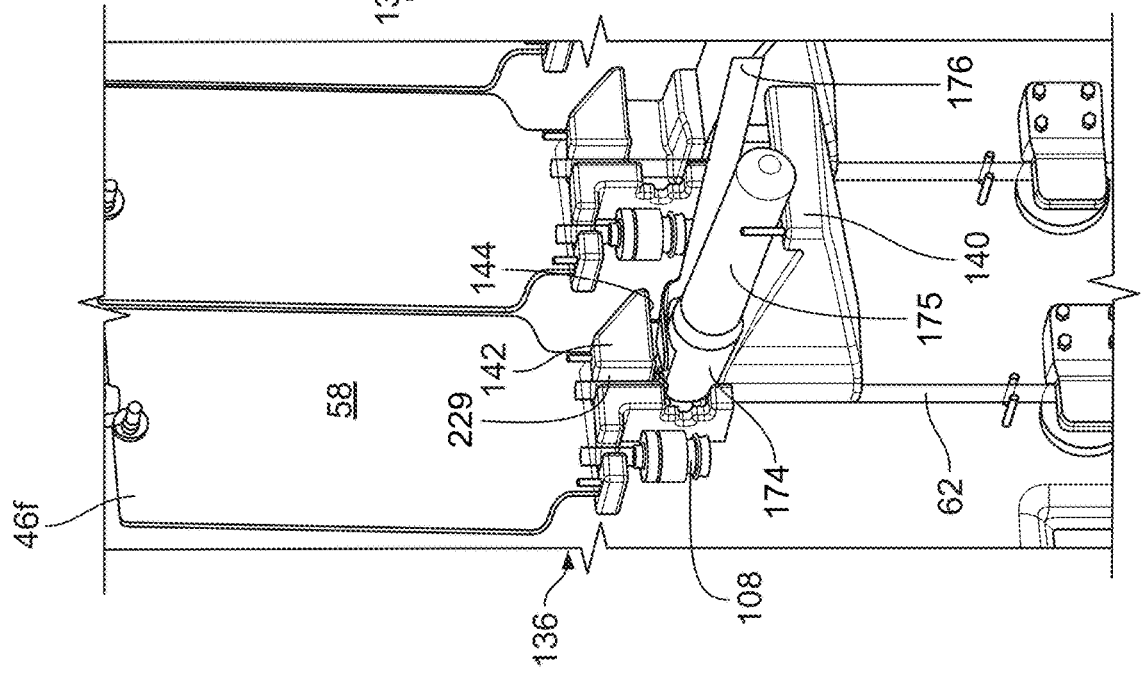
FIG. 27 is a partial view of the cutting tool of FIGS. 13 and 14 aligned in with the stem of the product bag of the manifold assembly of FIG. 4.
Figure 29:
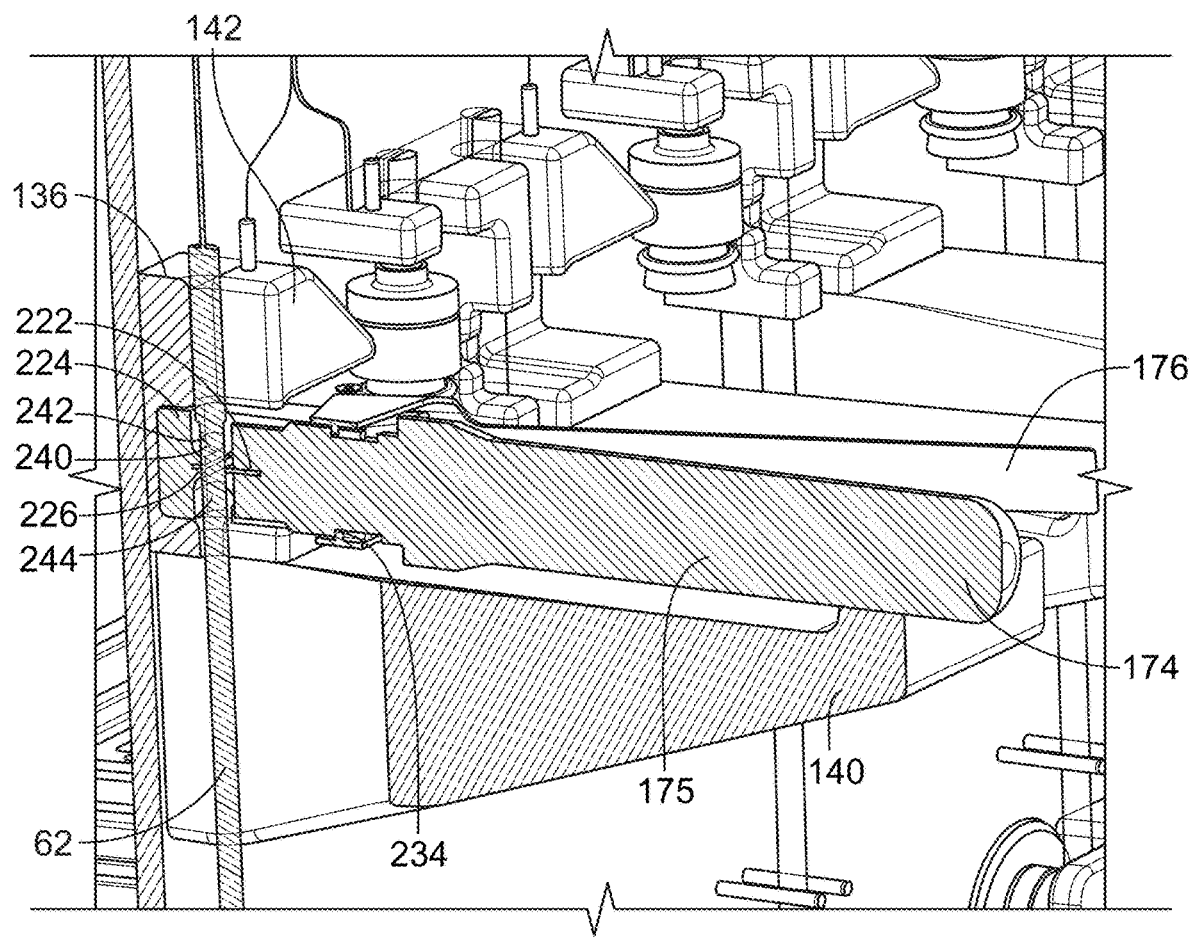
FIG. 29 is a cross-sectional view of the cutting tool aligned with the stem of the product bag of FIG. 27.

In FIGS. 27-29, the step 220 of separating the product bag 46 is shown in an illustrated example. The step 220 includes waiting until the seal is cooled and aligning the cutting tool 174 at the stem location between the connection line 50 and each bladder 58 of the at least partially filled product bags 46. In this position, the blade 222 of the cutting tool 174 is aligned with a center point of the wide seal formed in the stem 62 of each of the at least partially filled and sealed product bags 46. In the illustrated example, the shelving unit 136 facilitates this alignment by guiding the cutting tool 174 to the location of sealing. As shown in FIGS. 27 and 28, the hand grip 175 of the cutting tool 174 is resting against the platform 140 of the shelving unit 136 and the first end 232 of the hand grip 175 and the stop 224 are positioned in the notch 144 formed in the stem grip 142.

As shown in FIG. 29, a seal 240 in the stem 62 is disposed between the blade cover 226 of the stop 224 and the blade 222 secured to the first end 232 of the hand grip 175 when the cutting tool 174 is in the open position. Once the cutting tool 174 is coupled to the shelving unit 136 and aligned with the seal 240 of the stem 62, as shown in FIGS. 27-29, the step of separating 220 the stem 62 at the seal 240 includes cutting the stem 62 of each at least partially filled and sealed product bags 46 at the location between the connection line 50 and the bladders 58. The stem 62 is cut by pressing the blade 222 toward the blade cover 226, thereby piercing and severing the stem 62 from the connection line 50 at the seal 240. Due to the width of the wide seal 240, the stem 62 is sealed at a first side 242 and a second side 244 of the cut. As such, because both resulting first and second sides 242, 244 of the tubing is sealed after the stem 62 is cut, an operator can transport the manifold 38, bags 46, and filter 54 without any dripping any fluid remaining in the tubing.

The method steps of sealing 216 and separating 220 the stem 62 from the connection line 50 may occur simultaneously with the filling of the bags 46. For example, the step 212 of at least partially filling one or more of the bladders 58 associated with the plurality of bags 46 includes filling the first bag 46a before filling the second bag 46b. An operator may seal the stem 62 associated with the first bag 46a and separate the first bag 46a from the connection line 50 while the second bag 46b is being at least partially filled with solution. Similarly, as the third bag 46c is being at least partially filled with solution, the operator may seal the stem 62 associated with the second bag 46b and separate the second bag 46b from the connection line 50. However, in another example, the operator may wait until each bag 46a, 46b, 46c, 46d, 46e, 46f is filled before performing the sealing 216 and separating steps 220.

While the illustrated examples include sealing the stem 62 with the sealing tool 138 using RF energy and then cutting the stem 62 at the seal with the cutting tool 174, other methods of sealing and separating the stem 62 may be possible. In one example, the step 216 of sealing the stem 62 includes creating a hot notched seal that creates a weak centerline in the seal so that the step 220 of separating each of the at least partially filled and sealed product bags 46 includes pulling the stem 62 to tear at the hot notched seal without using the cutting tool 174. In other examples, the sealing and cutting tool may be an integrated device. For example, an integrated tool may include one hand grip and two separate handles (i.e., one handle for clamping to create a seal and another handle for clamping to cut the seal). In another example, the element 160 may add direct heat to the stem 62 such that the passageway is sealed. In another example, the element 160 may be removably coupled to the first end of the hand grip 146 and may be replaced with the blade 222 when a seal needs to be cut.

To ensure sterility of the contents of the product bag 46, the manifold filter 54 is sealed off and separated from the connection line 50 for testing in a filter integrity test machine. The operator may repeat sealing and separating methods used to separate each bag 46 from the connection line 50 to separate the manifold filter 54 from the connection line 50. In particular, a wide seal may be created at a second location adjacent to the outlet 67 of the filter 54, and then separated such that the connection line 50 and the manifold filter 54 are completely sealed off. Thus, a final step in the method 200 is to test the manifold filter 54 using a filter integrity testing device or machine. The results from the integrity test are assessed to determine the quality of the filter 54, and therefore the quality of the solution of the filled product bags 46. If the pressure sensor measures a decay or an unexpected rate of decay, then the filter 54 fails the test.

Figure 30:
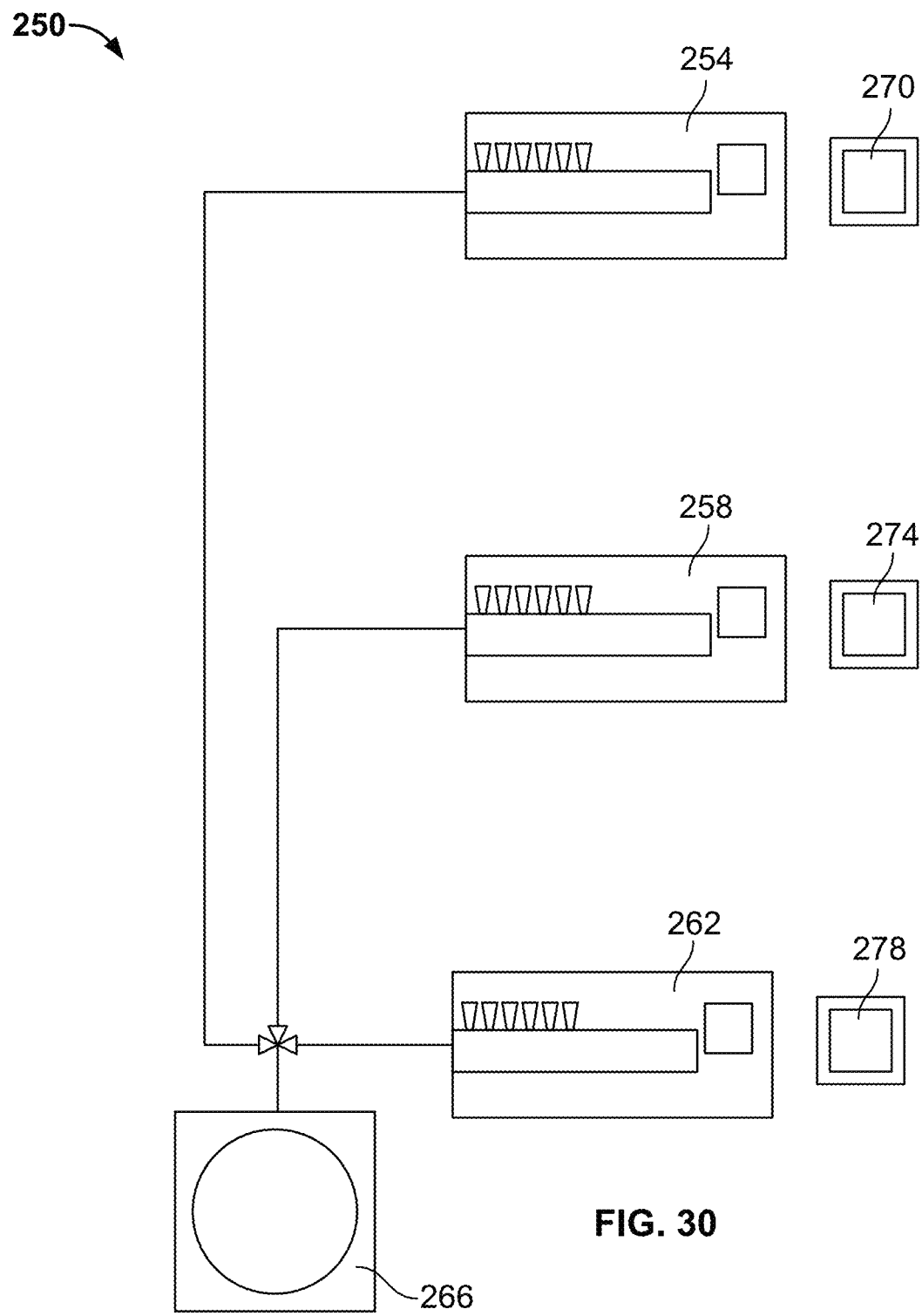
FIG. 30 is a top view of a first exemplary schematic of a system for producing sterile solution product bags assembled in accordance with the teachings of the present disclosure.

The machine 10 described herein may be part of a system of machines, such as a first exemplary filling system 250 illustrated in FIG. 30. In FIG. 30, the filling system 250 includes three filling machines 254, 258, 262, each machine in fluid connection with a mix tank 266, which provides the solution for filling the product bags attached to each machine 254, 258, 262. In the illustrated example, the mix tank 266 includes one port and a four-way valve connected to the port to fluidly connect the mix tank 266 to each filling machine 254, 258, 262. However, in another example, the mix tank 266 may include three ports where on each port, a valve connects the port to a connector that makes a sterile connection to a complementary sterile connector on the filter train connected to the filling machine 254, 258, 262. Other configurations for fluidly coupling the mix tank 266 to each filling machine 254, 258, 262 are possible, and the number of ports may reflect the number of filling machines in the system. Adjacent to each filling machine 254, 258, 262 is a filter integrity test machine 270, 274, 278, respectively. In this layout, three operators may work simultaneously at each machine 254, 258, 262. Alternatively, one operator may operate all three machines 254, 258, 262 at different stages of the filling process.

Figure 31:
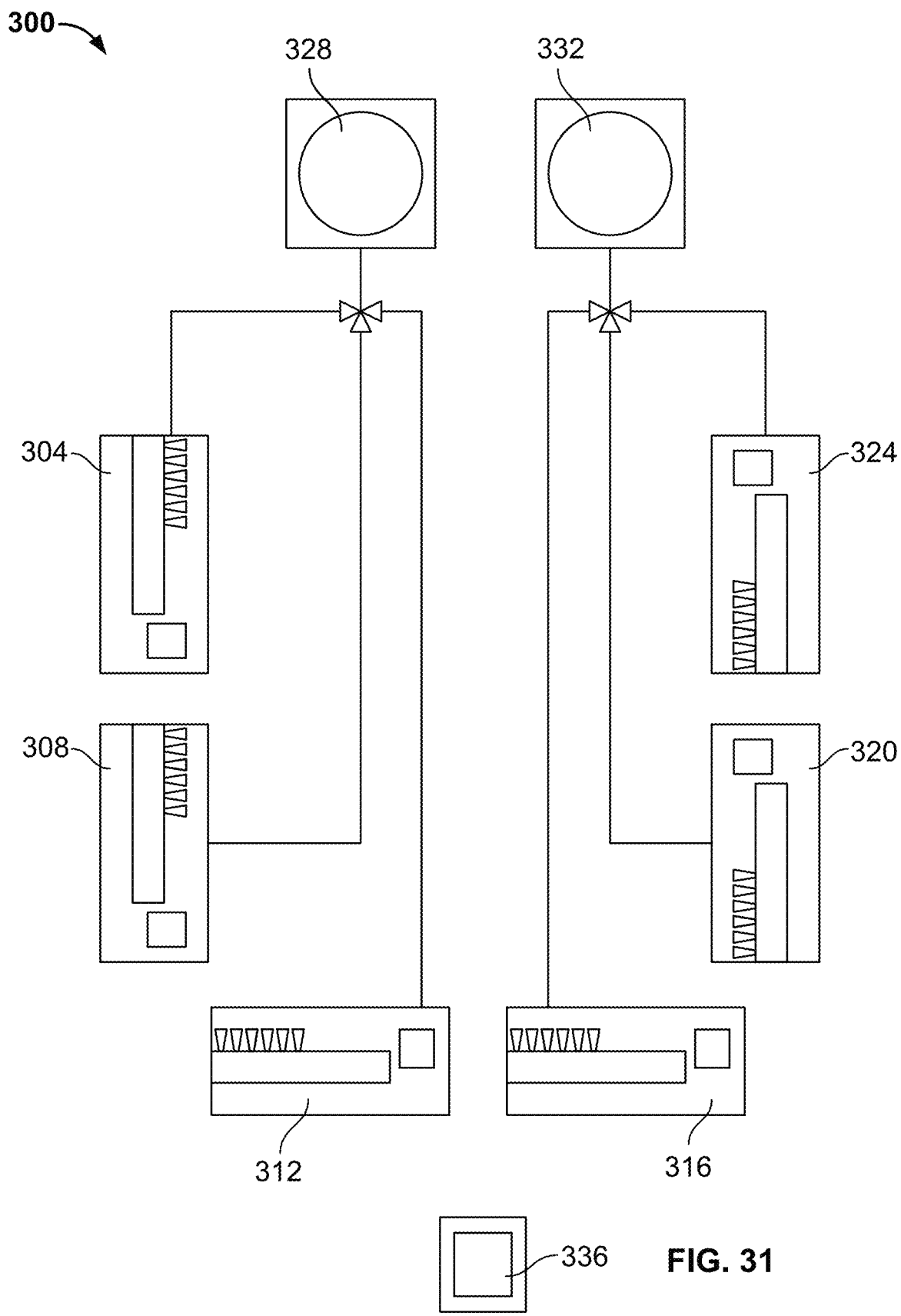
FIG. 31 is a top view of a second exemplary schematic of a system for producing sterile solution product bags assembled in accordance with the teachings of the present disclosure.

FIG. 31 illustrates a second exemplary filling system 300 assembled in accordance with the teachings of the present disclosure. In this system 300, one operator has access to six different filling machines 304, 308, 312, 316, 320, 324. The system 300 includes two mix tanks 328, 332 to supply solution to the six filling machines 304, 308, 312, 316, 320, 324. In this system, one filter integrity test machine 336 is provided. According to this layout, an operator has 360 degrees of visibility of the mix tanks 328, 332 and the filling machines 304, 308, 312, 316, 320, 324 so that the operator can move easily between mixing and filling stations of the system 300. In the illustrated example, each mix tank 328, 332 includes one port and a four-way valve connected to the port to fluidly connect the mix tank 328, 332 to each filling machine 304, 308, 312 and 316, 320, 324, respectively. However, in another example, each mix tank 328, 332 may include three ports where on each port, a valve connects the port to a connector that makes a sterile connection to a complementary sterile connector on the filter train connected to each filling machine 304, 308, 312, 316, 320, 324. Other configurations for fluidly coupling the mix tanks 328, 332 to each filling machine 304, 308, 312, 316, 320, 324 are possible, and the number of ports may reflect the number of filling machines in the system.

Figure 32:
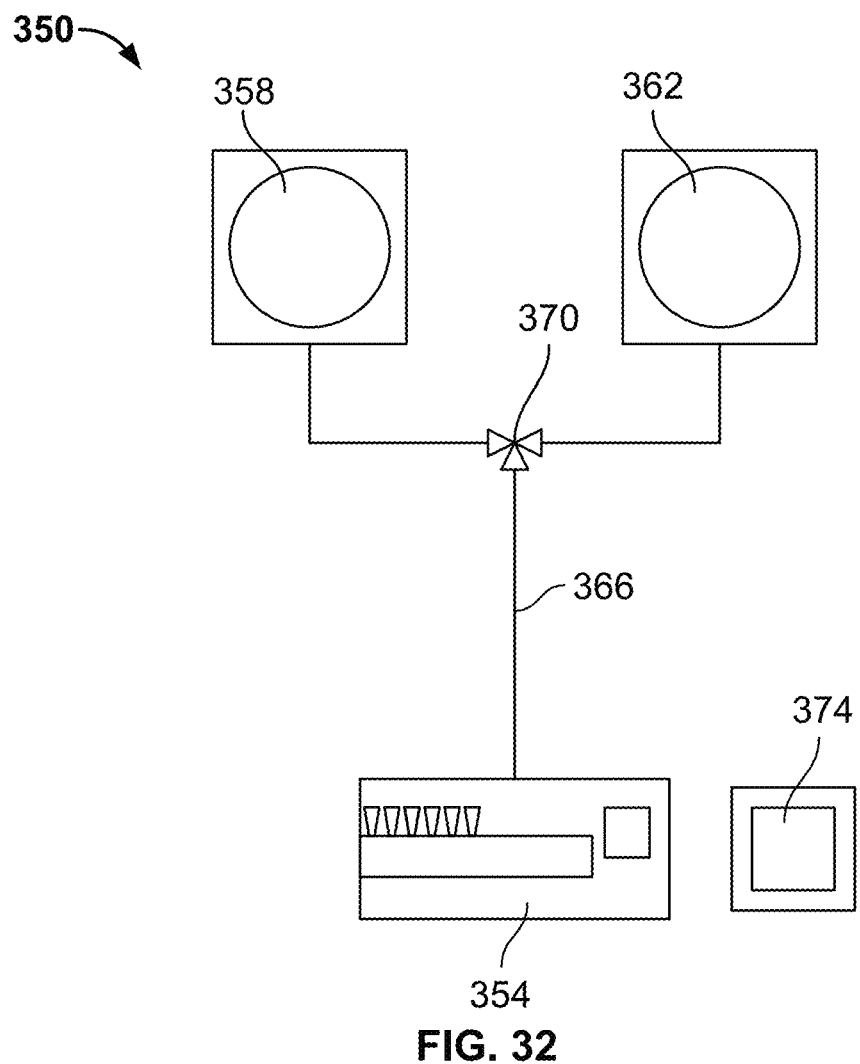
FIG. 32 is a top view of a third exemplary schematic of a system for producing sterile solution product bags assembled in accordance with the teachings of the present disclosure.

Finally, FIG. 32 illustrates a third exemplary filling system 350 assembled in accordance with the teachings of the present disclosure. In this system 350, one filling machine 354 is connected to two different mix tanks 358, 362 via a connection line 366. A three-way valve 370 is coupled to the mix tanks 358, 362 and the connection line 366 to control flow of solution from the mix tanks 358, 362 to the filling machine 354. This system 350 may save time in the filling process because one mix tank 358, 362 may be mixing a solution while the other mix tank 358, 362 may be dispensing a pre-mixed solution to the machine 354. As such, the machine 354 may be utilized when one of the mix tanks 358, 362 is preparing the solution, thereby reducing effects of mix tank down time for mixing the solution.

The filling machine, mix tank, and filter integrity test machine are modular, allowing an operator to create any number of different system configurations to best suit the facility's capabilities or customer demand. Each filling machine, mix tank, and filter integrity test machine may be placed on a wheeled base so that each station of the filling process can be mobile.

The method 200, systems 250, 300, 350, and machine 10 disclosed herein provide considerable benefits over current methods of terminal sterilization. The machine 10 is portable and self-containing, allowing customization of a filling system to meet a particular facility's specifications or a market demand. Additionally, the method 200 described herein provides sterile solution bags 46 without using a sterilizing autoclave and/or expensive sterilization equipment required to sterilize the working environment and eliminates the risk of formulation degradation due to heat exposure. The self-contained and automated machine 10 reduces the sterilization procedures necessary to be performed in terminal sterilization processes.

The method 200 and machine 10 disclosed herein also reduce risk of contamination. The product bag 46 having a filter 54 disposed in-line with a stem 62 avoids exposing the post-filtered sterile fluid to the environment. Rather, the solution, that has passed through the sterilizing manifold filter, is never exposed to the environment before flowing into the product bag 46 thereby producing a product bag filled with fluid that has been subject to terminal sterilization filtration. Moreover, the stem 62 is sealed and cut after filling such that no environmental exposure of the fluid can take place. In the case a sterilizing filter 54 is determined to be compromised, the bag 46 or bags 46 containing fluid from that filter would be contained and discarded without contaminating the processing equipment of the machine or other product bags being processed.

Additionally, the connection assembly 90 takes place entirely in a clean air space with an upside down configuration of the manifold assembly 38. The inlet of each product bag faces downward such that any drips from the cut stems of the product bags 46 will fall onto the platform 22 or clean chamber 14 rather than dripping onto the outer surface of the product bags 46. The upside-down configuration also facilitates air management by advantageously using the buoyancy of the air to push the solution (coming in from below the air, or headspace, of the bag) to ensure accurate filling volumes. Because the pump 102 works against gravity, bubbles that are usually produced during filling are minimized, leading to uniform distribution of headspace and solution in each bag 46 of a bag set. Also, by filling from the bottom, for each bag 46 all air in the inlet stem and within the initial empty bag 46 is captured in the headspace so that each bag 46 ends up with generally the same volume of headspace. In other words, the air bubbles pushed out of the fluid passageways at least partially rely on the buoyancy of the air to create the headspace. This prevents some bags 46 from visually appearing as having different volumes than others simply because the headspace volume is different.

Disposing the manifold filter 54 in an upside-down configuration also provides advantages in terms of filter integrity test results. The inlet 65 of the manifold filter 54 faces down so that the interior of the housing is completely filled with solution as the manifold tubing is primed thus the filter 64 is completely wetted before solution flows through the outlet 67 of the filter 54. By ensuring that the manifold filter 54 is completely wetted prior to the filter integrity testing, integrity test results are more accurate and minimize false positive test results.

FIGS. 37A and 37B illustrate a filter integrity test system 650 used for testing multiple filters 54 at once. As shown, the filter test system 650 includes a computer 652 and a connected filter testing apparatus 654. In some cases, the computer 652 and filter testing apparatus 654 are integral components of a single machine. Additionally, as shown, the filter testing apparatus 654 is configured to test up to three filters at one time. However, in some cases, the filter testing apparatus 654 may be arranged to test more or fewer filters at once.

The computer 652 controls the filter testing apparatus 654 and also receives and processes information generated by the filter testing apparatus 654. As shown, the computer 652 includes a display 662 and external input devices such as a keyboard 664 and a barcode scanner 666. In some examples, the display 662 is also an external input device and can receive user inputs via a touch-screen interface. During operation, a lab technician can scan barcodes disposed on the filter, which correlate with the barcodes on the product bags, and input data via the keyboard 664. The computer 652 may additionally include access to a remote computer system, including the internet. In such a case, the computer 652 can transmit data, including the filter barcode/identification and whether the filter 54 passed the filter test.

The filter testing apparatus 654, as shown, tests filters via a standard bubble point test. Accordingly, the filter testing apparatus includes a slot 670 to receive a filter 54. In some cases, the filter testing apparatus 654 includes a connection for both the filter inlet and outlet. As illustrated, the filter testing apparatus 654 includes the connection 674 attached to an actuating lever 678. The connection 674 may further include a valve, such as a one-way valve. As shown in FIG. 37B, the filters 54 are disposed in the slots 670 and the levers 678 are actuated causing the connections 674 to fluidly couple with the filters 54. Depending on the filter testing apparatus 654, the connection 674 may fluidly couple with the filter inlet 65 or the filter outlet 67. As a result, the filter testing apparatus 654 can test the filters 54 by passing pressurized air through each filter 54. In some examples, the computer 652 and filter testing apparatus 654 test each filter 54 consecutively, but it is possible for all filters to be tested simultaneously. When a filter 54 passes the filter test, the filled bladders 58 are considered to have been filled in a sterile manner. After the filter test, the filters 54 may be returned to their respective filter compartment 514 of the bracket 500 or may be discarded.

The figures and description provided herein depict and describe preferred embodiments of filling machine, method, and system for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the filling machine, method, and system. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A system for filling sterile solution product bags, the system comprising:
    a clean chamber;
    a support wall disposed above the clean chamber;
    a platform defining an opening to the clean chamber;
    a feed line at least partially disposed in the clean chamber and including a nozzle coupled to an end of the feed line;
    a filling connection assembly disposed in the clean chamber, the assembly comprising:
        a first actuator carrying the nozzle; and
        a second actuator carrying a cutting tool;
    a manifold assembly removably coupled to the support wall, the manifold assembly comprising:
        a plurality of product bags;
        a manifold filter arranged for at least partial insertion into the clean chamber via the opening in the platform, the manifold filter having an inlet arranged to operatively couple to the nozzle and an outlet fluidly coupled to the plurality of bags via a connection line.

2. The system of claim 1, further comprising a pump coupled to the feed line and configured to pump a fluid through the batch filter, the feed line, the nozzle, and the manifold filter.

3. The system of claim 1, wherein the nozzle is movable by the first actuator between an extended position and a retracted position relative to a first axis.

4. The system of claim 3, wherein the cutting tool is movable by the second actuator between an extended position and a retracted position relative to a second axis, the second axis being perpendicular to the first axis.

5. The system of claim 4, further comprising a gripping tool carried by a third actuator and movable between an extended position and a retracted position relative to a third axis, the third axis being perpendicular to the first axis.

6. The system of claim 5, wherein the gripping tool includes an opening sized to receive a portion of a connection tube connected to the inlet of the manifold filter.

7. The system of claim 6, wherein the connection tube includes a sealed end.

8. The system of claim 5, wherein the gripping tool includes a slot sized to receive a blade of the cutting tool when the second actuator is in the extended position and the third actuator is in the extended position.

9. The system of claim 8, further comprising a protective door for covering the opening, wherein the door is rotatable relative to the opening.

10. The system of claim 1, further comprising a cap removal tool removably disposed within the opening, the cap removal tool including a first opening and a second opening orthogonal to the first opening, wherein the first and second openings are different sizes.

11. The system of claim 1, wherein the second actuator carries an angled chute disposed below the blade of the cutting tool.

12. The system of claim 1, further comprising a plurality of occlusion valves coupled to the support wall.

13. The system of claim 12, wherein each of the plurality of bags includes a bladder and a stem having a first end in fluid communication with the bladder and a second end in fluid communication with the connection line, and wherein each stem aligns with one of the plurality of occlusion valves.

14. The system of claim 13, wherein each stem is coupled to the support wall by one of the plurality of occlusion valves, each of the plurality of occlusion valves movable between a compressed position and an extended position to control a flow of fluid through each stem.

15. The system of claim 1, further comprising a rack holding the manifold assembly to the support wall, the rack including a plurality of compartments for holding the plurality of bags of the manifold assembly.

16. The system of claim 1, further comprising a HEPA filter for filtering air flowing through the clean chamber.

* * * * *